United States Patent
Hasumi

(10) Patent No.: US 11,440,618 B2
(45) Date of Patent: Sep. 13, 2022

(54) ELECTRIC ASSIST SYSTEM AND ELECTRIC ASSIST VEHICLE

(71) Applicant: YAMAHA HATSUDOKI KABUSHIKI KAISHA, Iwata (JP)

(72) Inventor: Mitsuharu Hasumi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 672 days.

(21) Appl. No.: 16/449,511

(22) Filed: Jun. 24, 2019

(65) Prior Publication Data

US 2019/0308512 A1    Oct. 10, 2019

Related U.S. Application Data

(63) Continuation of application No. PCT/JP2017/034148, filed on Sep. 21, 2017.

(30) Foreign Application Priority Data

Dec. 28, 2016    (JP) .............................. JP2016-255872

(51) Int. Cl.
*B62M 6/50*    (2010.01)
*B60L 50/20*    (2019.01)
(Continued)

(52) U.S. Cl.
CPC ................. *B62M 6/50* (2013.01); *B60L 9/18* (2013.01); *B60L 50/20* (2019.02); *B62M 6/45* (2013.01);
(Continued)

(58) Field of Classification Search
CPC . B62M 6/50; B62M 6/45; B62M 6/55; B62M 6/90; B60L 9/18; B60L 50/20;
(Continued)

(56) References Cited

U.S. PATENT DOCUMENTS 5,664,636 A * 9/1997 Ikuma ...................... B62M 6/45
                                                                280/212
6,545,437 B1    4/2003 Strothmann
(Continued)

FOREIGN PATENT DOCUMENTS

CN          1373057 A     10/2002
CN        103287543 A      9/2013
(Continued)

OTHER PUBLICATIONS

Official Communication issued in International Patent Application No. PCT/JP2017/034148, dated Nov. 7, 2017.
(Continued)

*Primary Examiner* — Richard M Camby

(74) *Attorney, Agent, or Firm* — Keating and Bennett, LLP

(57) ABSTRACT

An electric assist system for an electric assist vehicle includes a crankshaft rotatable by human power of a rider applied to a pedal, an electric motor that generates an assist power that assists the human power of the rider, a controller that controls a magnitude of the assist power to be generated by the electric motor, and an acceleration sensor that outputs a signal in accordance with an acceleration in a traveling direction of the electric assist vehicle. The controller changes the magnitude of the assist power to be generated by the electric motor in accordance with a change in the acceleration that is associated with an operation of the rider rotating the pedal.

19 Claims, 28 Drawing Sheets

(51) Int. Cl.
　　　*B62M 6/55*　　　(2010.01)
　　　*B62M 6/90*　　　(2010.01)
　　　*B62M 6/45*　　　(2010.01)
　　　*B60L 9/18*　　　(2006.01)
　　　*B62J 43/13*　　　(2020.01)
　　　*B62J 43/20*　　　(2020.01)

(52) U.S. Cl.
　　　CPC ................ *B62M 6/55* (2013.01); *B62M 6/90* (2013.01); *B60L 2200/12* (2013.01); *B62J 43/13* (2020.02); *B62J 43/20* (2020.02)

(58) Field of Classification Search
　　　CPC ....... B60L 2200/12; B62J 43/13; B62J 43/20; Y02T 10/72
　　　See application file for complete search history.

(56) References Cited

U.S. PATENT DOCUMENTS

| | | |
|---|---|---|
| 2002/0120382 A1 | 8/2002 | Hatanaka et al. |
| 2013/0054066 A1 | 2/2013 | Watarai |
| 2014/0084819 A1 | 3/2014 | Hosaka et al. |
| 2014/0166383 A1 | 6/2014 | Arimune |
| 2015/0039165 A1 | 2/2015 | Fujita et al. |
| 2016/0121730 A1 | 5/2016 | Fujita et al. |
| 2016/0167732 A1 | 6/2016 | Modolo |
| 2017/0001682 A1* | 1/2017 | Hayslett ................ B60W 10/08 |
| 2017/0057596 A1* | 3/2017 | Ichida ..................... B62M 6/70 |
| 2017/0247080 A1* | 8/2017 | Tsuchizawa ............ B60L 53/67 |
| 2018/0029666 A1* | 2/2018 | Shahana .................. B62M 6/45 |
| 2018/0257743 A1* | 9/2018 | Tsuchizawa ........... B62J 45/415 |

FOREIGN PATENT DOCUMENTS

| | | | |
|---|---|---|---|
| CN | 103863124 A | 6/2014 | |
| CN | 104340324 A | 2/2015 | |
| CN | 105564581 A | 5/2016 | |
| DE | 10 2015 118 150 A1 | 5/2016 | |
| EP | 0 976 649 A2 | 2/2000 | |
| EP | 1 236 640 A2 | 9/2002 | |
| EP | 2 631 165 A1 | 8/2013 | |
| EP | 2 860 096 A1 | 4/2015 | |
| EP | 2 868 562 A1 | 5/2015 | |
| EP | 3 025 898 A1 | 6/2016 | |
| EP | 3 078 583 A1 | 10/2016 | |
| JP | 09-226664 A | 9/1997 | |
| JP | 2005-335405 A | 12/2005 | |
| JP | 2005335405 A * | 12/2005 | .......... B60L 11/1801 |
| JP | 5668036 B2 | 2/2015 | |
| JP | 2016-008004 A | 1/2016 | |
| JP | 5950268 B1 | 7/2016 | |
| JP | 2016-150684 A | 8/2016 | |
| TW | I474950 B | 3/2015 | |
| WO | 2015/128239 A1 | 9/2015 | |

OTHER PUBLICATIONS

Official Communication issued in corresponding Taiwanese Patent Application No. 106136777, dated Nov. 22, 2018.

* cited by examiner

ELECTRIC ASSIST SYSTEM AND ELECTRIC ASSIST VEHICLE

BACKGROUND OF THE INVENTION

1. Field of the Invention

The present invention relates to an electric assist system usable for an electric assist vehicle, and an electric assist vehicle including the electric assist system.

2. Description of the Related Art

An electric assist bicycle, by which power of a rider pedaling the bicycle is assisted by an electric motor, is known. In such an electric assist bicycle, assist power in accordance with human power applied by the rider to the pedal is generated by the electric motor, and a motive power as a sum of the human power and the assist power is transmitted to a driving wheel. The human power is assisted by the electric motor, so that the power required of the rider to pedal the electric assist vehicle is alleviated (e.g., Japanese Laid-Open Patent Publication No. Hei 09-226664).

When an electric assist bicycle receives a heavy load from the running environment, for example, when the electric assist bicycle is running on a slope or is running against the headwind, the rider may wish for larger assist power. In order to change the magnitude of the assist power, the assist mode needs to be changed by a manual operation, which the rider may feel troublesome.

SUMMARY OF THE INVENTION

Preferred embodiments of the present invention provide electric assist systems that generate an appropriate level of assist power in accordance with the load while an electric assist vehicle is running, and electric assist vehicles including the electric assist system.

An electric assist system according to a preferred embodiment of the present invention assists an electric assist vehicle including a pedal. The electric assist system includes a crankshaft rotatable by human power of a rider applied to the pedal; an electric motor that generates an assist power assisting the human power of the rider; a controller configured or programmed to control a magnitude of the assist power to be generated by the electric motor; and an acceleration sensor that outputs a signal in accordance with an acceleration in a traveling direction of the electric assist vehicle. The controller is configured or programmed to change the magnitude of the assist power to be generated by the electric motor in accordance with a change in the acceleration that is associated with an operation of the rider rotating the pedal.

Because of the structure of the bicycle of allowing the rider to have his/her foot step on, and rotate, the pedal, the magnitude of the human power of the rider applied to the pedal is changed in accordance with the rotation angle of the crankshaft while the rider is rotating the pedal. Therefore, the acceleration in the traveling direction of the electric assist bicycle is changed in accordance with the rotation angle of the crankshaft while the rider is rotating the pedal. The magnitude of the assist power may be changed in accordance with the acceleration changing in association with the operation of the rider rotating the pedal, so that an appropriate level of assist power in accordance with the load during running is generated.

In a preferred embodiment of the present invention, the electric assist system may further include a torque sensor that outputs a signal in accordance with a torque generated at the crankshaft. The torque generated at the crankshaft by the human power of the rider applied to the pedal may change in accordance with the rotation of the crankshaft. The controller may change the magnitude of the assist power to be generated by the electric motor in accordance with a change in the acceleration that is associated with a change in the torque.

The magnitude of the human power of the rider applied to the pedal is changed in accordance with the rotation angle of the crankshaft while the rider is rotating the pedal. Such a change in the human power of the rider applied to the pedal appears as a change in the torque generated at the crankshaft. The acceleration in the traveling direction of the electric assist bicycle is changed in accordance with the change in the torque generated at the crankshaft. The magnitude of the assist power may be changed in accordance with the acceleration changing in association with the change in the torque, so that an appropriate level of assist power in accordance with the load during running is generated.

In a preferred embodiment of the present invention, a magnitude of the torque generated at the crankshaft by the human power of the rider applied to the pedal may increase and decrease in accordance with the rotation of the crankshaft. The controller may change the magnitude of the assist power to be generated by the electric motor in accordance with a change in the acceleration between an adjacent ridge and trough of the torque that increases and decreases.

In the case in which the load during running is heavy, the acceleration is decreased significantly at the timing when the torque generated at the crankshaft by the human power applied to the pedal is decreased. Therefore, the change in the acceleration between the adjacent ridge and trough of the torque is increased. In the case in which the load during running is light, the acceleration is not decreased much at a time when the torque generated at the crankshaft by the human power applied to the pedal is decreased. Therefore, the change in the acceleration between the adjacent ridge and trough of the torque is decreased. The magnitude of the assist power to be generated by the electric motor may be changed in accordance with the change in the acceleration between the adjacent ridge and trough of the torque, so that an appropriate level of assist power in accordance with the heavy load is generated.

In a preferred embodiment of the present invention, a magnitude of the torque generated at the crankshaft by the human power of the rider applied to the pedal may increase and decrease in accordance with the rotation of the crankshaft. The controller may determine a difference between a maximum value and a minimum value of the acceleration between an adjacent ridge and trough of the torque that increases and decreases. The controller may change the magnitude of the assist power to be generated by the electric motor in accordance with the difference between the maximum value and the minimum value of the acceleration.

The magnitude of the assist power may be changed in accordance with the difference between the maximum value and the minimum value of the acceleration between the adjacent ridge and trough of the torque, so that an appropriate level of assist power in accordance with the load during running is generated.

In a preferred embodiment of the present invention, the controller may increase the assist power to be generated by the electric motor as the change in the acceleration between the adjacent ridge and trough of the torque that increases and decreases is larger.

In the case in which the load during running is heavy, the acceleration is decreased significantly at a time when the torque generated at the crankshaft by the human power applied to the pedal is decreased. Therefore, the change in the acceleration while the crankshaft makes a half rotation is increased. In the case in which the change in the acceleration during the half rotation of the crankshaft is large, the assist power to be generated by the electric motor may be increased. With such an arrangement, an appropriate level of assist power in accordance with the heavy load is generated.

In a preferred embodiment of the present invention, the electric assist system may further include a sensor that detects the rotation of the crankshaft. The controller may change the magnitude of the assist power to be generated by the electric motor in accordance with a change in the acceleration during a half rotation of the crankshaft.

In the case in which the rider rotates the pedal with his/her foot, the magnitude of the human power of the rider applied to the pedal is changed during the half rotation of the crankshaft. The acceleration in the traveling direction of the electric assist bicycle is changed in accordance with the change in the magnitude of the human power applied to the pedal. The magnitude of the assist power may be changed in accordance with the change in the acceleration during the half rotation of the crankshaft, so that an appropriate level of assist power in accordance with the load during running is generated.

In a preferred embodiment of the present invention, the controller may determine a difference between a maximum value and a minimum value of the acceleration during the half rotation of the crankshaft. The controller may change the magnitude of the assist power to be generated by the electric motor in accordance with the difference between the maximum value and the minimum value of the acceleration.

The magnitude of the assist power may be changed in accordance with the difference between the maximum value and the minimum value of the acceleration during the half rotation of the crankshaft, so that an appropriate level of assist power in accordance with the load during running is generated.

In a preferred embodiment of the present invention, the sensor that detects the rotation of the crankshaft may be a torque sensor detecting a torque generated at the crankshaft. The controller may determine the rotation of the crankshaft based on a change in the torque.

A torque is generated at the crankshaft by the human power of the rider applied to the pedal. The magnitude of the torque generated at the crankshaft is changed in accordance with the rotation angle of the crankshaft. Based on this, the rotation of the crankshaft may be determined from a change in the magnitude of the torque. The rotation of the crankshaft may be detected by the torque sensor, and the magnitude of the assist power may be changed in accordance with the change in the acceleration during the half rotation of the crankshaft, so that an appropriate level of assist power in accordance with the load during running is generated.

In a preferred embodiment of the present invention, the sensor that detects the rotation of the crankshaft may be a rotation sensor.

The rotation of the crankshaft may be detected by the rotation sensor, and the magnitude of the assist power may be changed in accordance with the change in the acceleration during the half rotation of the crankshaft. With such an arrangement, an appropriate level of assist power in accordance with the load during running is generated.

In a preferred embodiment of the present invention, the controller may increase the assist power to be generated by the electric motor in the case in which the difference between the maximum value and the minimum value of the acceleration is a first predetermined value or larger.

In the case in which the load during running is heavy, the acceleration is decreased significantly at the timing when the torque generated at the crankshaft by the human power applied to the pedal is decreased. Therefore, the difference between the maximum value and the minimum value of the acceleration is increased. In the case in which the difference between the maximum value and the minimum value of the acceleration is large, the assist power to be generated by the electric motor may be increased. With such an arrangement, an appropriate level of assist power in accordance with the heavy load is generated.

In a preferred embodiment of the present invention, the controller may decrease the assist power to be generated by the electric motor in the case in which the difference between the maximum value and the minimum value of the acceleration is smaller than a second predetermined value.

In the case in which the load during running is light, the acceleration is not decreased much at a time when the torque generated at the crankshaft by the human power applied to the pedal is decreased. Therefore, the difference between the maximum value and the minimum value of the acceleration is decreased. In the case in which the difference between the maximum value and the minimum value of the acceleration is small, the assist power to be generated by the electric motor may be decreased. With such an arrangement, an appropriate level of assist power in accordance with the light load is generated.

In a preferred embodiment of the present invention, the controller may store, in advance, a table in which values of the difference between the maximum value and the minimum value of the acceleration are divided into a plurality of ranges. The controller may change the magnitude of the assist power to be generated by the electric motor in accordance with the range, among the plurality of ranges, to which the difference between the maximum value and the minimum value of the acceleration determined by the acceleration sensor belongs.

The magnitude of the assist power may be changed in accordance with the range to which the difference between the maximum value and the minimum value of the acceleration belongs, so that an appropriate level of assist power in accordance with the load during running is generated.

In a preferred embodiment of the present invention, the plurality of ranges may include a first range and a second range, which is a range of larger values of the difference than the values in the first range. In the case in which the difference is a value belonging to the second range, the controller may increase the assist power to be generated by the electric motor as compared with the assist power in the case in which the difference is a value belonging to the first range.

In the case in which the load during running is heavy, the acceleration is decreased significantly at the timing when the torque generated at the crankshaft by the human power applied to the pedal is decreased. Therefore, the difference between the maximum value and the minimum value of the acceleration is increased. In the case in which the difference between the maximum value and the minimum value of the acceleration is large, the magnitude of the assist power to be generated by the electric motor may be increased. With such an arrangement, an appropriate level of assist power in accordance with the heavy load is generated.

In a preferred embodiment of the present invention, the controller may store, in advance, a plurality of assist modes different from each other in the relationship between the human power of the rider and the assist power, and a table in which values of the difference between the maximum value and the minimum value of the acceleration are divided into a plurality of ranges. The controller may change the assist mode in accordance with the range, among the plurality of ranges, to which the difference between the maximum value and the minimum value of the acceleration determined by the acceleration sensor belongs.

The assist mode may be changed in accordance with the range to which the difference between the maximum value and the minimum value of the acceleration belongs, so that an appropriate level of assist power in accordance with the load during running is generated.

In a preferred embodiment of the present invention, the plurality of ranges may include a first range and a second range, which is a range of larger values of the difference than the values in the first range. The plurality of assist modes may include a first assist mode and a second assist mode, in which the assist power provided for the human power of the rider is larger than in the first mode. In the case in which the difference between the maximum value and the minimum value of the acceleration determined by the acceleration sensor belongs to the first range, the controller may cause the electric motor to generate an assist power in accordance with the first assist mode. In the case in which the difference between the maximum value and the minimum value of the acceleration determined by the acceleration sensor belongs to the second range, the controller may cause the electric motor to generate an assist power in accordance with the second assist mode.

In the case in which the difference between the maximum value and the minimum value of the acceleration is large, the electric motor may be controlled in the assist mode in which the assist power provided for the human power of the rider is large. With such an arrangement, an appropriate level of assist power in accordance with the load is generated.

In a preferred embodiment of the present invention, the electric assist system may further include a sensor that detects the rotation of the crankshaft; and a sensor that detects a running speed of the electric assist vehicle. The controller may determine whether or not conditions are fulfilled that the number of rotations of the crankshaft is a predetermined number or larger, the running speed of the electric assist vehicle is a predetermined speed or higher, and the difference between the maximum value and the minimum value of the acceleration is smaller than a predetermined value. When it is determined that the conditions are fulfilled, the controller may decrease the assist power to be generated by the electric motor.

In the case in which the speed at which the rider rotates the pedal is high and the vehicle speed is high, the speed of the rotation transmitted from the electric motor to the synthesis mechanism is increased. In this case, the load applied on the foot rotating the pedal may become excessively light and thus the rider may feel uncomfortable. In the state in which the electric motor rotates at a high speed and the pedal force applied by the rider to the pedal is small, the difference between the maximum value and the minimum value of the acceleration is decreased. In the case in which conditions are fulfilled that the number of rotations of the crankshaft is a predetermined number or larger, that the running speed is a predetermined speed or higher, and that the difference between the maximum value and the minimum value of the acceleration is smaller than a predetermined value, the assist power is decreased. The load applied to the foot of the rider rotating the pedal is increased by the degree by which the assist power is decreased. In this manner, the load applied to the foot rotating the pedal is suppressed from becoming excessively light and thus the uncomfortable feeling of the rider is alleviated.

In a preferred embodiment of the present invention, the electric assist system may further include a sensor that detects the rotation of the crankshaft; and a sensor that detects a running speed of the electric assist vehicle. The controller may determine whether or not conditions are fulfilled that the number of rotations of the crankshaft is a predetermined number or larger, the running speed of the electric assist vehicle is a predetermined speed or higher, and the acceleration is of a predetermined value or larger. When it is determined that the conditions are fulfilled, the controller may decrease the assist power to be generated by the electric motor.

In the case in which the speed at which the rider of the electric assist bicycle rotates the pedal is high, the vehicle speed is high, and the rider is rotating the pedal in the state in which the acceleration in the traveling direction of the vehicle is large, the speed of the rotation transmitted from the electric motor to the synthesis mechanism is increased. When the rider stops increasing the speed of rotating the pedal while the electric motor is rotated at a high speed, the load applied on the foot rotating the pedal may become excessively light and thus the rider may feel uncomfortable. In the case in which the conditions are fulfilled that the number of rotations of the crankshaft is a predetermined number or larger, that the running speed is a predetermined speed or higher, and that the acceleration is of a predetermined value or larger, the assist power is decreased in advance. The load applied to the foot of the rider rotating the pedal is increased by the degree by which the assist power is decreased. In this manner, the load applied on the foot of the rider when the rider stops increasing the speed of rotating the pedal is suppressed from becoming excessively light and thus the uncomfortable feeling of the rider is alleviated.

In a preferred embodiment of the present invention, the electric assist system may further include a sensor that detects the rotation of the crankshaft; and a sensor that detects a running speed of the electric assist vehicle. The controller may determine whether or not conditions are fulfilled that the number of rotations of the crankshaft is a predetermined number or larger, that the running speed of the electric assist vehicle is a predetermined speed or higher, and that the acceleration becomes a first predetermined value or larger and then becomes a value smaller than a second predetermined value which is smaller than the first predetermined value. When it is determined that the conditions are fulfilled, the controller may decrease the assist power to be generated by the electric motor.

In the case in which the speed at which the rider of the electric assist bicycle rotates the pedal is high, the vehicle speed is high, and the rider is rotating the pedal in the state in which the acceleration in the traveling direction of the vehicle is large, the speed of the rotation transmitted from the electric motor to the synthesis mechanism is increased. When the rider stops increasing the speed of rotating the pedal while the electric motor is rotated at a high speed, the load applied on the foot rotating the pedal may become excessively light and thus the rider may feel uncomfortable. As the rider decreases the ratio at which the speed of rotating the pedal is increased, the acceleration in the traveling direction of the vehicle is decreased accordingly. Such a decrease in the acceleration which was once increased indicates that a phenomenon may occur later that the load applied on the foot rotating the pedal becomes excessively light. In the case in which the conditions are fulfilled that the number of rotations of the crankshaft is a predetermined number or larger, that the running speed is a predetermined speed or higher, and that the acceleration becomes the first predetermined value or larger and then becomes a value smaller than the second predetermined value, the assist power is decreased. The load applied to the foot of the rider rotating the pedal is increased by the degree by which the assist power is decreased. In this manner, the load applied on the foot of the rider when the rider stops increasing the speed of rotating the pedal is suppressed from becoming excessively light and thus the uncomfortable feeling of the rider is alleviated.

In a preferred embodiment of the present invention, the electric assist system may further include a sensor that detects the rotation of the crankshaft; and a sensor that detects a running speed of the electric assist vehicle. The controller may determine whether or not a condition is fulfilled that a predetermined time period has elapsed in the state in which the number of rotations of the crankshaft is a predetermined number or larger, the running speed of the electric assist vehicle is a predetermined speed or higher, and the acceleration is of a predetermined value or larger. When it is determined that the condition is fulfilled, the controller may decrease the assist power to be generated by the electric motor.

In the case in which the speed at which the rider of the electric assist bicycle rotates the pedal is high, the vehicle speed is high, and the rider is rotating the pedal in the state in which the acceleration in the traveling direction of the vehicle is large, the speed of the rotation transmitted from the electric motor to the synthesis mechanism is increased. When the rider stops increasing the speed of rotating the pedal while the electric motor is rotated at a high speed, the load applied on the foot rotating the pedal may become excessively light and thus the rider may feel uncomfortable. In the case in which a predetermined time period has elapsed in the state in which the number of rotations of the crankshaft is a predetermined number or larger, the running speed is a predetermined speed or higher, and the acceleration is of a predetermined value or larger, the assist power is decreased. The load applied to the foot of the rider rotating the pedal is increased by the degree by which the assist power is decreased. In this manner, the load applied on the foot of the rider when the rider stops increasing the speed of rotating the pedal is suppressed from becoming excessively light and thus the uncomfortable feeling of the rider is alleviated.

In a preferred embodiment of the present invention, the electric assist vehicle includes a plurality of assist modes different from each other in the relationship between the human power of the rider and the assist power. When it is determined that the conditions or the condition are(is) fulfilled, the controller may control the electric motor to generate an assist power smaller than the assist power calculated based on the assist mode currently set.

When it is determined that the above-described conditions or condition are(is) fulfilled, the controller decreases the assist power to be generated by the electric motor as compared with the assist power during a normal control. In this manner, the load applied on the foot rotating the pedal is suppressed from becoming excessively light and thus the uncomfortable feeling of the rider is alleviated.

An electric assist vehicle according to a preferred embodiment of the present invention includes the above-described electric assist system. The electric assist vehicle including the electric assist system according to a preferred embodiment of the present invention may generate an appropriate level of assist power in accordance with the load during running.

According to an illustrative preferred embodiment of the present invention, the magnitude of the assist power to be generated by the electric motor is changed in accordance with the change in the acceleration that is associated with an operation of the rider rotating the pedal. Because of the structure of the bicycle of allowing the rider to have his/her foot step on, and rotate, the pedal, the magnitude of the human power of the rider applied to the pedal is changed in accordance with the rotation angle of the crankshaft while the rider is rotating the pedal. Therefore, the acceleration in the traveling direction of the electric assist bicycle is changed in accordance with the rotation angle of the crankshaft while the rider is rotating the pedal. The magnitude of the assist power may be changed in accordance with the acceleration changing in association with the operation of the rider rotating the pedal, so that an appropriate level of assist power in accordance with the load during running is generated.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, electric assist systems and electric assist vehicles according to preferred embodiments of the present invention will be described with reference to the attached drawings. In the description of the preferred embodiments, like elements will bear like reference signs, and overlapping descriptions will be omitted. In the preferred embodiments of the present invention, the terms front, rear, left, right, up and down respectively refer to front, rear, left, right, up and down as seen from a rider, of the electric assist vehicle, sitting on a saddle (seat) as facing a handle. The following preferred embodiments are examples, and the present invention is not limited to any of the following preferred embodiments.

Figure 1:
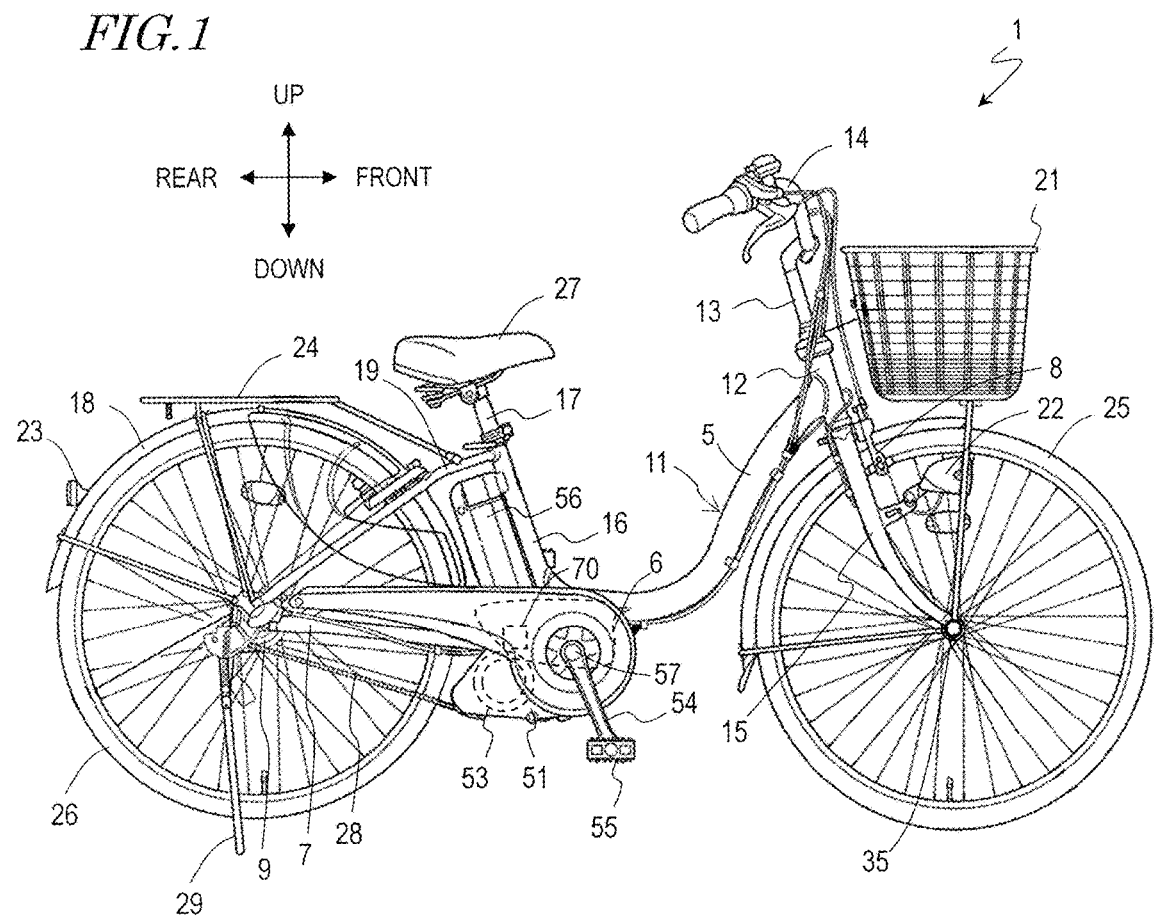
FIG. 1 is a side view showing an electric assist bicycle according to a preferred embodiment of the present invention.

FIG. 1 is a side view showing an electric assist bicycle 1 according to a preferred embodiment of the present invention. The electric assist bicycle 1 includes a driving unit 51 described in detail below. The electric assist bicycle 1 is an example of an electric assist vehicle according to a preferred embodiment of the present invention. The driving unit 51 is an example of electric assist system according to a preferred embodiment of the present invention.

The electric assist bicycle 1 includes a vehicle frame 11 extending in a front-rear direction. The vehicle frame 11 includes a head pipe 12, a down tube 5, a bracket 6, a chain stay 7, a seat tube 16, and a seat stay 19. The head pipe 12 is located at a front end of the vehicle frame 11. A handle stem 13 is rotatably inserted into the head pipe 12. A handle 14 is secured to a top end of the handle stem 13. A front fork 15 is secured to a bottom end of the handle stem 13. A front wheel 25, which is a steering wheel, is rotatably supported at a bottom of the front fork 15. The front fork 15 is provided with a brake 8 that brakes the front wheel 25. A front basket 21 is provided on the front of the head pipe 12. The front fork 15 is provided with a head lamp 22.

The down tube 5 extends obliquely rearward and downward from the head pipe 12. The seat tube 16 extends upward from a rear end of the down tube 5. The chain stay 7 extends rearward from a bottom end of the seat tube 16.

The bracket 6 connects the rear end of the down tube 5, the bottom end of the seat tube 16 and a front end of the chain stay 7 to each other.

A seat post 17 is inserted into the seat tube 16, and a saddle 27, on which a rider is to sit, is provided at a top end of the seat post 17. A rear portion of the chain stay 7 supports a rear wheel 26, which is a driving wheel, such that the rear wheel 26 is rotatable. A brake 9 that brakes the rear wheel 26 is provided to the rear of the chain stay 7. A stand 29 is provided to the rear of the chain stay 7. While being parked, the electric assist bicycle 1 is held standing by the stand 29. The seat stay 19 extends obliquely rearward and downward from a top portion of the seat tube 16. A bottom end of the seat stay 19 is connected with the rear portion of the chain stay 7. The seat stay 19 supports a rack 24 provided to the rear of the saddle 27 and also supports a fender 18 covering a top portion of the rear wheel 26. A tail lamp 23 is provided to the rear of the fender 18.

The bracket 6, which is located on the vehicle frame 11, at a position in the vicinity of the center of the vehicle, is provided with the driving unit 51. The driving unit 51 includes an electric motor 53, a crankshaft 57, and a controller 70. A battery 56 that supplies power to the electric motor 53 and the like is mounted on the bracket 6. The battery 56 may be supported by the seat tube 16.

The crankshaft 57 is supported throughout the driving unit 51 in a left-right direction. Crank arms 54 are provided at both of two ends of the crankshaft 57. A pedal 55 is rotatably provided at a tip of each of the crank arms 54.

The controller 70 controls an operation of the electric assist bicycle 1. The controller 70 typically includes a semiconductor integrated circuit, such as a microcontroller, a signal processor or the like, that is configured or programmed to process digital signals. A rotation output of the crankshaft 57 generated when the rider steps on, and rotates, the pedal 55 with his/her foot is transmitted to the rear wheel 26 via a chain 28. The controller 70 controls the electric motor 53 to generate a driving assist output in accordance with the rotation output of the crankshaft 57. The assist power generated by the electric motor 53 is transmitted to the rear wheel 26 via the chain 28. Instead of the chain 28, a belt, a shaft or the like may be used.

Now, a specific structure of the controller 70, and a group of sensors that generate a signal usable to operate the controller 70, will be described in detail.

Figure 2A:
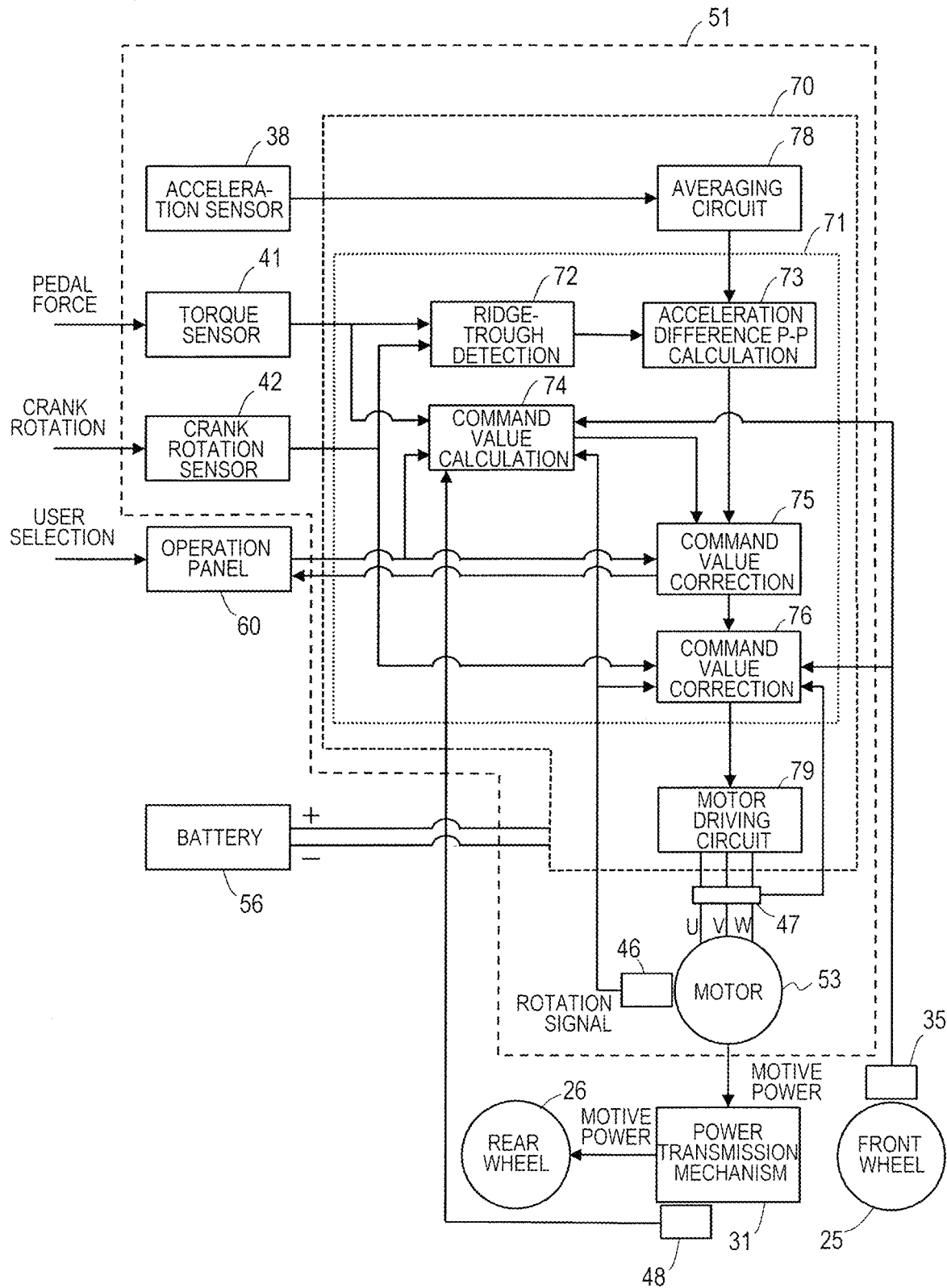
FIG. 2A is a hardware block diagram of the electric assist bicycle according to a preferred embodiment of the present invention.

FIG. 2A is a hardware block diagram of the electric assist bicycle 1, mainly showing a structure of the controller 70. FIG. 2A also shows the controller 70 and a peripheral environment thereof. In the peripheral environment, for example, various sensors that output a signal to the controller 70 and the driving motor 53 driven as a result of the operation of the controller 70 are shown.

First, the peripheral environment of the controller 70 will be described.

As described above, the controller 70 is included in the driving unit 51. FIG. 2A shows an acceleration sensor 38, a torque sensor 41, a crank rotation sensor 42, and the electric motor 53, which are also included in the driving unit 51. The controller 70 includes a calculation circuit 71, an averaging circuit 78, and a motor driving circuit 79. The calculation circuit 71 performs a calculation to rotate the electric motor 53 at an assist ratio in accordance with a difference P–P between a maximum value and a minimum value of an acceleration, and outputs a control signal.

The acceleration sensor 38 detects an acceleration of a vehicle main body of the electric assist bicycle 1. The acceleration sensor 38 is, for example, a three-axis acceleration sensor of a piezo resistance type, an electrostatic capacitance type, or a heat sensing type. One such three-axis acceleration sensor is capable of measuring the acceleration in each of three axial directions perpendicular to each other (X-axis, Y-axis and Z-axis directions).

In this specification, the three axial directions perpendicular to each other (X-axis, Y-axis, and Z-axis directions) are not of an absolute coordinate system but are of a relative coordinate system. More specifically, the three axial directions perpendicular to each other (X-axis, Y-axis and Z-axis directions) are respectively the front-rear direction, the left-right direction, and an up-down direction of the electric assist bicycle 1 including the acceleration sensor 38. The forward direction of the electric assist bicycle 1 matches a traveling direction thereof, and the up-down direction of the electric assist bicycle 1 matches a direction perpendicular to a road surface. Therefore, the X axis, the Y axis and the Z axis of the electric assist bicycle 1 running on a flat road may not match the X axis, the Y axis and the Z axis of the electric assist bicycle 1 running on a slope.

In order to allow the acceleration sensor 38 to measure acceleration values in the front-rear direction, the left-right direction and the up-down direction of the electric assist bicycle 1, various methods are conceivable. For example, the acceleration sensor 38 may be attached to the driving unit 51 such that the X axis, the Y axis and the Z axis of the acceleration sensor 38 respectively match the front-rear direction, the left-right direction, and the up-down direction of the vehicle. Such a manner of attaching the acceleration sensor 38 indicates that the acceleration sensor 38 is placed on a horizontal surface.

The acceleration sensor 38 is placed on an electronic circuit board (not shown). Also placed on the electronic circuit board is a control portion including various IC chips such as a power source that transmits power from the battery 56 to each of electronic components of the electric assist bicycle 1, the calculation circuit 71, the motor driving circuit 79, and the like.

The above-described electronic circuit board may be located as vertically standing in the driving unit 51 for a reason of size restriction or the like. In this case, the acceleration sensor 38 is not placed on the horizontal surface. Therefore, the acceleration sensor 38 needs to output a signal that is different from the acceleration value that is to be output in the case in which the acceleration sensor 38 is placed on the horizontal surface, the signal being different by a magnitude corresponding to the angle at which the acceleration sensor 38 is attached to the driving unit 51. In other words, detection direction correction needs to be performed. A specific processing content of the detection direction correction is known, and will not be described in detail in this specification. The output values of the acceleration sensor 38 may be corrected in advance, so that the output values of the acceleration sensor 38 regarding the X axis, the Y axis and the Z axis are measured as the acceleration values of the electric assist bicycle 1 in the front-rear direction, the left-right direction and the up-down direction.

It is preferred that the acceleration sensor 38 is located at a position close to the center of gravity of the electric assist bicycle 1. As understood from FIG. 1, the driving unit 51 is located close to the pedals 55. Therefore, the acceleration sensor 38 is considered to be located close to the center of gravity of the electric assist bicycle 1.

In order to prevent the acceleration sensor 38 from being restricted by the direction in which the electronic circuit board is installed, it is conceivable to provide the acceleration sensor 38 separately from the electronic circuit board. In the case in which the acceleration sensor 38 and the electronic circuit board are separate from each other, the acceleration sensor 38 may be located, with higher precision, closer to the center of gravity of the electric assist bicycle 1 in a still state.

The three-axis acceleration sensor is an example of the acceleration sensor 38. A two-axis acceleration sensor capable of measuring an acceleration Gx in the X-axis direction and an acceleration Gz in the Z-axis direction may be used as the acceleration sensor 38. A monoaxial acceleration sensor capable of measuring the acceleration Gx in the X-axis direction may be used as the acceleration sensor 38. The acceleration sensor 38 merely needs to be capable of measuring at least the acceleration Gx in the X-axis direction along the traveling direction of the vehicle. A plurality of acceleration sensors may be used to measure accelerations in different axial directions respectively. In the example shown in FIG. 2A, the acceleration sensor 38 is located in the driving unit 51. The position of the acceleration sensor 38 is not limited to this, and the acceleration sensor 38 may be located at any position in the electric assist bicycle 1.

The torque sensor 41 detects the human power (pedal force) applied by the rider to each of the pedals 55 as a torque generated at the crankshaft 57. The torque sensor 41 is, for example, a magnetostrictive torque sensor. The torque sensor 41 outputs a voltage signal having an amplitude in accordance with the magnitude of the detected torque. The torque sensor 41 may include a torque calculation circuit (not shown) that converts the voltage signal into a torque. The torque calculation circuit converts, for example, an output analog voltage signal into a digital voltage signal. The magnitude of the detected torque is output as the magnitude of a value of the digital voltage signal. As described above, the torque sensor 41 may output an analog signal or a digital signal.

The crank rotation sensor 42 detects a rotation angle of the crankshaft 57. For example, the crank rotation sensor 42 detects the rotation of the crankshaft 57 at every predetermined angle and outputs a rectangular wave signal or a sine wave signal. The output signal may be used to calculate a rotation angle and a rotation speed of the crankshaft 57. For example, a plurality of magnetic bodies having magnetic poles (N pole, S pole) are located around the crankshaft 57. A Hall sensor located at a fixed position converts a change in the magnetic field polarity caused by the rotation of the crankshaft 57 into a voltage signal. The calculation circuit 71 uses the signal that is output from the Hall sensor to count the changes in the magnetic field polarity and calculates the rotation angle and the rotation speed of the crankshaft 57. The crank rotation sensor 42 may include a calculation circuit that calculates the rotation angle and the rotation speed of the crankshaft 57 based on the obtained signal.

The motor driving circuit 79 is, for example, an inverter. The motor driving circuit 79 supplies, from the battery 56 to the electric motor 53, an electric current having an amplitude, a frequency, a flow direction or the like in accordance with a motor electric current command value from the calculation circuit 71. The electric motor 53 supplied with the electric current rotates to generate an assist power of a determined magnitude. An electric current sensor 47 detects a value of the electric current flowing in the electric motor 53 and outputs the value to the controller 70. The controller 70 uses the signal that is output from the electric current sensor 47 to perform feedback control.

The electric motor 53 shown in FIG. 2A is a three-phase motor including three-phase (U phase, V phase and W phase) coils. The electric motor 53 is, for example, a brushless DC motor.

In the example shown in FIG. 2A, the electric current sensor 47 detects the electric current flowing in each of the coils of the three phases. Alternatively, the electric current sensor 47 may detect the electric current flowing in each of the coils of only two phases. In the three-phase energization control, a sum of values of the electric currents flowing in the coils of the three phases is theoretically zero. This relationship may be used to determine the value of the electric current flowing in the coil of the remaining phase, from the values of the electric currents flowing in the coils of the two phases. In this manner, the value of the electric current flowing in each of the coils of the three phases is acquired.

The rotation of the electric motor 53 is detected by a motor rotation sensor 46. The motor rotation sensor 46 is, for example, a Hall sensor, and detects the magnetic field generated by a rotor (not shown) of the electric motor 53 while the rotor is rotating and outputs a voltage signal in accordance with the strength or the polarity of the magnetic field. In the case in which the electric motor 53 is a brushless DC motor, a plurality of permanent magnets are located in the rotor. The motor rotation sensor 46 converts a change in the magnetic field polarity caused by the rotation of the rotor into a voltage signal. The calculation circuit 71 uses the signal that is output from the motor rotation sensor 46 to count the changes in the magnetic field polarity and calculates the rotation angle and the rotation speed of the rotor.

The assist power generated by the electric motor 53 is transmitted to the rear wheel 26 via the power transmission mechanism 31. The power transmission mechanism 31 includes a group of components including the chain 28, a driven sprocket 32, a driving shaft 33, a transmission mechanism 36, a one-way clutch 37, and the like described below with reference to FIG. 2B. The power transmission mechanism 31 may be considered to include a decelerator 45, a one-way clutch 44, a synthesis mechanism 58 and a drive sprocket 59 included in the driving unit 51. With the above-described structure, the human power of the rider of the electric assist bicycle 1 is assisted.

The calculation circuit 71 receives a detection signal that is output from each of the acceleration sensor 38, the torque sensor 41 and the crank rotation sensor 42 and an operation signal that is output from the operation panel 60, and determines the magnitude of the assist power. The calculation circuit 71 transmits a motor electric current command value, based on which the assist power of the determined magnitude is to be generated, to the motor driving circuit 79. As a result, the electric motor 53 rotates, and the motive power of the electric motor 53 is transmitted to the rear wheel 26. In this manner, the motive power of the electric motor 53 is added to the human power of the rider.

In general, in the case in which the detection signal that is output from any of the various sensors is an analog signal, an A/D conversion circuit (not shown) that converts an analog signal into a digital signal may be provided on a stage before the detection signal is input to the controller 70. The A/D conversion circuit may be provided in each of the sensors, or may be provided on a signal path, in the driving unit 51, between each of the sensors and the controller 70. Alternatively, the A/D conversion circuit may be provided in the controller 70.

The magnitude of the assist power to be generated by the electric motor 53 may change in accordance with the assist mode currently selected. The assist mode may be selected by the rider operating the operation panel 60.

The operation panel 60 is attached to the handle 14 (FIG. 1) of the electric assist bicycle 1 and is connected with the controller 70 by, for example, a wire cable. The operation panel 60 transmits an operation signal, representing the operation made by the rider, to the controller 70, and receives various information to be presented to the rider from the controller 70.

Figure 2B:
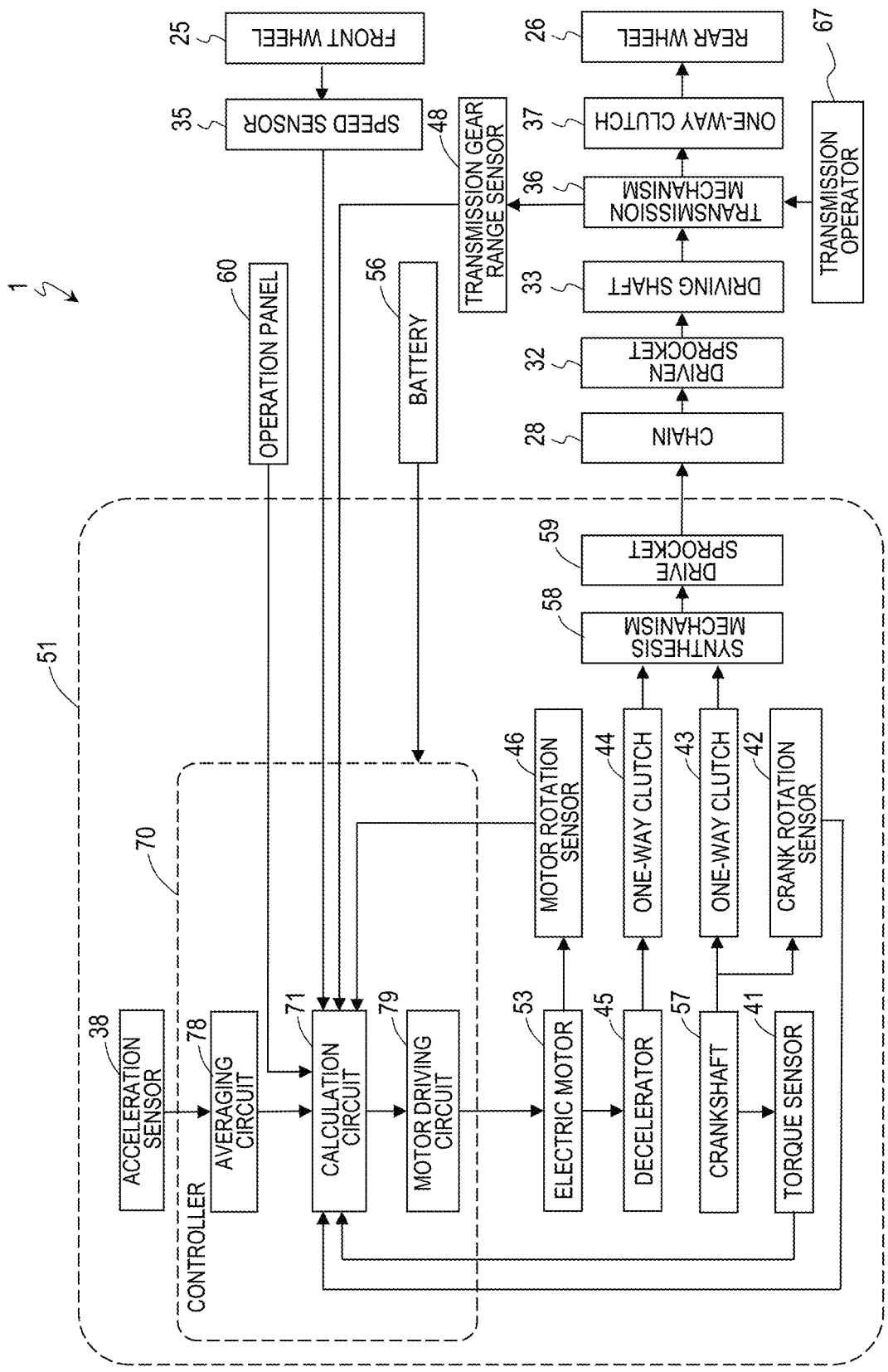
FIG. 2B is a block diagram showing a mechanical structure of the electric assist bicycle according to a preferred embodiment of the present invention.

Now, a power transmission route in the electric assist bicycle 1 will be described. FIG. 2B is a block diagram showing an example of mechanical structure of the electric assist bicycle 1.

When the rider steps on the pedal 55 to rotate the crankshaft 57, the rotation of the crankshaft 57 is transmitted to the synthesis mechanism 58 via the one-way clutch 43. The rotation of the electric motor 53 is transmitted to the synthesis mechanism 58 via the decelerator 45 and the one-way clutch 44.

The synthesis mechanism 58 includes, for example, a cylindrical member, and the crankshaft 57 is located inside the cylindrical member. The drive sprocket 59 is attached to the synthesis mechanism 58. The synthesis mechanism 58 rotates centered around the same rotation shaft as that of the crankshaft 57 and the drive sprocket 59.

The one-way clutch 43 transmits a forward rotation of the crankshaft 57 to the synthesis mechanism 58, but does not transmits a reverse rotation of the crankshaft 57 to the synthesis mechanism 58. The one-way clutch 44 transmits, to the synthesis mechanism 58, a rotation of the electric motor 53 that is to rotate the synthesis mechanism 58 in a forward direction, but does not transmit a rotation of the electric motor 53 that is to rotate the synthesis mechanism 58 in a reverse direction. In the case in which the rider steps on the pedal 55 to rotate the synthesis mechanism 58 while the electric motor 53 is at a stop, the one-way clutch 44 does not transmit the rotation to the electric motor 53. The pedal force applied by the rider to the pedal 55 and the assist power generated by the electric motor 53 are transmitted to the synthesis mechanism 58 to be synthesized. The resultant force synthesized by the synthesis mechanism 58 is transmitted to the chain 28 via the drive sprocket 59.

The rotation of the chain 28 is transmitted to the driving shaft 33 via the driven sprocket 32. The rotation of the driving shaft 33 is transmitted to the rear wheel 26 via the transmission mechanism 36 and the one-way clutch 37.

The transmission mechanism 36 changes the transmission gear range in accordance with the operation of the rider on a transmission operator 67. The transmission operator 67 is attached to, for example, the handle 14 (FIG. 1). In the case in which the rotation speed of the driving shaft 33 is higher than the rotation speed of the rear wheel 36, the one-way clutch 37 transmits the rotation of the driving shaft 33 to the rear wheel 26. In the case in which the rotation speed of the driving shaft 33 is lower than the rotation speed of the rear wheel 36, the one-way clutch 37 does not transmit the rotation of the driving shaft 33 to the rear wheel 26.

With the above-described power transmission route, the pedal force applied by the rider on the pedal 55 and the assist power generated by the electric motor 53 are transmitted to the rear wheel 26.

A mechanism that synthesizes the pedal force of the rider and the assist power generated by the electric motor 53 is not limited to the synthesis mechanism 58 described above, which rotates centered around the same rotation shaft as that of the crankshaft 57. The pedal force and the assist power may be synthesized by the chain 28.

Figure 3:
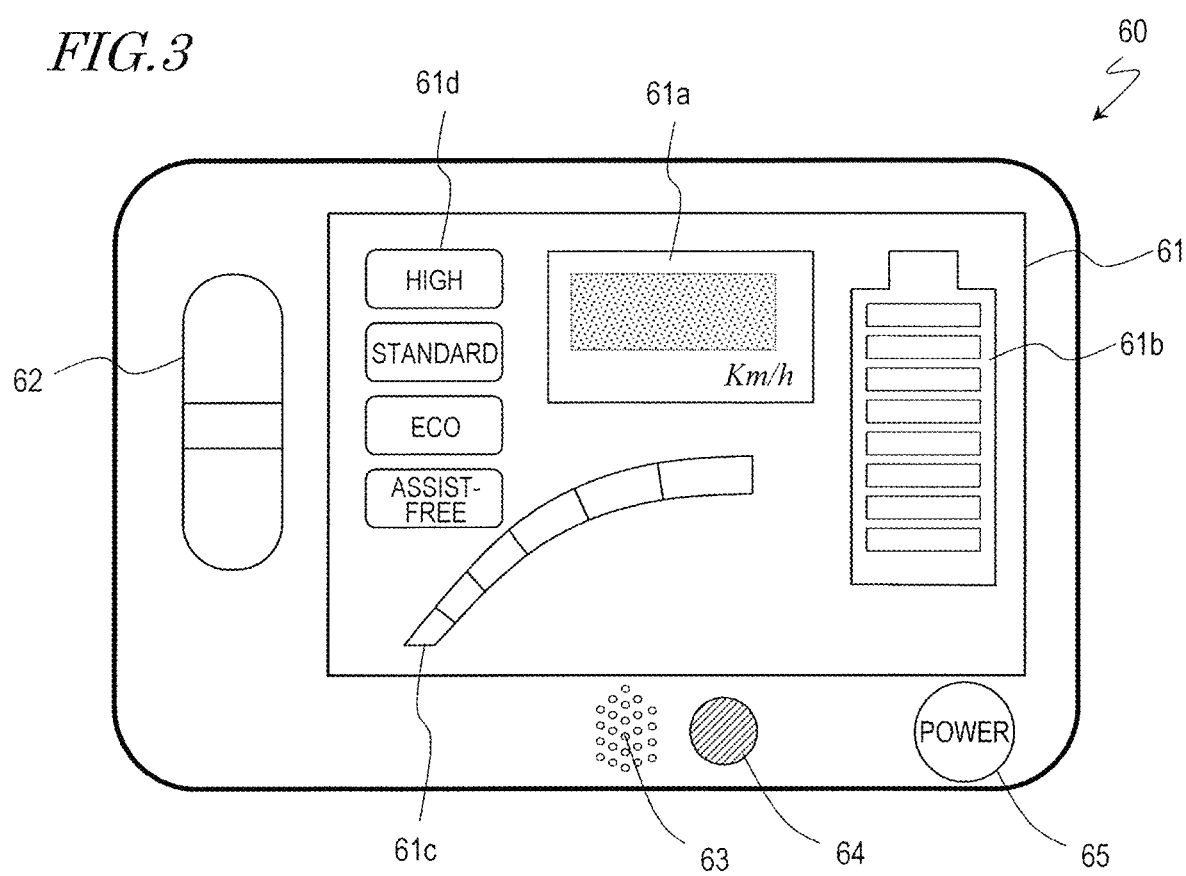
FIG. 3 is an external view of an operation panel according to a preferred embodiment of the present invention.

FIG. 3 is an illustrated external view of the operation panel 60. The operation panel 60 is attached to the handle 14, at, for example, a position close to a left grip thereof.

The operation panel 60 includes a display panel 61, an assist mode operation switch 62, and a power source switch 65.

The display panel 61 is, for example, a liquid crystal panel. The display panel 61 displays information provided by the controller 70 that includes the speed of the electric assist bicycle 1, the remaining capacitance of the battery 56, information on the range in which the assist ratio is to be changed, the assist mode, and other information on the running.

The display panel 61 includes a speed display area 61a, a battery remaining capacitance display area 61b, an assist ratio change range display area 61c, and an assist mode display area 61d. The display panel 61 acts as a notification device that notifies the rider of such information and the like. In this example, the information is displayed. Alternatively, an audio signal may be output to notify the rider of the information.

The speed display area 61a displays the speed of the electric assist bicycle 1 by numerical figures. In this preferred embodiment, a vehicle speed of the electric assist bicycle 1 is detected by a speed sensor 35 provided on the front wheel 25.

The battery remaining capacitance display area 61b displays the remaining capacitance of the battery 56 by segments based on information on the battery remaining capacitance that is output from the battery 56 to the controller 70. With such a display, the rider intuitively grasps the remaining capacitance of the battery 56.

The assist ratio change range display area 61c displays the range, set by the controller 70, in which the assist ratio is to be changed. The range is displayed by segments. The assist ratio, within the change ratio, that is currently used may be displayed.

The assist mode display area 61d displays the assist mode selected by the rider operating the assist mode operation switch 62. The assist mode is, for example, "high", "standard" or "automatic ecological". In the case in which the rider operates the assist mode operation switch 62 to select "assist mode off", the assist mode display area 61d displays "assist-free".

The assist mode selection switch 62 enables the rider to select one of the plurality of assist modes (including "assist mode off") described above. When one of the plurality of assist modes is selected, a microcontroller (not shown) provided inside the operation panel 60 transmits an operation signal, specifying the selected assist mode, to the controller 70.

The power source switch 65 is a switch by which the power source of the electric assist bicycle 1 is switched on or off. The rider presses the power source switch 65 to switch the power source of the electric assist bicycle 1 on or off.

The operation panel 60 further includes a speaker 63 that provides necessary information to the rider by an audio signal and a lamp 64 that provides necessary information to the rider by light. For example, the controller 70 changes the magnitude of the assist power to be generated by the electric motor 53 in accordance with the change in the acceleration, which is associated with the operation of the rider rotating the pedal 55. At this point, it is notified to the rider by, for example, the output of an audio signal and/or blinking of light, that the magnitude of the assist power has been changed. As a result of the notification, the rider recognizes that, for example, a large assist power has been generated. Alternatively, the handle 14 and/or the saddle 27 may be vibrated to notify the rider that the magnitude of the assist power has been changed.

While the assist power is increasing, the speaker 63 may be caused to generate an audio signal of a volume that is heard by people around the electric assist bicycle 1, or the head lamp 22 and the tail lamp 23 may be lit up or blinked. With such a structure, the people around the electric assist bicycle 1 recognize that the electric assist bicycle 1 is generating assist power larger than the usual assist power.

The assist power of the electric motor 53 is highest in the "high" mode, is lowest in the "automatic ecological" mode, and is medium in the "standard" mode in response to the crank rotation output.

In the case in which the assist mode is "standard", the electric motor 53 generates assist power when, for example, the electric assist bicycle 1 is started, is running on a flat road, or is running on an ascending slope. In the case in which the assist mode is "high", the electric motor 53 generates assist power when, for example, the electric assist bicycle 1 is started, is running on a flat road, or is running on an ascending slope, like in the case in which the assist mode is "standard". In the case in which the assist mode is "high", the electric motor 53 generates larger assist power than in the case in which the assist mode is "standard" in response to the same crank rotation output. In the case in which the assist mode is "automatic ecological", when the pedal force is small because the electric assist bicycle 1 is, for example, running on a flat road or on a descending slope, the electric motor 53 decreases the assist power as compared with in the case in which the assist mode is "standard" or stops the generation of the assist power to suppress the power consumption. In the case in which the assist mode is "assist-free mode", the electric motor 53 does not generate any assist power.

As described above, the assist power in response to the crank rotation output is varied in accordance with the assist mode described above. In this example, the assist mode is switched to any one of four stages. Alternatively, the assist mode may be switched to any of three stages or less, or any of five stages or more.

Now, an operation of changing the magnitude of the assist power to be generated by the electric motor 53 in accordance with the acceleration, which changes in association with the operation of the rider rotating the pedal 55, will be described.

Figure 4:
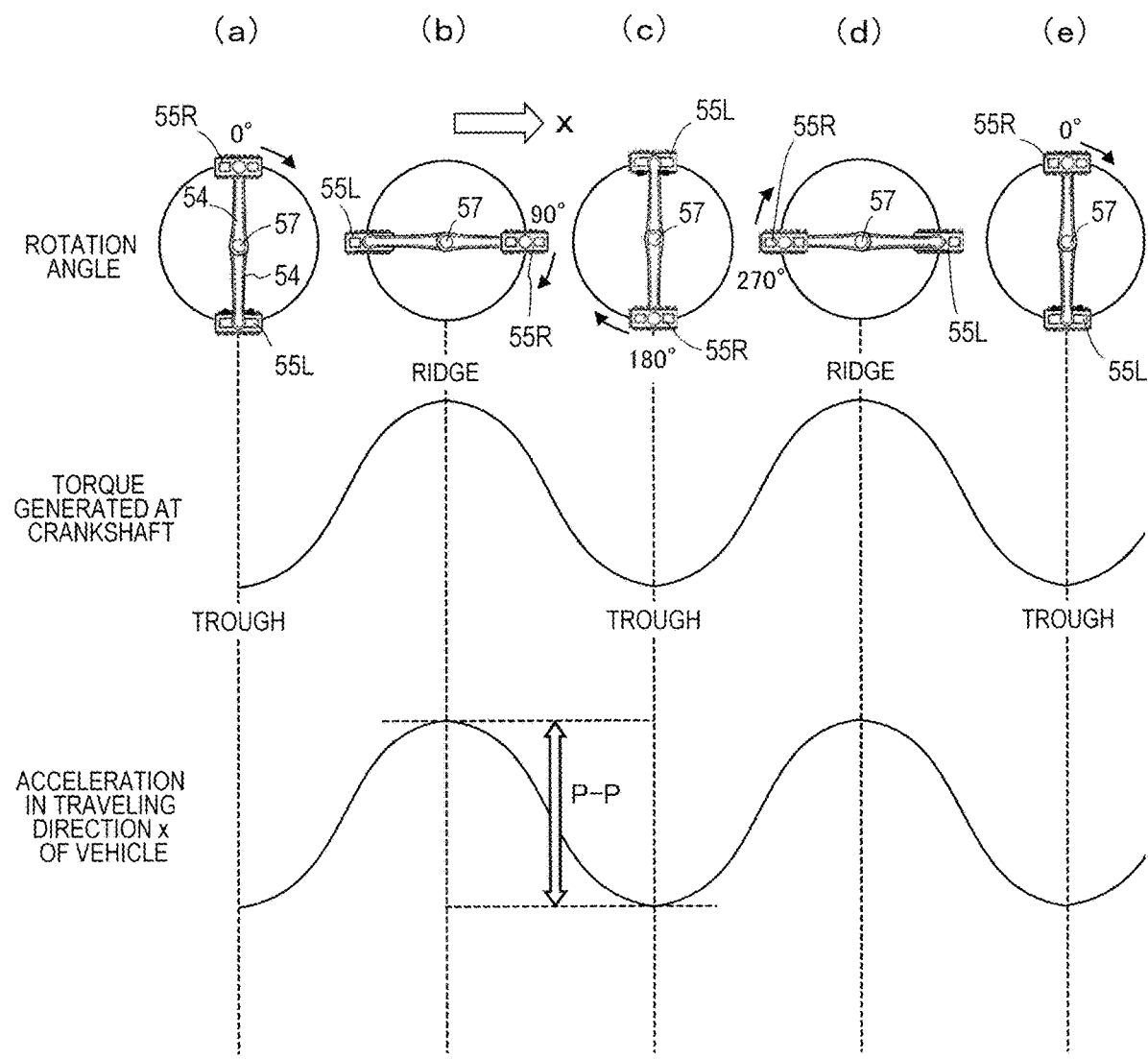
FIG. 4 shows the relationships among the rotation angle of a crankshaft, the torque generated at the crankshaft and the acceleration in a traveling direction of the vehicle according to a preferred embodiment of the present invention.

First, the relationship between the operation of the rider rotating the pedal 55 and the acceleration will be described. FIG. 4 shows the relationship among the rotation angle of the crankshaft 57, the torque generated at the crankshaft 57 and the acceleration in the traveling direction of the vehicle when the rider rotates the pedal 55. In the example shown in FIG. 4, the electric assist bicycle 1 is running on a flat road, and the direction from left to right in the figure is assumed to be a traveling direction x of the vehicle.

Because of the structure of the electric assist bicycle 1 that allows the rider to have his/her foot step on, and rotate, the pedal 55, the magnitude of the human power (pedal force) of the rider applied to the pedal 55 is increased or decreased in accordance with the position of the pedal 55, namely, the rotation angle of the crankshaft 57. The increase or decrease in the pedal force applied to the pedal 55 appears as an increase or decrease in the torque generated at the crankshaft 57. When the torque is increased or decreased, the motive power that runs the electric assist bicycle 1 is increased or decreased. Therefore, the acceleration in the traveling direction x of the electric assist bicycle 1 is increased or decreased in accordance with the increase or the decrease in the torque.

FIG. 4(*a*) shows a state in which a right pedal 55R of the electric assist bicycle 1, on which the rider puts his/her right foot, is located just above the crankshaft 57, whereas a left pedal 55L of the electric assist bicycle 1, on which the rider puts his/her left foot, is located just below the crankshaft 57. The rotation angle of the crankshaft 57 at this point is set to 0 degrees. In this state, the torque generated at the crankshaft 57 by the human power is minimum. In association with the torque, the acceleration in the traveling direction x of the vehicle (direction in which the vehicle moves forward) is also minimum.

From the state shown in FIG. 4(*a*), the rider steps on the right pedal 55R, and as a result, the rotation angle of the crankshaft 57 is increased. As the rotation angle of the crankshaft 57 is increased, the torque generated at the crankshaft 57 by the human power is gradually increased. As the torque is gradually increased, the acceleration in the traveling direction x of the vehicle is also increased.

FIG. 4(*b*) shows a state in which the right pedal 55R is located to the front, in the horizontal direction, of the crankshaft 57, whereas the left pedal 55L is located to the rear, in the horizontal direction, of the crankshaft 57. The rotation angle of the crankshaft 57 at this point is assumed to be 90 degrees. When the rotation angle is 90 degrees, the torque generated at the crankshaft 57 by the human power is maximum. In association with the torque, the acceleration in the traveling direction x of the vehicle is also maximum.

From the state shown in FIG. 4(*b*), the rotation angle of the crankshaft 57 is further increased. As the rotation angle of the crankshaft 57 is increased, the torque generated at the crankshaft 57 by the human power is gradually decreased. As the torque is gradually decreased, the acceleration in the traveling direction x of the vehicle is also decreased.

FIG. 4(*c*) shows a state in which the right pedal 55R is located just below the crankshaft 57, whereas the left pedal 55L is located just above the crankshaft 57. The rotation angle of the crankshaft 57 at this point is assumed to be 180 degrees. When the rotation angle is 180 degrees, the torque generated at the crankshaft 57 by the human power is minimum. In association with the torque, the acceleration in the traveling direction x of the vehicle is also minimum.

From the state shown in FIG. 4(*c*), the rider steps on the left pedal 55L, and as a result, the rotation angle of the crankshaft 57 is further increased. As the rotation angle of the crankshaft 57 is further increased, the torque generated at the crankshaft 57 by the human power is gradually increased. As the torque is gradually increased, the acceleration in the traveling direction x of the vehicle is also increased.

FIG. 4(*d*) shows a state in which the left pedal 55L is located to the front, in the horizontal direction, of the crankshaft 57, whereas the right pedal 55R is located to the rear, in the horizontal direction, of the crankshaft 57. The rotation angle of the crankshaft 57 at this point is assumed to be 270 degrees. When the rotation angle is 270 degrees, the torque generated at the crankshaft 57 by the human power is maximum. In association with the torque, the acceleration in the traveling direction x of the vehicle is also maximum.

From the state shown in FIG. 4(*d*), the rotation angle of the crankshaft 57 is further increased. As the rotation angle of the crankshaft 57 is increased, the torque generated at the crankshaft 57 by the human power is gradually decreased.

As the torque is gradually decreased, the acceleration in the traveling direction x of the vehicle is also decreased.

FIG. 4(e) shows a state in which the right pedal 55R is located just above the crankshaft 57, whereas the left pedal 55L is located just below the crankshaft 57. Namely, FIG. 4(e) shows a state in which the crankshaft 57 has made one rotation from the state shown in FIG. 4(a). The rotation angle of the crankshaft 57 at this point is assumed to be 0 degrees. When the rotation angle is 0 degrees, the torque generated at the crankshaft 57 by the human power is maximum. In association with the torque, the acceleration in the traveling direction x of the vehicle is also maximum.

In this manner, the torque generated at the crankshaft 57 increases or decreases in accordance with the rotation angle of the crankshaft 57. As the torque that increases and decreases, a ridge and a trough appear alternately. In synchronization with the increase and the decrease in the torque, the acceleration in the traveling direction x of the vehicle increases and decreases. In synchronization with the timings when the ridge and trough of the torque appear, a ridge and a trough appear alternately in the acceleration that increases and decreases.

In a zone between the adjacent ridge and trough of the torque, a peak of the ridge represents the maximum value of the torque in the corresponding zone. A bottom of the trough of the torque represents the minimum value of the torque in the corresponding zone. In this specification, the zone between the adjacent ridge and trough includes the peak of the ridge and the bottom of the trough.

In a zone between the adjacent ridge and trough of the acceleration, a peak of the ridge represents the maximum value of the acceleration in the corresponding zone. A bottom of the trough of the acceleration represents the minimum value of the acceleration in the corresponding zone. In synchronization with the timings at which the adjacent ridge and trough of the torque that increases and decreases appear, the maximum value and the minimum value of the acceleration appear. In this preferred embodiment, a difference P-P (Peak to Peak) between the maximum value and the minimum value of the acceleration in the zone between the adjacent ridge and trough of the torque that increases and decreases is determined, and the magnitude of the assist power to be generated by the electric motor 53 is changed in accordance with the difference P-P of the acceleration.

Figure 5:
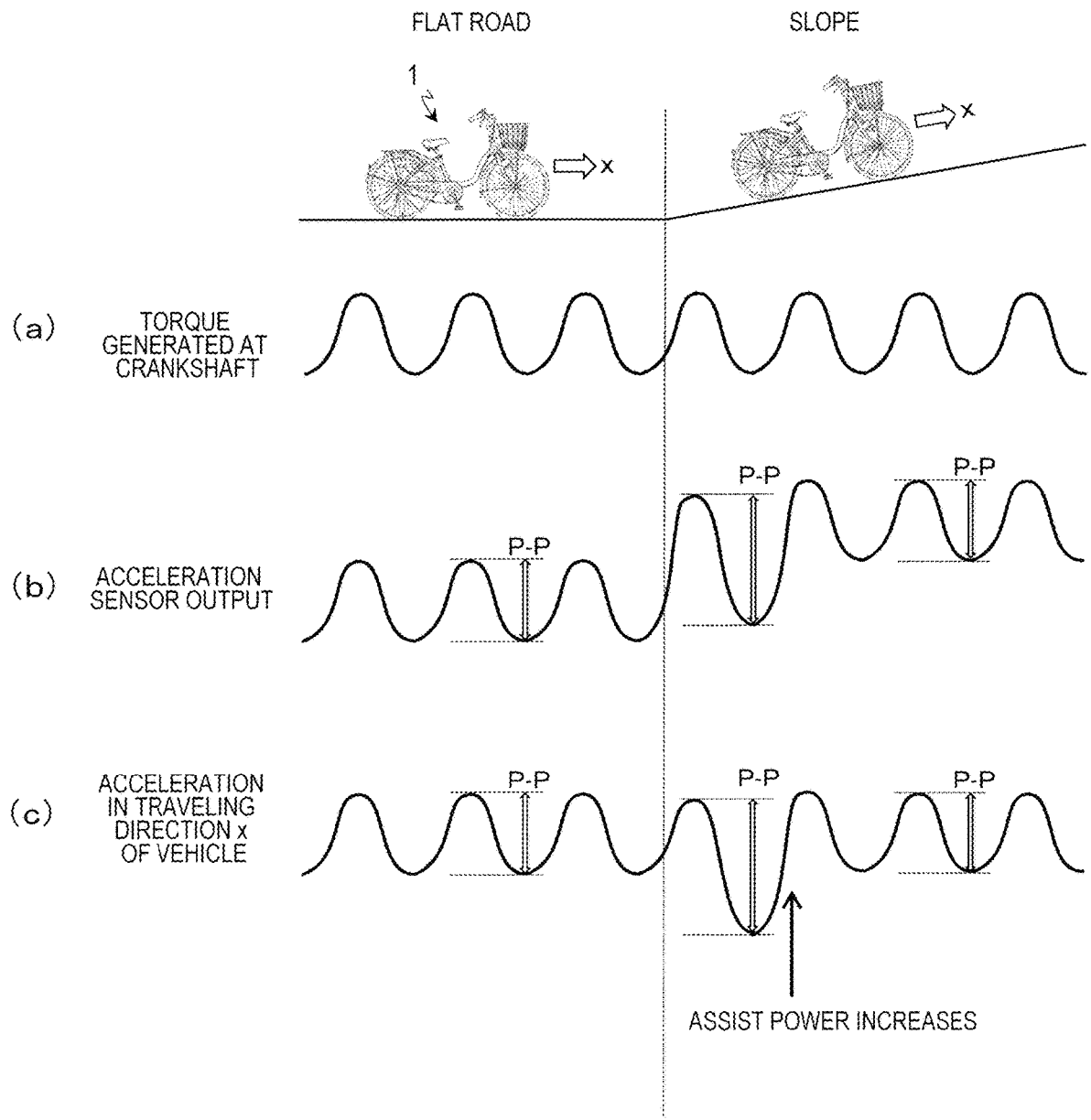
FIG. 5 shows an operation of changing the magnitude of assist power in accordance with the acceleration difference according to a preferred embodiment of the present invention.

FIG. 5 shows an operation of changing the magnitude of the assist power to be generated by the electric motor 53 in accordance with the difference P-P between the maximum value and the minimum value of the acceleration. FIG. 5(a) shows the torque generated at the crankshaft 57. FIG. 5(b) shows the output signal of the acceleration sensor 38. FIG. 5(c) shows the acceleration in the traveling direction x of the electric assist bicycle 1.

In this preferred embodiment, the acceleration in the traveling direction x of the electric assist bicycle 1 is detected by the acceleration sensor 38. The acceleration sensor 38 is constantly influenced by the gravitational force. Therefore, while the electric assist bicycle 1 is running on a slope, the value of the acceleration detected by the acceleration sensor 38 includes a component of the acceleration in the traveling direction of the vehicle and also a component of the gravitational force, in a direction going down the slope. The output signal of the acceleration sensor 38 shown in FIG. 5(b) represents a mixed value of the component of the acceleration in the traveling direction of the vehicle and the component of the gravitational force. The acceleration in the traveling direction x of the vehicle shown in FIG. 5(c) is provided as a waveform obtained as a result of removing, by a high-pass filter, the component of the gravitational force (low-frequency component of the acceleration) from the output signal of the acceleration sensor 38.

While the electric assist bicycle 1 is running on a flat road at a certain speed, the rider keeps on rotating the pedal 55 with the same magnitude of force. In this state, the torque generated at the crankshaft 57 by the human power repeats increasing and decreasing with the same amplitude. In synchronization with the increase and the decrease in the torque, the acceleration in the traveling direction x of the vehicle repeats increasing and decreasing with the same amplitude.

In the example shown in FIG. 5, even when the road surface on which the electric assist bicycle 1 runs is changed from the flat surface to a slope, the rider keeps on rotating the pedal 55 with the same magnitude of force as that on the flat road. Namely, even when the road surface on which the electric assist bicycle 1 runs is changed from the flat surface to the slope, the maximum value and the minimum value of the torque generated at the crankshaft 57 are kept the same.

When the road surface on which the electric assist bicycle 1 runs is changed from the flat surface to the slope, the load is increased. In this specification, the term "load" refers to the load that the electric assist bicycle 1 receives from the running environment, such as the inclination of the road surface, the headwind or the like. In the case in which the load during running is heavy, the acceleration is decreased significantly at the timing when the torque generated at the crankshaft 57 by the human power is decreased. Therefore, as shown in FIG. 5, when the road surface on which the electric assist bicycle 1 runs is changed from the flat surface to the slope, the difference P-P between the maximum value and the minimum value of the acceleration in the zone between the adjacent ridge and trough of the torque is increased. Upon detecting that the difference P-P of the acceleration has been increased, the calculation circuit 71 (FIG. 2A) increases the assist power to be generated by the electric motor 53. The operation of the calculation circuit 71 will be described in detail below. The assist power to be generated by the electric motor 53 may be increased, so that the acceleration is suppressed from decreasing excessively at the timing when the torque generated at the crankshaft 57 by the human power is decreased, and the difference P-P of the acceleration is decreased. Even if the rider keeps on rotating the pedal 55 with the same magnitude of force as that on the flat road when the road surface on which the electric assist bicycle 1 runs is changed from the flat surface to the slope, the speed of the vehicle is suppressed from decreasing. An appropriate level of assist power in accordance with the change in the load during running may be generated, so that the rider drives the electric assist bicycle 1 comfortably.

Now, an internal structure of the controller 70 will be described with reference to FIG. 2A again, and then, an operation of the controller 70 will be described.

As described above, the controller 70 includes the calculation circuit 71, the averaging circuit 78, and the motor rotation circuit 79. In this preferred embodiment, the calculation circuit 71 will be described as being an integrated circuit including a plurality of circuits. Such a structure is an example. A process realized by one or a plurality of circuits may be realized by software and a signal processor.

The averaging circuit 78 is a digital filtering circuit that smooths a detection signal regarding each of axial directions that is output from the acceleration sensor 38. The averaging circuit 78 may, for example, calculate a movement average of a plurality of detection signals to smooth the detection signals. Another smoothing algorithm may be used. In this preferred embodiment, the averaging circuit 78 is provided. Nonetheless, according to a preferred embodiment of the present invention, it is not indispensable to provide the averaging circuit 78.

The calculation circuit 71 performs a calculation to rotate the electric motor 53 at the assist ratio in accordance with the above-described difference P–P between the maximum value and the minimum value of the acceleration, and outputs a control signal. In this preferred embodiment, the calculation circuit 71 includes functional blocks that perform a plurality of types of processes. Specifically, the calculation circuit 71 includes a ridge-trough detection block 72, an acceleration difference P–P calculation block 73, a motor electric current command value calculation block 74, and motor electric current command value correction blocks 75 and 76. Each of the functional blocks may be mounted as a calculation core in the calculation circuit 71, or may be mounted as a sub routine or a library of a computer program.

The ridge-trough detection block 72 receives a value representing the magnitude of a pedal torque detected by the torque sensor 41. The ridge-trough detection block 72 may also receive an output signal of the crank rotation sensor 42. The ridge-trough detection block 72 extracts a portion of a ridge and a portion of a trough of the torque that changes as described above, from the output signal of the torque sensor 41. The ridge and trough of the torque may be extracted by detecting a portion at which the torque decreases after increasing (i.e. local maximum) and a portion at which the torque increases after decreasing (i.e., local minimum). The ridge-trough detection block 72 outputs information representing the extracted ridge and the extracted trough of the torque to the acceleration difference P–P calculation block 73.

The acceleration difference P–P calculation block 73 receives, from the averaging circuit 78, a value representing the magnitude of the detected acceleration at every predetermined timing (e.g., every 0.1 sec.). The acceleration difference P–P calculation block 73 extracts the maximum value and the minimum value of the acceleration between the adjacent ridge and trough of the torque. In this process, the acceleration difference P–P calculation block 73 extracts the maximum value and the minimum value of the acceleration in a time period between the timing when the ridge of the torque appears and the timing when the trough of the torque appears. The acceleration difference P–P calculation block 73 calculates the difference P–P between the extracted maximum value and the extracted minimum value of the acceleration, and outputs the difference P–P to the motor electric current command value correction block 75.

The motor electric current command value calculation block 74 receives data specifying the assist mode selected by the rider by use of the operation panel 60, and sets the assist mode. The motor electric current command value calculation block 74 receives a value representing the magnitude of the pedal torque detected by the torque sensor 41.

The motor electric current command value calculation block 74 further receives speed data from the speed sensor 35. A transmission gear range sensor 48 outputs, to the motor electric current command value calculation block 74, data representing transmission gear ranges of the transmission mechanism 36 (FIG. 2B) included in the power transmission mechanism 31. In the case in which, for example, the current transmission gear range is lower than, or equal to, a predefined transmission gear range, the motor electric current command value calculation block 74 may set the level of the electric current to flow in the electric motor 53 to be lower. With such a setting, the magnitude of the assist power to be generated by the electric motor 53 is suppressed, so that the acceleration of the vehicle is prevented from being excessively large.

The motor electric current command value calculation block 74 may calculate the transmission gear range based on the rotation speed of the electric motor 53 and the running speed of the vehicle main body. The motor electric current command value calculation block 74 uses the output signal of the motor rotation sensor 46 and the output signal of the speed sensor 35 to calculate the transmission gear range. In this case, the transmission gear range sensor 48 may be omitted.

The motor electric current command value calculation block 74 calculates the motor electric current command value, based on which subsequent processes are to be performed.

In general, the magnitude of the torque to be generated by the electric motor 53 is in proportion to the level of the electric current flowing in the electric motor 53. Once the level of the electric current flowing in the electric motor 53 is determined, the magnitude of the torque to be generated is determined uniquely. Namely, determining the motor electric current command value is determining the magnitude of the torque to be generated by the electric motor 53.

The motor electric current command value calculation block 74 determines the motor electric current command value such that the ratio between the torque to be generated at a driving shaft of the rear wheel 26 by the pedal force and the torque to be generated at the driving shaft of the rear wheel 26 by the driving motor 53 matches the assist ratio. The "assist ratio" is a ratio of the assist output generated by the electric motor 53 with respect to the crank rotation output that is generated by the human power of the rider applied to the pedal 55. The assist ratio may also be referred to as a "driving assist ratio".

The motor electric current command value calculation block 74, for example, determines the motor electric current command value such that the torque to be generated at the driving shaft of the rear wheel 26 by the pedal force and the torque to be generated at the driving shaft of the rear wheel 26 by the driving motor 53 are equal to each other (assist ratio is 1:1). The motor electric current command value may be determined by, for example, a predefined "table representing the relationship between the human power torque and the motor electric current command value". In this process, the motor electric current command value calculation block 74 calculates the motor electric current command value further in consideration of the deceleration ratio of the decelerator that decelerates the rotation of the electric motor 53. When, for example, the deceleration ratio is N, the motor electric current command value calculation block 74 calculates the motor electric current command value such that a motor torque that is 1/N of the torque to be generated at the driving shaft of the rear wheel 26 by the pedal force is generated. When, for example, the deceleration ratio is 2, the motor electric current command value calculation block 74 calculates the motor electric current command value such that a motor torque that is ½ of the torque to be generated at the driving shaft of the rear wheel 26 by the pedal force is generated.

Next, the motor electric current command value calculation block 74 multiplies the motor electric current command value by a coefficient in accordance with the assist mode set by the user. For example, the coefficient when the assist mode is "high" is set to 2, for example, the coefficient when the assist mode is "standard" is set to 1, for example, and the coefficient when the assist mode is "low" is set to 0.8, for example. With such settings, the motor electric current command value calculation block 74 multiplies the motor electric current command value by the coefficient corresponding to the assist mode set by the user.

Next, the motor electric current command value calculation block 74 corrects the motor electric current command value in consideration of the vehicle speed. In the case in which, for example, the vehicle speed is low, the motor electric current command value calculation block 74 sets the motor electric current command value to be larger. As the vehicle speed is increased, the motor electric current command value calculation block 74 decreases the motor electric current command value. The motor electric current command value calculation block 74 sets the motor electric current command value in this manner, so that the assist power at the start of the vehicle is increased and thus the feel of driving is improved.

Next, the motor electric current command value calculation block 74 corrects the motor electric current command value in consideration of the transmission gear range. As described above, in the case in which, for example, the current transmission gear range is lower than, or equal to, a predefined transmission gear range, the motor electric current command value calculation block 74 may set the motor electric current command value to be smaller. The motor electric current command value calculation block 74 may change the motor electric current command value in accordance with the transmission gear range, so that the feel of driving is improved.

The above-described order of the processes performed by the motor electric current command value calculation block 74 is merely an example. The processes may be performed in an order different from the above. For example, the motor electric current command value calculation block 74 may correct the motor electric current command value in consideration of the transmission gear range and then correct the motor electric current command value in consideration of the vehicle speed.

The motor electric current command value calculation block 74 outputs the motor electric current command value to the motor electric current command value correction block 75. As described above, the acceleration difference P–P calculation block 73 outputs, to the motor electric current command value correction block 75, the difference P–P between the extracted maximum value and the extracted minimum value of the acceleration.

The motor electric current command value correction block 75 corrects the motor electric current command value in accordance with the acceleration difference P–P. In the case in which, for example, the acceleration difference P–P is larger than, or equal to, a certain predetermined value, the motor electric current command value correction block 75 increases the motor electric current command value. In the case in which, for example, the acceleration difference P–P is smaller than a different predetermined value, the motor electric current command value correction block 75 decreases the motor electric current command value. Changing the motor electric current command value is equivalent to changing the assist ratio. The procedure of changing the motor electric current command value in accordance with the acceleration difference P–P will be described in detail below.

In the case in which the assist mode is changed during the process, the motor electric current command value correction block 75 outputs data representing the post-change assist mode to the operation panel 60. The operation panel 60 notifies the rider of the assist mode represented by the received data. In this manner, the rider recognizes that the assist mode has been changed.

The motor electric current command value correction block 75 outputs the motor electric current command value to the motor electric current command value correction block 76.

The motor electric current command value correction block 76 corrects the motor electric current command value in accordance with the vehicle speed. In Japan, there is a regulation that when the vehicle speed is a predetermined value or higher (e.g., 10 km per hour or higher), the upper limit of the assist ratio should be decreased. When the vehicle speed is 10 km per hour or higher, the upper limit of the assist ratio is gradually decreased. When the vehicle speed is 24 km per hour or higher, the assist ratio is 1:0, namely, the assist output is zero. The motor electric current command value correction block 76 determines the ratio of such gradual decrease by use of, for example, a predefined "table representing the relationship between the vehicle speed and the ratio of gradual decrease". The motor electric current command value is multiplied by the ratio of gradual decrease, so that the torque to be generated by the electric motor 53 is gradually decreased. The change in the ratio of gradual decrease may be linear or curved.

The motor electric current command value correction block 76 also corrects the motor electric current command value in accordance with the rotation speed of the crankshaft 57. While, for example, the electric assist bicycle 1 is running at a low speed immediately before stopping, the feel of driving varies in accordance with when the generation of the assist power is stopped. There is a case in which the feel of driving is improved by generating slight assist power continuously even though the pedal force is substantially zero. In such a case, the rotation speed of the crankshaft 57 may be referred to so that it is checked whether or not the rider intends to drive. While the crankshaft 57 is moving, namely, the rider is pedaling, the assist power is generated, and when the crankshaft 57 is stopped, the generation of the assist power is stopped. In this manner, the feel of driving is improved.

The motor electric current command value correction block 76 outputs the motor electric current command value to the motor driving circuit 79. The motor driving circuit 79 supplies the electric motor 53 with an electric current of a level in accordance with the motor electric current command value.

With the above-described processes, the calculation circuit 71 rotates the electric motor 53 at the assist ratio in accordance with the acceleration difference P–P.

Referring to FIG. 4 again, while the crankshaft 57 makes one rotation, the maximum value and the minimum value of the acceleration each appear twice. In other words, while the crankshaft 57 makes a half rotation, the maximum value and the minimum value of the acceleration each appear once. Detection of the maximum value and the minimum value of the acceleration during the half rotation of the crankshaft 57 may also be used to perform the control of changing the magnitude of the assist power to be generated by the electric motor 53 in accordance with the change in the acceleration that is associated with the operation of the rider rotating the pedal 55.

The half rotation of the crankshaft 57 may be detected by an output signal of the crank rotation sensor 42. Alternatively, the half rotation of the crankshaft 57 may be detected by an output signal of the torque sensor 41. For example, a zone from the ridge to the trough, of the torque that changes, may be detected as the half rotation of the crankshaft 57. Alternatively, a zone from the trough to the ridge, of the torque that changes, may be detected as the half rotation of the crankshaft 57.

In this example, the ridge-trough detection block 72 (FIG. 2A) uses at least one of the output signal of the torque sensor 41 and the output signal of the crank rotation sensor 42 to detect the half rotation of the crankshaft 57. The ridge-trough detection block 72 outputs information, representing the detected half rotation of the crankshaft 57, to the acceleration difference P–P calculation block 73.

The acceleration difference P–P calculation block 73 receives a value representing the magnitude of the detected acceleration from the averaging circuit 78. The acceleration difference P–P calculation block 73 extracts the maximum value and the minimum value of the acceleration during the half rotation of the crankshaft 57. The acceleration difference P–P calculation block 73 calculates the difference P–P between the extracted maximum value and the extracted minimum value of the acceleration, and outputs the difference P–P to the motor electric current command value correction block 75. The operation of the motor electric current command value correction block 75 that corrects the motor electric current command value by use of the acceleration difference P–P is substantially the same as the operation described above.

The magnitude of the assist power may be changed in accordance with the acceleration difference P–P during the half rotation of the crankshaft 57, so that an appropriate level of assist power in accordance with the load during running is generated. In a preferred embodiment of the present invention, the process of determining the difference P–P between the maximum value and the minimum value of the acceleration during the half rotation of the crankshaft 57 may be performed instead of the process of determining the difference P–P between the maximum value and the minimum value of the acceleration in a zone between the adjacent ridge and trough of the torque that changes.

Now, a procedure of changing the assist ratio in accordance with the acceleration difference P–P will be described in detail. As described above, changing the assist ratio is equivalent to changing the motor electric current command value.

Figure 6:
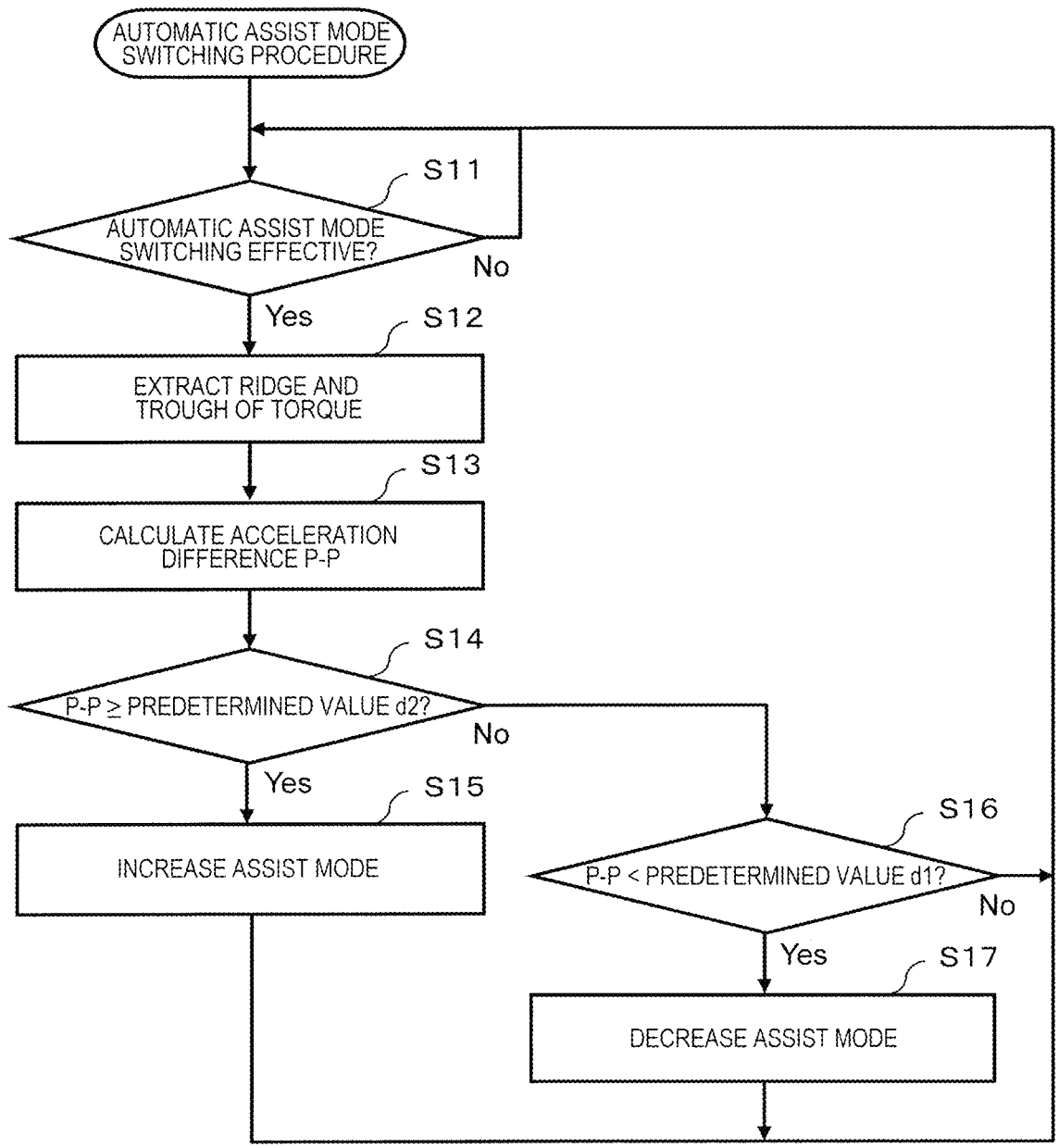
FIG. 6 is a flowchart showing a procedure of changing the assist mode in accordance with the acceleration difference according to a preferred embodiment of the present invention.
Figure 7:
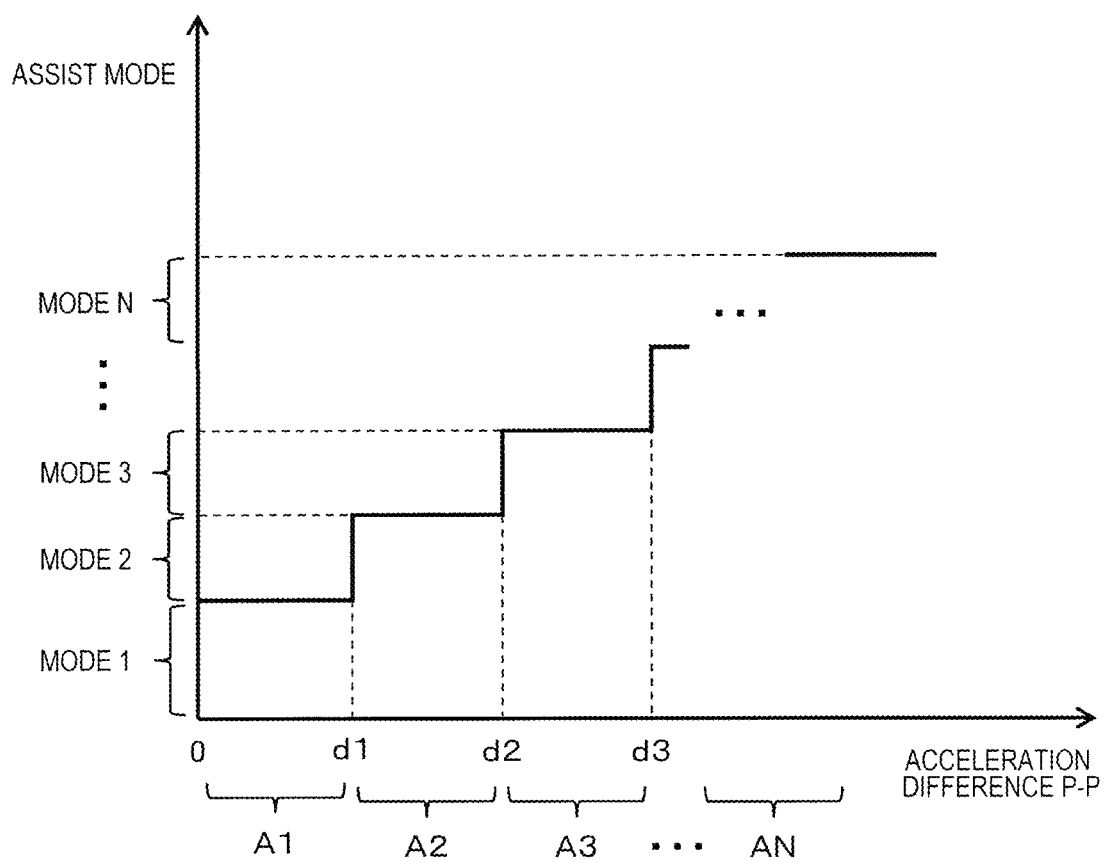
FIG. 7 shows the relationship between the magnitude of the acceleration difference and the selected assist mode according to a preferred embodiment of the present invention.

FIG. 6 is a flowchart showing a procedure of changing the assist mode in accordance with the acceleration difference P–P. FIG. 7 shows the relationship between the magnitude of the acceleration difference P–P and the selected assist mode. When the assist mode is changed, the assist ratio is changed, and the magnitude of the assist power to be generated by the electric motor 53 for the same magnitude of pedal force is changed. In this example, assist modes 1 through N (N: integer of 2 or greater) are the assist modes that may be selected in an operation mode in which automatic assist mode switching is effective. Such a plurality of assist modes are different from each other in the relationship between the pedal force of the rider and the assist power generated by the electric motor 53. In the example shown in FIG. 7, the assist power to be generated for the pedal force of the rider is increased in the order of the assist mode 1, 2, 3, . . . N. In this example, the values of the acceleration difference P–P are divided into a plurality of ranges A1 through AN (N: integer of 2 or greater). In the example shown in FIG. 7, the value of the acceleration difference P–P is increased in the order of the range A1, A2, A3, . . . AN. The controller 70 stores, in advance, a table representing the relationship between such a plurality of assist modes and the values of the acceleration difference P–P. Such a table is stored on, for example, a memory (not shown) included in the controller 70.

In this example, it is assumed that the electric assist bicycle 1 is running on a flat road in assist mode 2 and that the acceleration difference P–P in this assist mode is in the range A2. Where 0<d1<d2<d3, in the range A2, the acceleration difference P–P is d1 or larger and smaller than d2. In the range A1, the acceleration difference P–P is 0 or larger and smaller than d1. In the range A1, the acceleration difference P–P is d2 or larger and smaller than d3.

In step S11, the controller 70 determines whether or not the automatic assist mode switching is effective. Only when the automatic assist mode switching is effective, the controller 70 advances the procedure to the next step, i.e., step S12. The process performed in the case in which the determination result is "No" in step S11 is set with an assumption that the rider fixes the assist mode. In such a case, it is not necessary to operate the electric assist bicycle 1 against the intention of the rider. A mode in which the automatic assist mode switching is effective, and a mode in which automatic assist mode switching is ineffective, may be switched to each other by a hardware button or a software process. In the latter case, it may be determined whether or not the electric assist bicycle 1 is in a lock mode, in which the assist mode switching is prohibited by pressing and holding down the power source button 65. Instead of, or in addition to, determining whether or not the automatic assist mode switching is effective, the controller 70 may be set such that a mode in which the assist ratio change is permitted in accordance with the acceleration difference P–P, and a mode in which the assist ratio change is not permitted, are switchable to each other. Such modes may also be switched to each other by a hardware button or a software process.

In step S12, the ridge-trough detection block 72 extracts the ridge portion and the trough portion of the torque that changes, from the output signal of the torque sensor 41.

In step S13, the acceleration difference P–P calculation block 73 extracts the maximum value and the minimum value of the acceleration between the adjacent ridge and trough of the torque. The acceleration difference P–P calculation block 73 calculates the difference P–P of the extracted maximum value and the extracted minimum value of the acceleration.

In this example, the electric assist bicycle 1 is running on the flat road in assist mode 2, and the acceleration difference P–P is in the range A2. In step S14, the motor electric current command value correction block 75 determines whether or not the acceleration difference P–P is not smaller than value d2. Since the acceleration difference P–P is smaller than value d2, the procedure advances to step S16. In step S16, the motor electric current command value correction block 75 determines whether or not the acceleration difference P–P is smaller than value d1. Since the acceleration difference P–P is value d1 or larger, the procedure returns to step S11, and the electric assist bicycle 1 is maintained in assist mode 2.

In the case in which the electric assist bicycle 1 is running on the flat road in assist mode 2, the road surface is changed from the flat surface to an ascending slope and as a result, the load is increased, the acceleration difference P–P is increased. In step S14, the motor electric current command value correction block 75 determines whether or not the acceleration difference P–P is not smaller than value d2. When it is determined that the acceleration difference P–P is value d2 or greater, the motor electric current command value correction block 75 increases the level of the assist mode. In this example, the assist mode is changed from mode 2 to mode 3. When the assist mode is changed from mode 2 to mode 3, the assist ratio is changed, and the assist power to be generated by the motor 53 for the same magnitude of pedal force is increased. In this manner, the assist power to be generated for the pedal force of the rider is increased. In the case in which the load during running is heavy, the acceleration is decreased significantly at a time when the torque generated at the crankshaft 57 by the human power is decreased. Therefore, the acceleration difference P–P is increased. In the case in which the acceleration difference P–P is large, the assist power to be generated by the electric motor 53 may be increased. With such an arrangement, an appropriate level of assist power in accordance with the heavy load is generated.

By contrast, in the case in which the electric assist bicycle 1 is running on the flat road in assist mode 2, the road surface is changed from the flat surface to a descending slope and as a result, the load is decreased, the acceleration difference P–P is decreased. In the case in which the load during running is light, the acceleration is not decreased much at a time when the torque generated at the crankshaft 57 by the human power is decreased. Therefore, the acceleration difference P–P is decreased. In step S14, the motor electric current command value correction block 75 determines whether or not the acceleration difference P–P is not smaller than value d2. Since the acceleration difference P–P is smaller than d2, the procedure advances to step S16. In step S16, the motor electric current command value correction block 75 determines whether or not the acceleration difference P–P is smaller than value d1. When it is determined that the acceleration difference P–P is smaller than value d2, the motor electric current command value correction block 75 decreases the level of the assist mode. In this example, the assist mode is changed from mode 2 to mode 1. When the assist mode is changed from mode 2 to mode 1, the assist ratio is changed, and the assist power to be generated by the motor 53 for the same magnitude of pedal force is decreased. In this manner, the assist power to be generated for the pedal force of the rider is decreased. In the case in which the load is light, for example, while the electric assist bicycle 1 is running on a descending slope, the assist power may be decreased. With such an arrangement, the acceleration of the vehicle is suppressed from becoming excessively large.

In this preferred embodiment, the acceleration in the traveling direction of the electric assist bicycle 1 is detected by the acceleration sensor 38. The acceleration sensor 38 detects and outputs the acceleration Gx in the X-axis direction along the traveling direction of the vehicle. The acceleration sensor 38 is constantly influenced by the gravitational force. Therefore, while the electric assist bicycle 1 is running on a slope, the value of the acceleration Gx detected by the acceleration sensor 38 includes a component of the acceleration in the traveling direction of the vehicle and also a component, of the gravitational force, in a direction going down the slope. The value of the acceleration Gx is a mixed value of the component of the acceleration in the traveling direction of the vehicle and the component of the gravitational force. For this reason, it is difficult to determine why the value of the acceleration Gx has been changed by merely checking the value of the acceleration Gx.

In a preferred embodiment of the present invention, the maximum value and the minimum value of the acceleration Gx between the adjacent ridge and trough of the torque that increases and decreases are extracted from the acceleration Gx, which is the mixed value. A difference between the extracted maximum value and the extracted minimum value is determined, so that the component of the gravitational force is counteracted. As a result, the acceleration difference P–P, which is a value in accordance with the load, is obtained. The magnitude of the assist power to be generated by the electric motor 53 is changed in accordance with the acceleration difference P–P, which is the value in accordance with the load. In this manner, an appropriate level of assist power in accordance with the load is generated.

Figure 8:
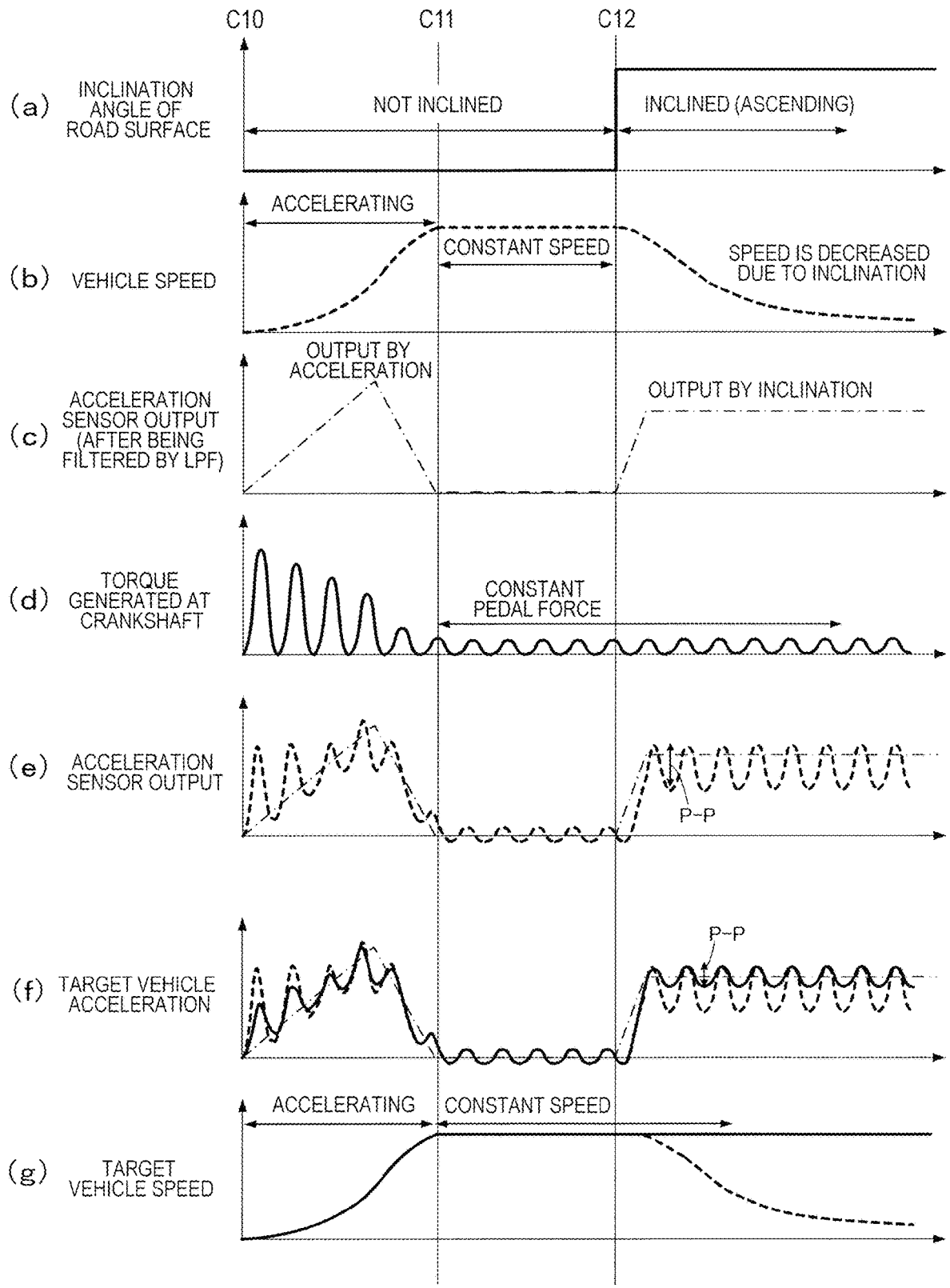
FIG. 8 shows an operation of changing the magnitude of the assist power in accordance with the acceleration difference between the adjacent ridge and trough of the torque according to a preferred embodiment of the present invention.

FIG. 8 shows an operation of changing the magnitude of the assist power to be generated by the electric motor 53 in accordance with the difference P–P between the maximum value and the minimum value of the acceleration between the adjacent ridge and trough of the torque that increases and decreases.

In each of FIG. 8(a) through FIG. 8(g), the horizontal axis represents the time. In FIG. 8(a), the vertical axis represents the inclination angle of the road surface on which the electric assist bicycle 1 runs. In FIG. 8(a), the solid line represents a change in the inclination angle of the road surface. In FIG. 8(b), the vertical axis represents the vehicle speed in the traveling direction of the vehicle. In FIG. 8(b), the dashed line represents a change in the vehicle speed. In FIG. 8(c), the vertical axis represents the acceleration Gx in the x-axis direction that is output from the acceleration sensor 38. In FIG. 8(c), the one-dot chain line represents the value of the acceleration Gx filtered by a low-pass filter (LPF). The low-pass filter may be included in the controller 70.

In FIG. 8(d), the vertical axis represents the torque generated at the crankshaft 57. In FIG. 8(d), the solid line represents a change in the torque generated at the crankshaft 57. In FIG. 8(e), the vertical axis represents the acceleration Gx in the x-axis direction that is output from the acceleration sensor 38. In FIG. 8(e), the dashed line represents a change in the acceleration Gx in the case in which the control in accordance with the acceleration difference P–P is not performed. In FIG. 8(f), the vertical axis represents the target vehicle acceleration. In FIG. 8(f), the dashed line represents a change in the acceleration in the case in which the control in accordance with the acceleration difference P–P is not performed. In FIG. 8(f), the solid line represents a change in the acceleration in the case in which the control in accordance with the acceleration difference P–P is performed. In FIG. 8(g), the vertical axis represents the target vehicle speed in the traveling direction of the vehicle. In FIG. 8(g), the dashed line represents a change in the vehicle speed in the case in which the control in accordance with the acceleration difference P–P is not performed. In FIG. 8(g), the solid line represents a change in the vehicle speed in the case in which the control in accordance with the acceleration difference P–P is performed.

In the example shown in FIG. 8, the electric assist bicycle 1 moves in a direction from left to right in the figure. In state C10, the electric assist bicycle 1 is at a stop on a flat road. From this state, the rider steps on the pedal 55 to start the electric assist bicycle 1. At the time of starting, the rider strongly steps on the pedal 55, and therefore, the torque generated at the crankshaft 57 is large. In association with the operation of the rider rotating the pedal 55, the torque and the acceleration Gx repeat increasing and decreasing. In the process of increasing the vehicle speed, the acceleration sensor 38 receives a force in a direction opposite to the traveling direction of the vehicle by the law of inertia. Therefore, the acceleration Gx after filtered by the low-pass filter is increased.

At the time of starting, the rider strongly steps on the pedal 55. In the process in which the vehicle speed is increased, the rider gradually decreases the force of rotating the pedal 55. When a desired vehicle speed is reached in state C11, the rider keeps on rotating the pedal 55 with the same magnitude of force so as to maintain the vehicle speed.

In state C12, the road surface on which the electric assist bicycle 1 runs is changed from the flat surface to a slope, and the electric assist bicycle 1 goes up the slope. As described above, while the electric assist bicycle 1 is running on the slope, the value of the acceleration Gx detected by the acceleration sensor 38 includes a component of the acceleration in the traveling direction of the vehicle and also a component, of the gravitational force, in a direction going down the slope. Therefore, the value of the acceleration Gx detected while the electric assist bicycle 1 is going up the slope is generally larger than the value of the acceleration Gx detected while the electric assist bicycle 1 is running on the flat road. The acceleration Gx filtered by the low-pass filter is larger while the electric assist bicycle 1 is going up the slope.

The value of the acceleration Gx detected by the acceleration sensor 38 while the electric assist bicycle 1 is going up the slope is a mixed value of the component of the acceleration in the traveling direction of the vehicle and the component of the gravitational force. From the acceleration Gx, which is the mixed value, the maximum value and the minimum value of the acceleration Gx between the adjacent ridge and trough of the torque that increases and decreases are extracted. A difference between the extracted maximum value and the extracted minimum value is determined, so that the component of the gravitational force is counteracted. As a result, the acceleration difference P–P, which is a value in accordance with the load, is obtained.

In the example shown in FIG. 8, even when the road surface on which the electric assist bicycle 1 runs is changed from the flat surface to the slope, the rider keeps on rotating the pedal 55 with the same magnitude of force as that on the flat road. Namely, even when the road surface on which the electric assist bicycle 1 runs is changed from the flat surface to the slope, the maximum value and the minimum value of the torque generated at the crankshaft 57 are kept the same. When the road surface on which the electric assist bicycle 1 runs is changed from the flat surface to the slope, the load is increased. Therefore, as shown in FIG. 8(e), the acceleration difference P–P on the slope is increased.

Upon detecting that the acceleration difference P–P has been increased, the controller 70 (FIG. 2A) increases the assist power to be generated by the electric motor 53.

In FIG. 8(e), the dashed line represents the acceleration in the case in which the control in accordance with the acceleration difference P–P is not performed. The waveform of the dashed line in FIG. 8(f) is the same as the waveform in FIG. 8(e). In FIG. 8(g), the dashed line represents a decrease in the vehicle speed in the case in which the control in accordance with the acceleration difference P–P is not performed.

Meanwhile, in FIG. 8(f), the solid line represents the target acceleration. In FIG. 8(g), the solid line represents the target speed. The assist power is generated by the electric motor such that the target acceleration difference P–P is obtained, namely, such that the value of the acceleration difference P–P is decreased. With such control, even if the rider keeps on rotating the pedal 55 with the same magnitude of force as that on the flat road, the vehicle speed is suppressed from being decreased. An appropriate level of assist power in accordance with the change in the load during running may be generated, so that rider drives the electric assist bicycle 1 comfortably.

In the process in which the electric assist bicycle 1 is started from state C10 also, the acceleration difference P–P is increased. Even in such a process, the assist power may be generated by the electric motor such that the value of the acceleration difference P–P is decreased as represented by the solid line in FIG. 8(f). With such control, the force with which the rider rotates the pedal 55 in the process of starting and accelerating the vehicle is alleviated.

Figure 9:
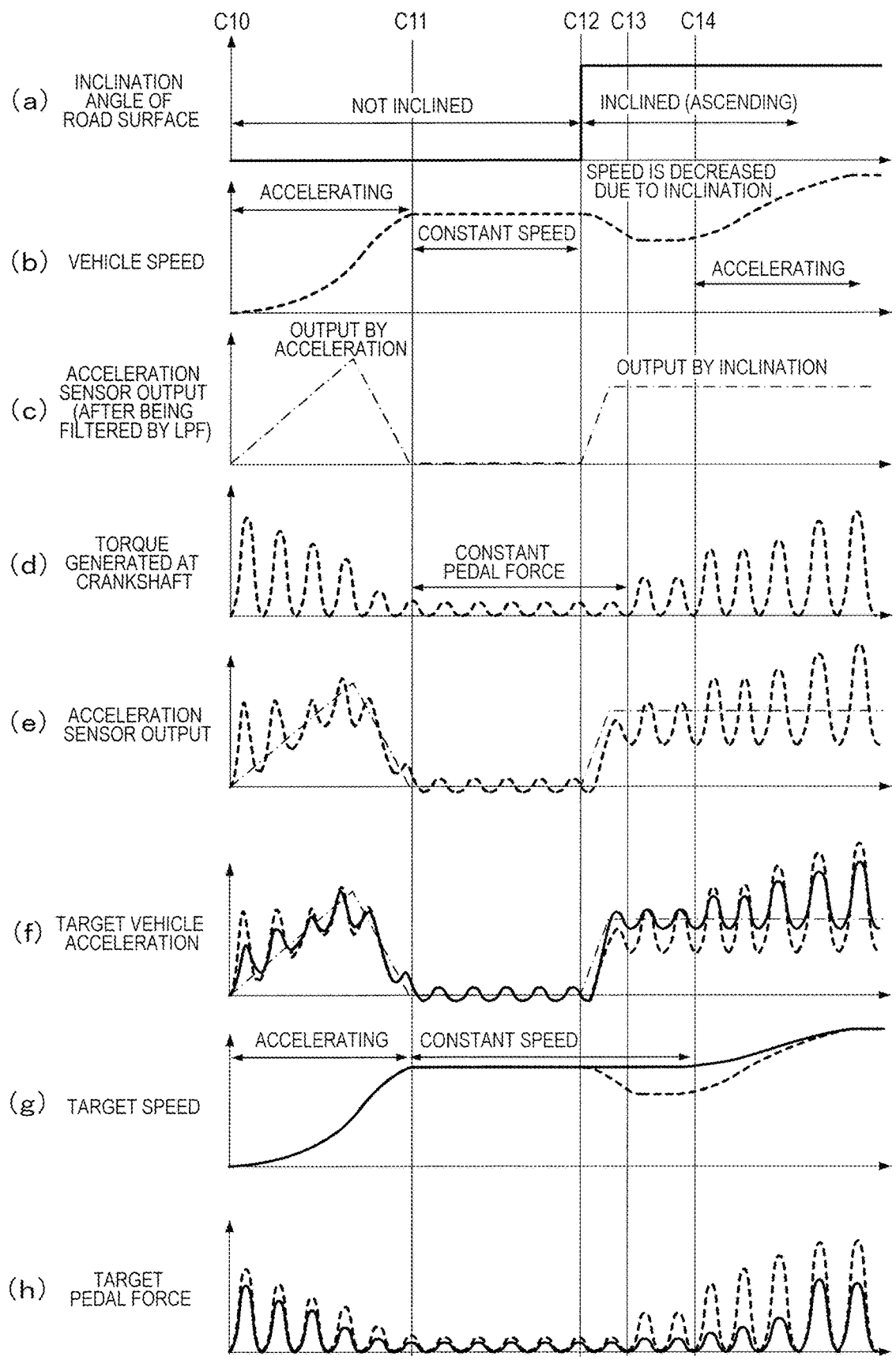
FIG. 9 shows another example of operation of changing the magnitude of the assist power in accordance with the acceleration difference between the adjacent ridge and trough of the torque according to a preferred embodiment of the present invention.

FIG. 9 shows another example of changing the magnitude of the assist power in accordance with the acceleration difference P–P.

In each of FIG. 9(a) through FIG. 9(h), the horizontal axis represents the time. In FIG. 9(a), the vertical axis represents the inclination angle of the road surface on which the electric assist bicycle 1 runs. In FIG. 9(a), the solid line represents a change in the inclination angle of the road surface. In FIG. 9(b), the vertical axis represents the vehicle speed in the traveling direction of the vehicle. In FIG. 9(b), the dashed line represents a change in the vehicle speed. In FIG. 9(c), the vertical axis represents the acceleration Gx in the x-axis direction that is output from the acceleration sensor 38. In FIG. 9(c), the one-dot chain line represents the value of the acceleration Gx filtered by a low-pass filter (LPF). The low-pass filter may be included in the controller 70.

In FIG. 9(d), the vertical axis represents the torque generated at the crankshaft 57. In FIG. 9(d), the dashed line represents a change in the torque generated at the crankshaft 57. In FIG. 9(e), the vertical axis represents the acceleration Gx in the x-axis direction that is output from the acceleration sensor 38. In FIG. 9(e), the dashed line represents a change in the acceleration Gx in the case in which the control in accordance with the acceleration difference P–P is not performed. In FIG. 9(f), the vertical axis represents the target vehicle acceleration. In FIG. 9(f), the dashed line represents a change in the acceleration in the case in which the control in accordance with the acceleration difference P–P is not performed. In FIG. 9(f), the solid line represents a change in the acceleration in the case in which the control in accordance with the acceleration difference P–P is performed.

In FIG. 9(g), the vertical axis represents the target vehicle speed in the traveling direction of the vehicle. In FIG. 9(g), the dashed line represents a change in the vehicle speed in the case in which the control in accordance with the acceleration difference P–P is not performed. In FIG. 9(g), the solid line represents a change in the vehicle speed in the case in which the control in accordance with the acceleration difference P–P is performed. In FIG. 9(h), the vertical axis represents the target pedal force. In FIG. 9(h), the dashed line represents a change in the pedal force in the case in which the control in accordance with the acceleration difference P–P is not performed. In FIG. 9(h), the solid line represents a change in the pedal force in the case in which the control in accordance with the acceleration difference P–P is performed.

In the example shown in FIG. 9, the electric assist bicycle 1 moves in a direction from left to right in the figure. States C10 through C12 are the same as those shown in FIG. 8.

In the example shown in FIG. 9, after the road surface on which the electric assist bicycle 1 runs is changed from the flat surface to a slope, the rider increases the force of rotating the pedal 55 and thus the electric assist bicycle 1 increases the speed again on the slope. The torque generated at the crankshaft 57 is slightly increased in state C13, and is further increased in state C14. The rider increases the force of rotating the pedal 55, so that the vehicle speed is increased. However, the load is increased while the electric assist bicycle 1 is going up the slope. Therefore, the acceleration difference P-P is increased as shown in FIG. 9(*e*).

Upon detecting that the acceleration difference P-P has been increased, the controller 70 (FIG. 2A) increases the assist power to be generated by the electric motor 53.

In FIG. 9(*e*), the dashed line represents the acceleration in the case in which the control in accordance with the acceleration difference P-P is not performed. The waveform of the dashed line in FIG. 9(*f*) is the same as the waveform in FIG. 9(*e*). In FIG. 9(*g*), the dashed line represents the vehicle speed in the case in which the control in accordance with the acceleration difference P-P is not performed. In FIG. 9(*h*), the dashed line represents the pedal force in the case in which the control in accordance with the acceleration difference P-P is not performed.

Meanwhile, in FIG. 9(*f*), the solid line represents the target acceleration. In FIG. 9(*g*), the solid line represents the target speed. In FIG. 9(*h*), the solid line represents the target pedal force.

The assist power is generated by the electric motor such that the target acceleration difference P-P is obtained, namely, such that the value of the acceleration difference P-P is decreased. With such control, an appropriate level of assist power in accordance with the intention of the rider to accelerate the electric assist bicycle 1 in the state in which the load is heavy is generated. The force of the rider rotating the pedal 55 may be alleviated, so that the rider drives the electric assist bicycle 1 comfortably.

Now, another example of procedure of changing the assist ratio in accordance with the acceleration difference P-P will be described.

Figure 10:
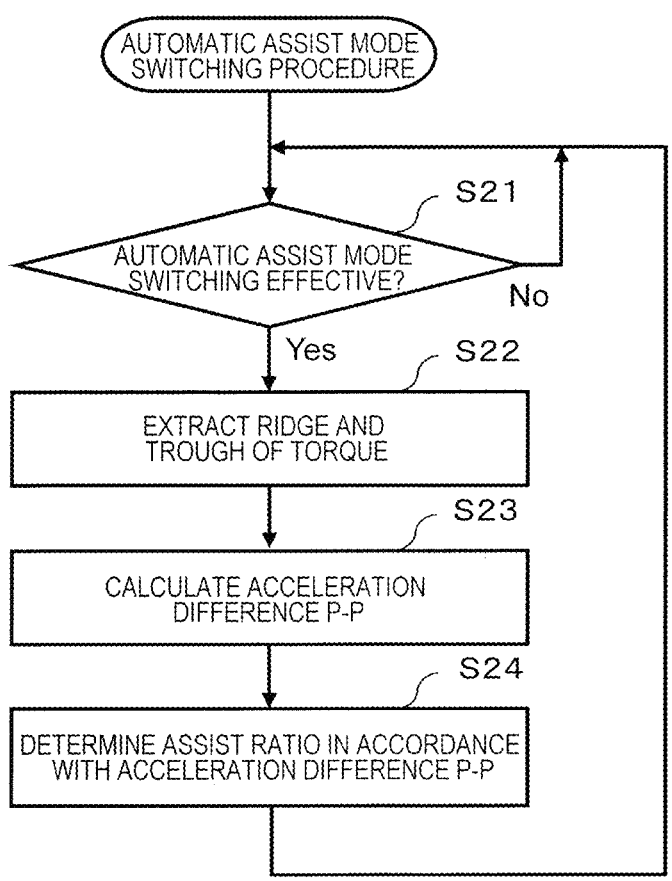
FIG. 10 is a flowchart showing a procedure of changing the assist ratio in accordance with the acceleration difference according to a preferred embodiment of the present invention.
Figure 11:
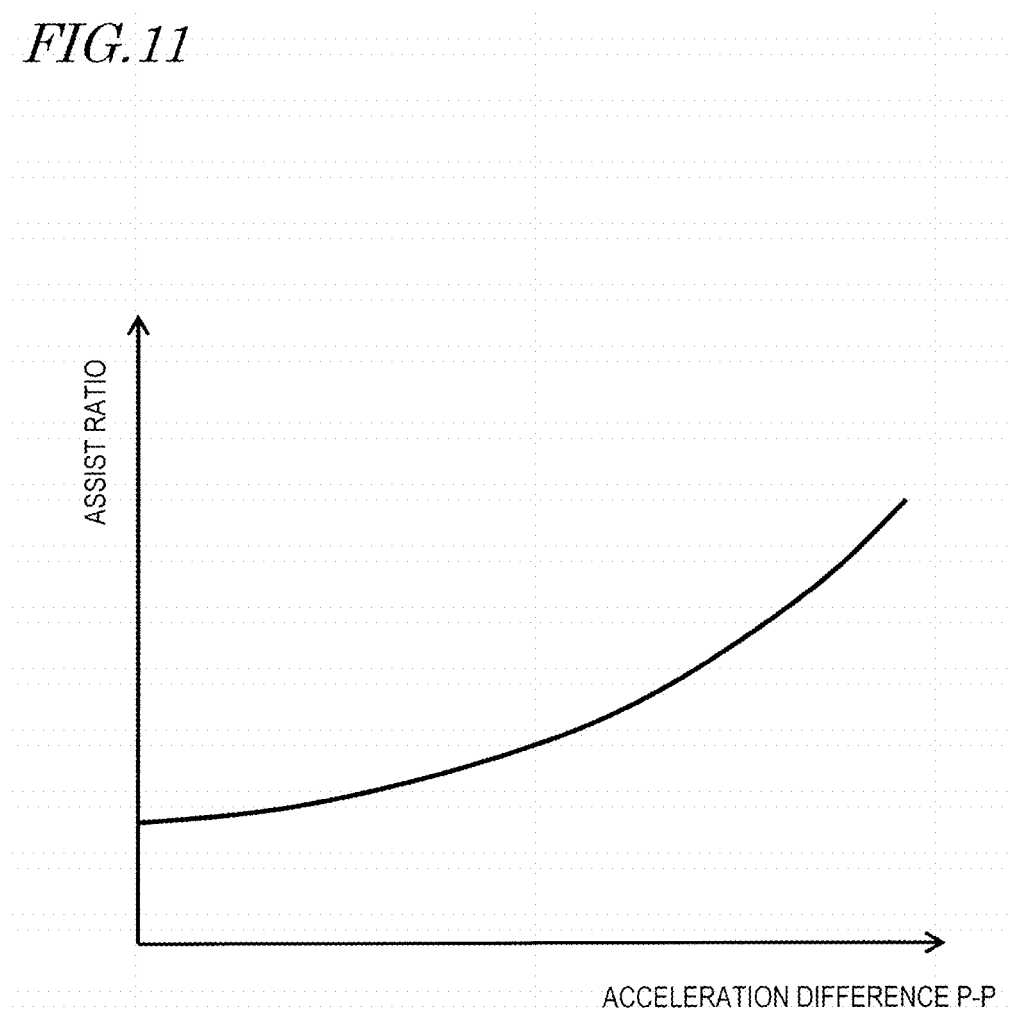
FIG. 11 shows the relationship between the magnitude of the acceleration difference and the selected assist ratio according to a preferred embodiment of the present invention.

FIG. 10 is a flowchart showing a procedure of changing the assist ratio in accordance with the acceleration difference P-P. FIG. 11 shows the relationship between the magnitude of the acceleration difference P-P and the selected assist ratio. When the assist ratio is changed, the magnitude of the assist power to be generated by the motor 53 for the same magnitude of pedal force is changed. The relationship between the acceleration difference P-P and the assist ratio is represented by an arbitrary function. In the example shown in FIG. 11, the relationship between the acceleration difference P-P and the assist ratio is represented by a nonlinear function. As the acceleration difference P-P is larger, the assist ratio is higher. Such a function is stored on, for example, a memory (not shown) included in the controller 70.

In step S21, the controller 70 determines whether or not the automatic assist mode switching is effective. Only when the automatic assist mode switching is effective, the controller 70 advances the procedure to the next step, i.e., step S22.

In step S22, the ridge-trough detection block 72 extracts the ridge portion and the trough portion of the torque that changes from the output signal of the torque sensor 41.

In step S23, the acceleration difference P-P calculation block 73 extracts the maximum value and the minimum value of the acceleration between the adjacent ridge and trough of the torque. The acceleration difference P-P calculation block 73 calculates the difference P-P of the extracted maximum value and the extracted minimum value of the acceleration.

In step S24, the motor electric current command value correction block 75 uses the function representing the relationship between the acceleration difference P-P and the assist ratio to determine the assist ratio in accordance with the acceleration difference P-P calculated by the acceleration difference P-P calculation block 73.

In the case in which the load during running is heavy, the acceleration difference P-P is large. The motor electric current command value correction block 75 increases the assist ratio as the acceleration difference P-P is larger. In the case in which the acceleration difference P-P is large, the assist power to be generated by the electric motor 53 may be increased. With such an arrangement, an appropriate level of assist power in accordance with the heavy load is generated.

By contrast, in the case in which the load is light, the acceleration difference P-P is small. The motor electric current command value correction block 75 decreases the assist ratio as the acceleration difference P-P is smaller. In the case in which the acceleration difference P-P is small, for example, while the electric assist bicycle 1 is running on a descending slope, the assist power to be generated by the electric motor 53 may be decreased. With such an arrangement, the acceleration of the vehicle is suppressed from becoming excessively large.

Figure 12:
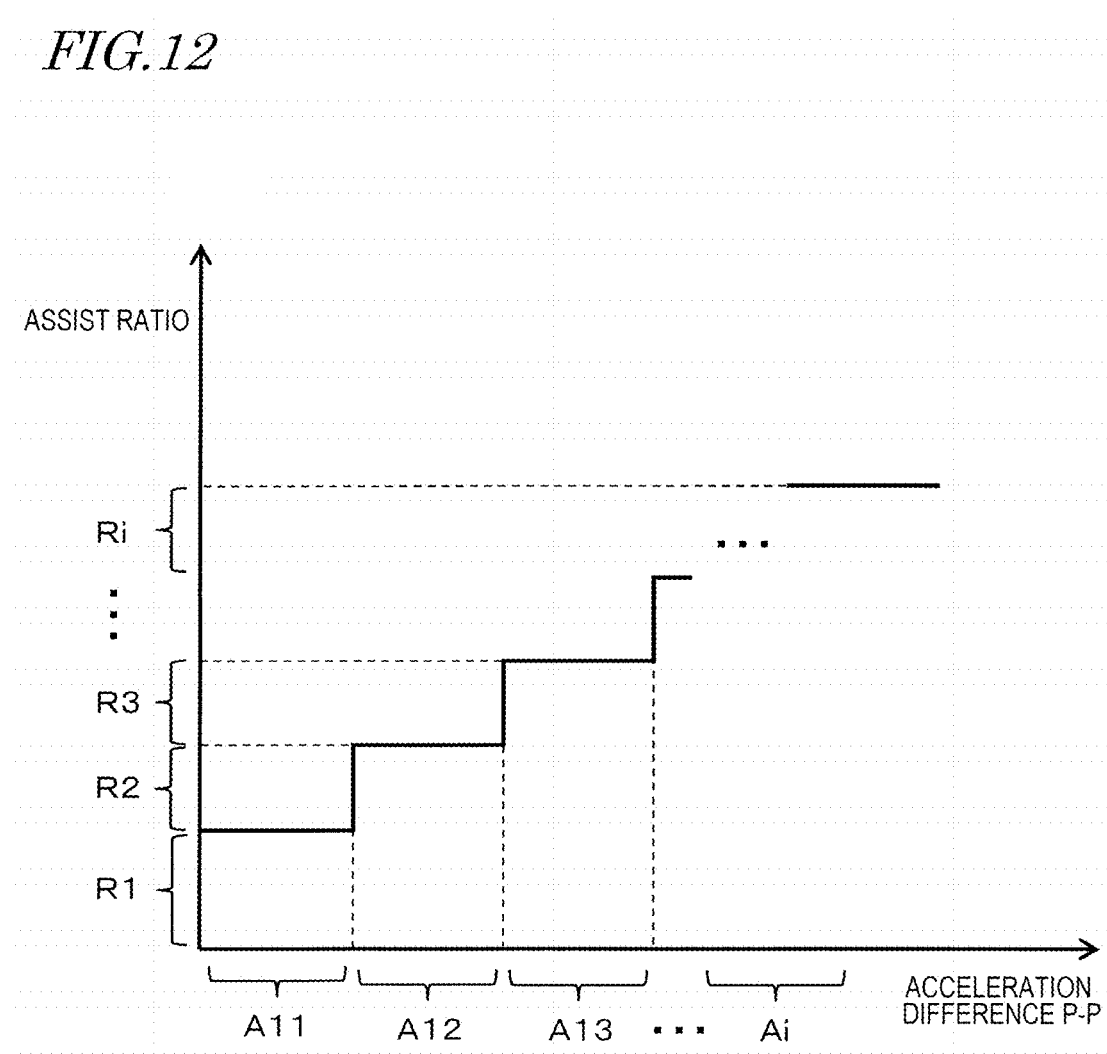
FIG. 12 shows another example of the relationship between the magnitude of the acceleration difference and the selected assist ratio according to a preferred embodiment of the present invention.

The values of the acceleration difference P-P may be divided into a plurality of ranges, and the assist ratio may be changed in accordance with the range to which the calculated acceleration difference P-P belongs. FIG. 12 shows another example of the relationship between the magnitude of the acceleration difference P-P and the selected assist ratio. In the example shown in FIG. 12, the relationship between the acceleration difference P-P and the assist ratio is represented by a step-like function. The assist power to be generated for the pedal force of the rider is increased in the order of assist ratio R1, R2, R3, . . . Ri. The values of the acceleration difference P-P are divided into a plurality of ranges A11 through Ai (i: integer of 2 or greater). The value of the acceleration difference P-P is increased in the order of the range A11, A12, A13, . . . Ai. The motor electric current command value correction block 75 determines the assist ratio in accordance with the range to which the value of the acceleration difference P-P calculated by the acceleration difference P-P calculation block 73 belongs. In this manner, an appropriate level of assist power in accordance with the load is generated.

Figure 13:
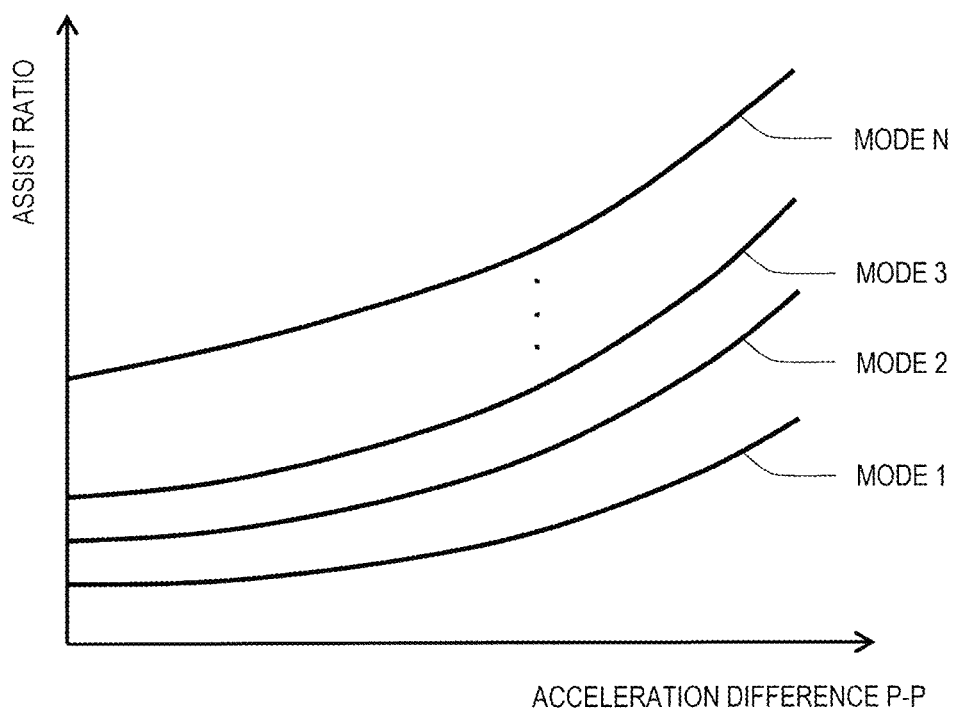
FIG. 13 shows the relationship between the magnitude of the acceleration difference and the selected assist ratio in each of a plurality of assist modes according to a preferred embodiment of the present invention.

FIG. 13 shows the relationship between the magnitude of the acceleration difference P-P and the selected assist ratio in each of the plurality of assist modes. In the example shown in FIG. 13, a function representing the relationship between the acceleration difference P-P and the assist ratio is set for each of the plurality of assist modes.

The assist ratio that is set for the same magnitude of acceleration difference P-P is different among the plurality of assist modes. In one same assist mode, the assist ratio is higher as the acceleration difference P-P is larger.

The motor electric current command value correction block 75 selects the function for the assist mode currently set. The motor electric current command value correction block 75 uses the selected function to determine the assist ratio in accordance with the acceleration difference P-P calculated by the acceleration difference P-P calculation block 73. In this manner, an appropriate level of assist power in accordance with the load is generated.

Figure 14:
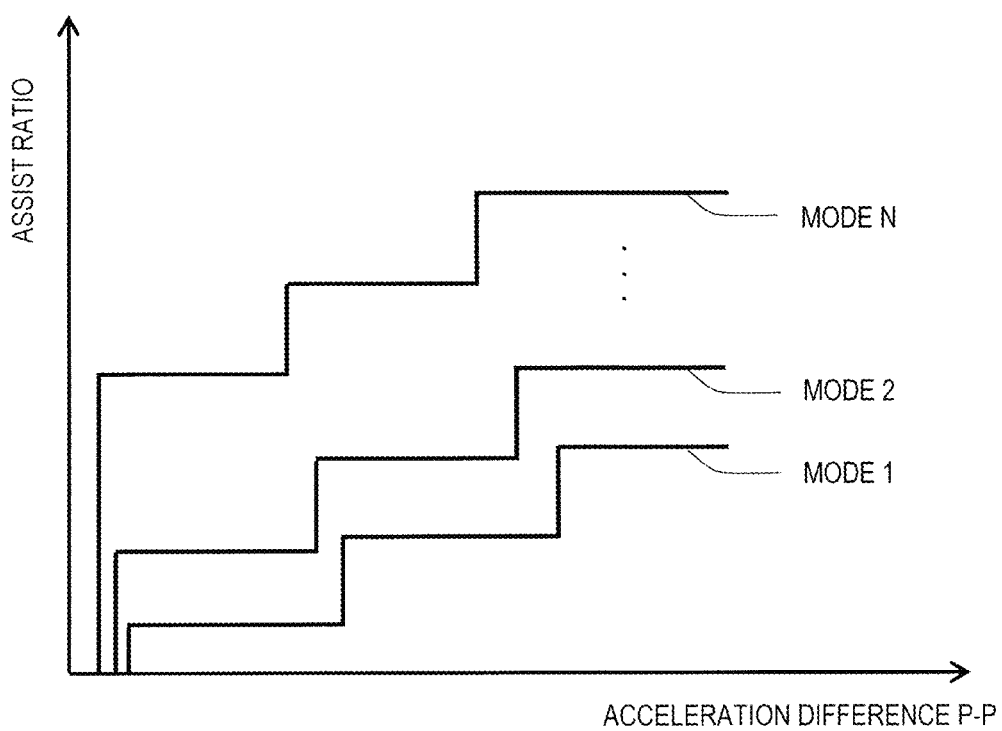
FIG. 14 shows another example of the relationship between the magnitude of the acceleration difference and the selected assist ratio in each of the plurality of assist modes according to a preferred embodiment of the present invention.

FIG. 14 shows another example of the relationship between the magnitude of the acceleration difference P-P and the selected assist ratio in each of the plurality of assist modes. In the example shown in FIG. 14, a step-like function representing the relationship between the acceleration difference P-P and the assist ratio is set for each of the plurality of assist modes.

The motor electric current command value correction block 75 selects the function for the assist mode currently set. The motor electric current command value correction block 75 uses the selected function to determine the assist ratio in accordance with the acceleration difference P–P calculated by the acceleration difference P–P calculation block 73. In this manner, an appropriate level of assist power in accordance with the load is generated.

Figure 15:
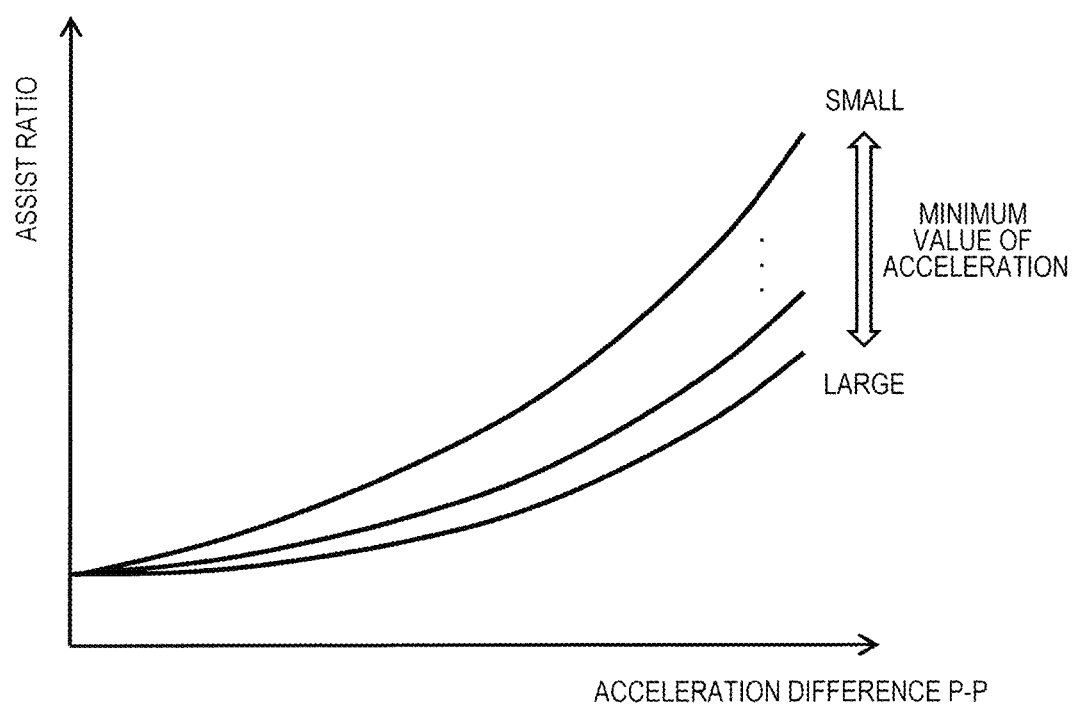
FIG. 15 shows the relationship between the magnitude of the acceleration difference and the selected assist ratio, with the minimum value of the acceleration being considered, according to a preferred embodiment of the present invention.
Figure 16:
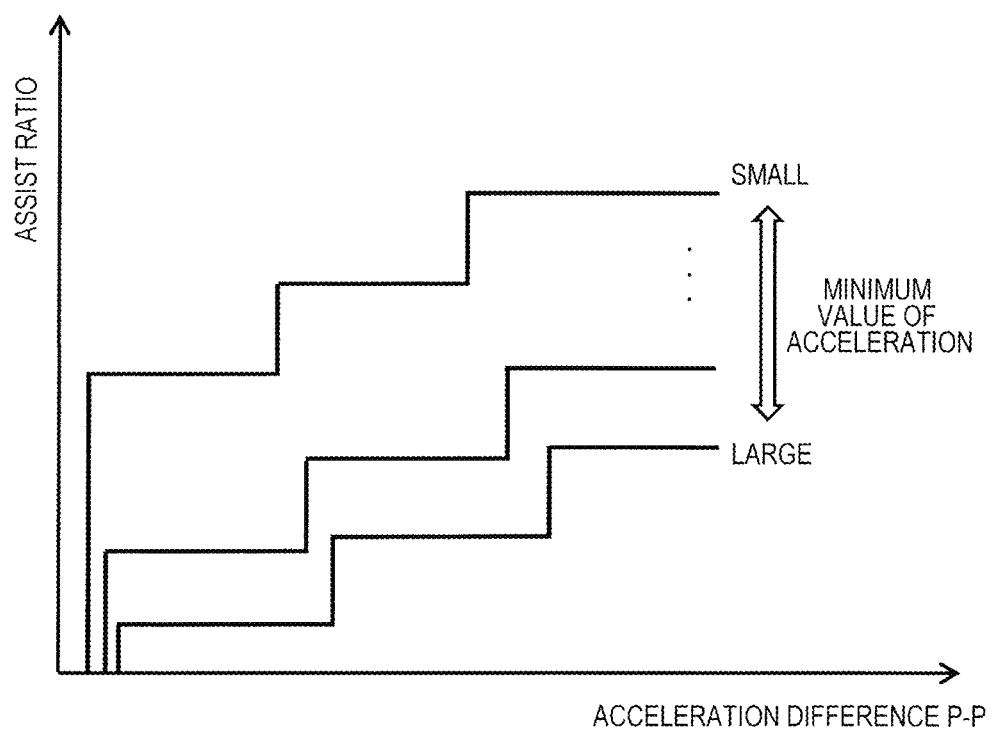
FIG. 16 shows another example of the relationship between the magnitude of the acceleration difference and the selected assist ratio, with the minimum value of the acceleration being considered, according to a preferred embodiment of the present invention.

The relationship between the magnitude of the acceleration difference P–P and the selected assist ratio may be changed in accordance with the minimum value of the detected acceleration. FIG. 15 and FIG. 16 each show the relationship between the magnitude of the acceleration difference P–P and the selected assist ratio. In the example shown in FIG. 15, the relationship between the acceleration difference P–P and the selected assist ratio is represented by a nonlinear function. In the example shown in FIG. 16, the relationship between the acceleration difference P–P and the selected assist ratio is represented by a step-like function.

The acceleration difference P–P calculation block 73 (FIG. 2A) extracts the maximum value and the minimum value of the acceleration between the adjacent ridge and trough of the torque. In the example shown in each of FIG. 15 and FIG. 16, the motor electric current command value correction block 75 changes the function such that as the minimum value of the acceleration between the adjacent ridge and trough of the torque is smaller, the assist ratio for the acceleration difference P–P is larger.

In the case in which the minimum value of the acceleration is small, the load is considered to be heavy. Therefore, as the minimum value of the acceleration is smaller, a larger assist power is generated. In this manner, an appropriate level of assist power in accordance with the load is generated.

Figure 17:
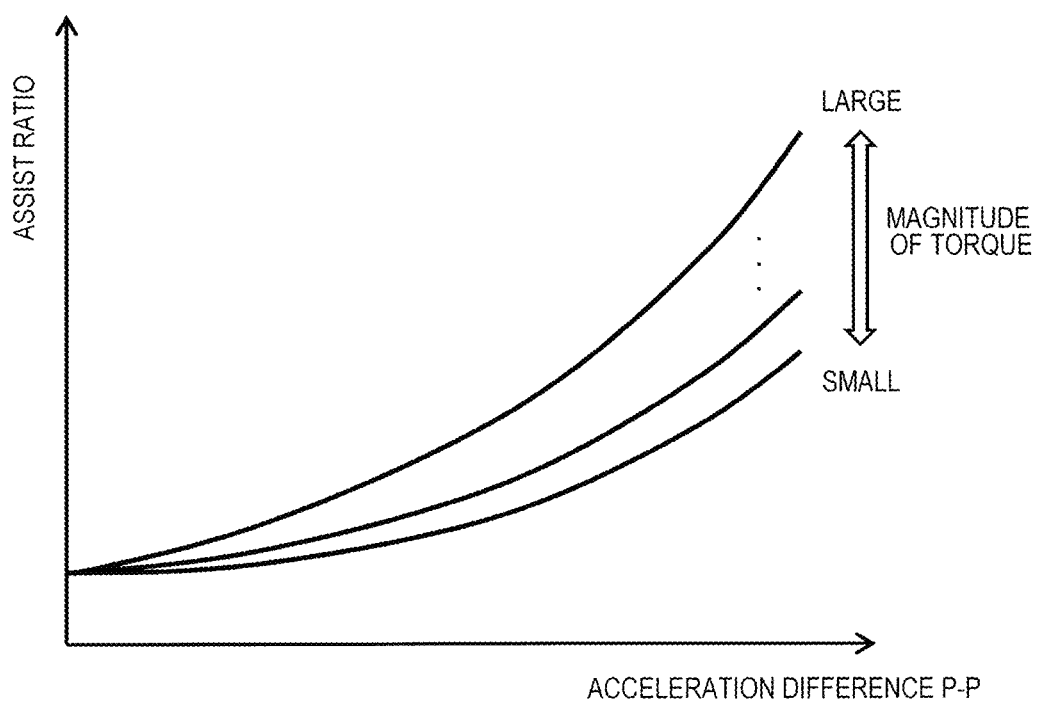
FIG. 17 shows the relationship between the magnitude of the acceleration difference and the selected assist ratio, with the magnitude of the torque being considered, according to a preferred embodiment of the present invention.
Figure 18:
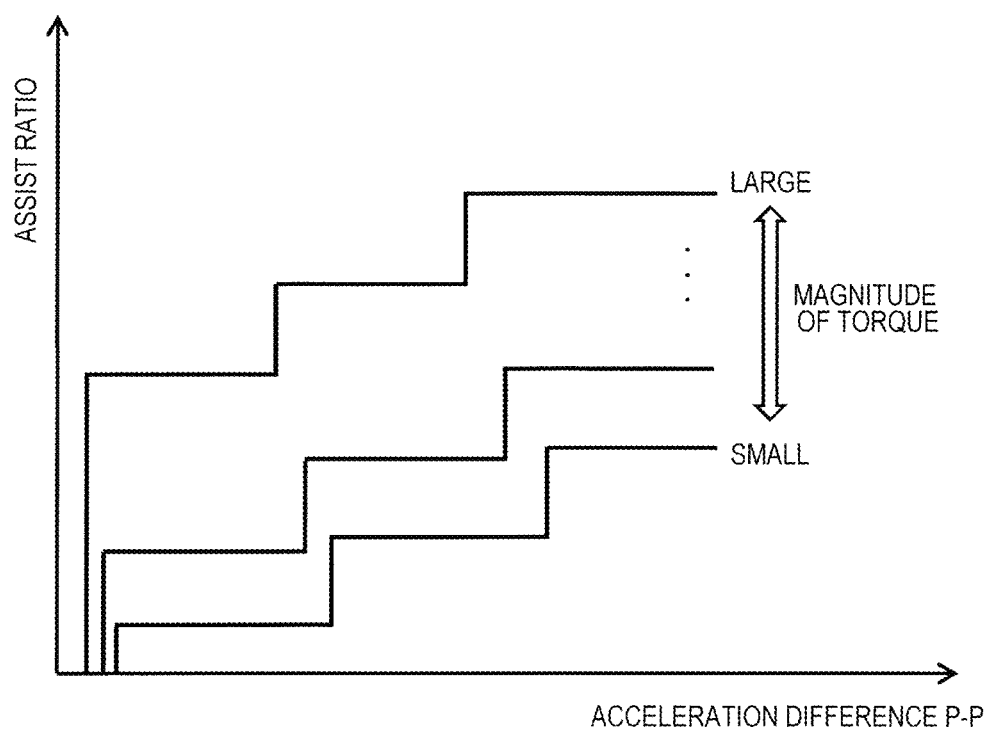
FIG. 18 shows another example of the relationship between the magnitude of the acceleration difference and the selected assist ratio, with the magnitude of the torque being considered, according to a preferred embodiment of the present invention.

The relationship between the magnitude of the acceleration difference P–P and the selected assist ratio may be changed in accordance with the torque generated at the crankshaft 57. FIG. 17 and FIG. 18 each show the relationship between the magnitude of the acceleration difference P–P and the selected assist ratio. In the example shown in FIG. 17, the relationship between the acceleration difference P–P and the selected assist ratio is represented by a nonlinear function. In the example shown in FIG. 18, the relationship between the acceleration difference P–P and the selected assist ratio is represented by a step-like function.

In the example shown in each of FIG. 17 and FIG. 18, the motor electric current command value correction block 75 changes the function such that as the torque detected by the torque sensor 41 is larger, the assist ratio for the acceleration difference P–P is larger.

A large torque generated at the crankshaft 57 indicates a large pedal force applied by the rider to the pedal 55. In the case in which the pedal force of the rider is large, it is considered that the rider tries to accelerate the electric assist bicycle 1 even more. Therefore, as the torque is larger, a larger assist power is generated. In this manner, an appropriate level of assist power in accordance with the intention of the rider is generated.

Figure 19:
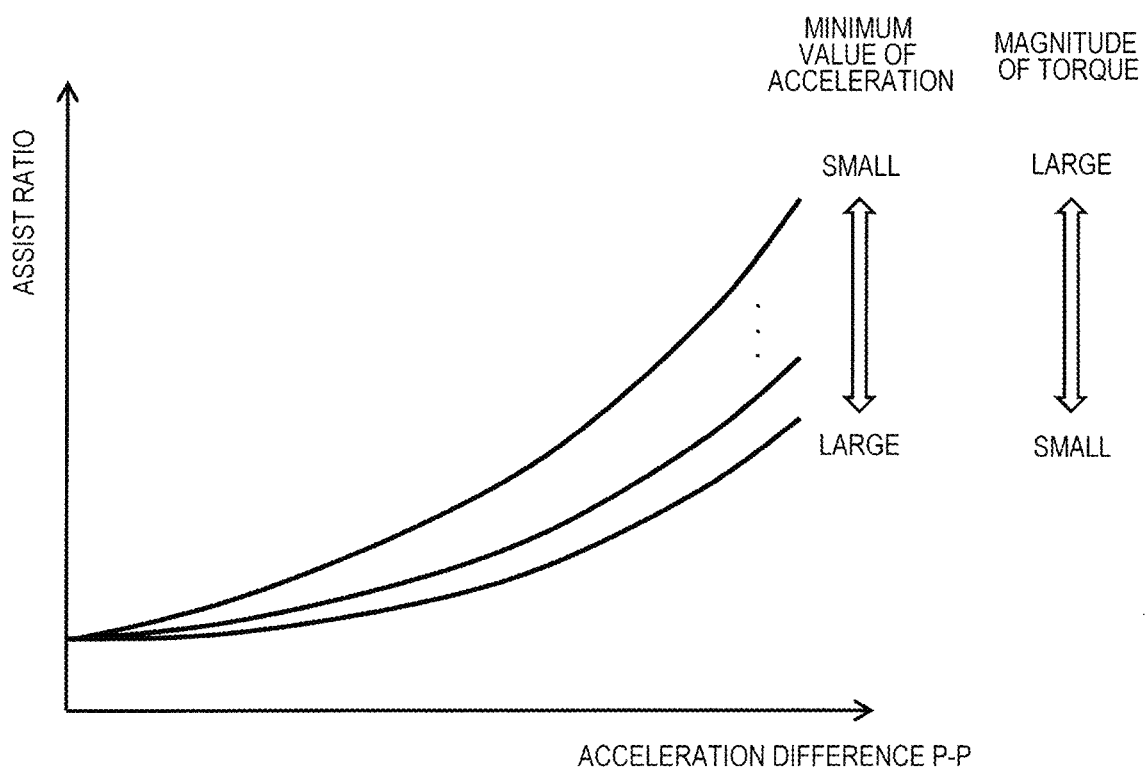
FIG. 19 shows the relationship between the magnitude of the acceleration difference and the selected assist ratio, with the minimum value of the acceleration and the magnitude of the torque being considered, according to a preferred embodiment of the present invention.
Figure 20:
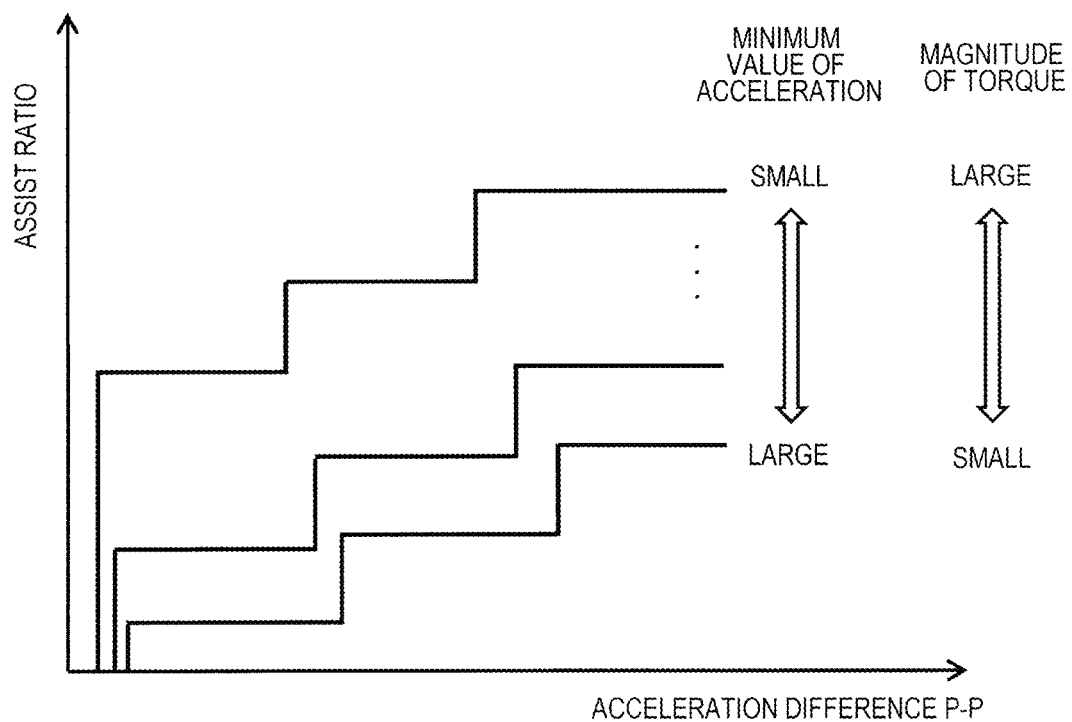
FIG. 20 shows another example of the relationship between the magnitude of the acceleration difference and the selected assist ratio, with the minimum value of the acceleration and the magnitude of the torque being considered, according to a preferred embodiment of the present invention.

The relationship between the magnitude of the acceleration difference P–P and the selected assist ratio may be changed in accordance with both the minimum value of the detected acceleration and the torque generated at the crankshaft 57. FIG. 19 and FIG. 20 each show the relationship between the magnitude of the acceleration difference P–P and the selected assist ratio.

In the example shown in each of FIG. 19 and FIG. 20, the motor electric current command value correction block 75 changes the function such that as the minimum value of the acceleration between the adjacent ridge and trough of the torque is smaller and as the torque detected by the torque sensor 41 is larger, the assist ratio for the acceleration difference P–P is larger.

In the case in which the minimum value of the acceleration is small and the torque is large, it is considered that the rider tries to accelerate the vehicle under a heavy load. Therefore, in the case in which the minimum value of the acceleration is small and the torque is large, a large assist power is generated. In this manner, an appropriate level of assist power in accordance with the intention of the rider is generated.

In the above-described preferred embodiments of the present invention, the difference P–P between the maximum value and the minimum value of the acceleration between the adjacent ridge and trough of the torque that changes is determined. The present invention is not limited to this. A difference between the maximum value and the minimum value of the vehicle speed between the adjacent ridge and trough of the torque that changes may be determined and the magnitude of the assist power may be changed in accordance with the determined difference.

Now, a control performed on the electric motor 53 in the case in which the speed at which the rider rotates the pedal 55 is high and the vehicle speed is high will be described.

As described above, in Japan, at the time of filing of this patent application, there is a regulation by which when the vehicle speed of the electric assist bicycle 1 is 10 km per hour or higher, the upper limit of the assist ratio should be gradually decreased, and when the vehicle speed is 24 km per hour or higher, the assist power should be zero. The control described below with reference to FIG. 21 through FIG. 27 is a control performed by the electric assist bicycle 1 in the case in which such a regulation in Japan is not provided.

In the case in which the speed at which the rider of the electric assist bicycle 1 rotates the pedal 55 is high and the vehicle speed is high, the electric motor 53 is rotated at a high speed accordingly. When the electric motor 53 is rotated at a high speed, the speed of the rotation transmitted from the electric motor 53 to the synthesis mechanism 58 (FIG. 2B) is increased. As described above, the synthesis mechanism 58 is a mechanism that synthesizes the pedal force applied by the rider to the pedal 55 and the assist power generated by the electric motor 53. The resultant force synthesized by the synthesis mechanism 58 is transmitted to the chain 28 via the drive sprocket 59.

In the case in which the speed at which the rider rotates the pedal 55 is high, the vehicle speed is high, and the speed of the rotation transmitted from the electric motor 53 to the synthesis mechanism 58 is high, the load applied on the foot rotating the pedal 55 may become excessively light and thus the rider may feel uncomfortable. For example, in the case in which the speed of the rotation transmitted from the electric motor 53 to the synthesis mechanism 58 is higher than the speed of the rotation transmitted from the crankshaft 57 to the synthesis mechanism 58 by the operation of the rider rotating the pedal 55, the rotation of the crankshaft 57 is not transmitted to the synthesis mechanism 58 by the action of the one-way clutch 47 (FIG. 2B), and as a result, the crankshaft 57 rotates idly. Therefore, substantially no load is applied to the foot rotating the pedal 55, and thus the rider may get a good sense that he/she is rotating the pedal 55.

In the state in which the speed of the rotation transmitted from the electric motor 53 to the synthesis mechanism 58 is high and the pedal force applied by the rider to the pedal 55 is small, the change in the acceleration that is associated with the operation of the rider rotating the pedal 55 is small. Namely, the difference P-P between the maximum value and the minimum value of the acceleration described above is small. In this preferred embodiment, in the case in which conditions are fulfilled that the number of rotations of the crankshaft 57 is a predetermined number or larger, that the vehicle speed is a predetermined speed or higher, and that the acceleration difference P-P is smaller than a predetermined value, a control of decreasing the assist power is performed. The load applied to the foot of the rider rotating the pedal 55 is increased by the degree by which the assist power generated by the electric motor 53 is decreased. In this manner, the load applied to the foot rotating the pedal 55 is suppressed from becoming excessively light and thus the uncomfortable feeling of the rider is alleviated.

Figure 21:
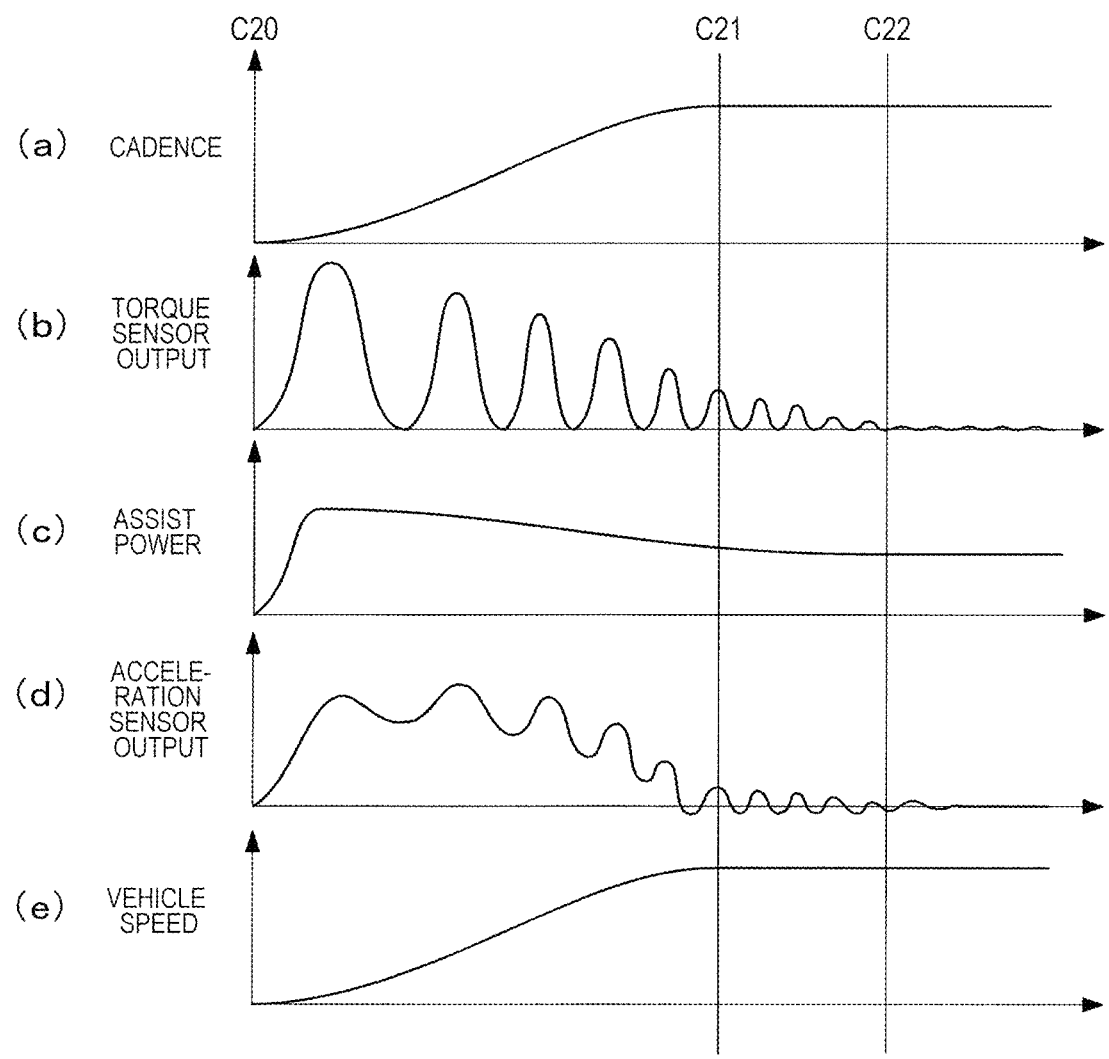
FIG. 21 shows a control performed on an electric motor according to a preferred embodiment of the present invention in the case in which the speed of rotating the pedal is high and the vehicle speed is high.

First, a control performed on the electric motor 53 in the case in which the control in accordance with the acceleration difference P-P is not performed will be described. FIG. 21 shows a control performed on the electric motor 53 in the case in which the speed at which the rider rotates the pedal 55 is high and the vehicle speed is high. In the control performed on the electric motor 53 described with reference to FIG. 21, the control in accordance with the acceleration difference P-P according to this preferred embodiment is not performed.

In each of FIG. 21(a) through FIG. 21(e), the horizontal axis represents the time. In FIG. 21(a), the vertical axis represents the cadence. In FIG. 21(a), the solid line represents a change in the cadence. The "cadence" refers to the number of rotations of the crankshaft 57 per unit of time. For example, the cadence is the number of rotations of the crankshaft 57 per minute (rpm). The cadence is in proportion to the speed at which the rider rotates the pedal 55. In FIG. 21(b), the vertical axis represents the torque generated at the crankshaft 57 that is output by the torque sensor 41. In FIG. 21(b), the solid line represents a change in the torque generated at the crankshaft 57. In FIG. 21(c), the vertical axis represents the assist power generated by the electric motor 53. In FIG. 21(c), the solid line represents a change in the assist power. In FIG. 21(d), the vertical axis represents the acceleration Gx in the x-axis direction that is output by the acceleration sensor 38. In FIG. 21(d), the solid line represents a change in the acceleration Gx. In FIG. 21(e), the vertical axis represents the vehicle speed in the traveling direction of the vehicle. In FIG. 21(e), the solid line represents a change in the vehicle speed. In the example shown in FIG. 21, the electric assist bicycle 1 is running in a direction from left to right in the figure. In this example, the electric assist bicycle 1 is running on a flat road.

In state C20, the electric assist bicycle 1 is at a stop on the flat road. From this state, the rider steps on the pedal 55 to start the electric assist bicycle 1. At the time of starting, the rider strongly steps on the pedal 55, and therefore, the torque generated at the crankshaft 57 is large. In association with the operation of the rider rotating the pedal 55, the torque and the acceleration Gx repeat increasing and decreasing.

At the time of starting, the rider strongly steps on the pedal 55. In the process in which the vehicle speed is increased, the rider increases the speed of rotating the pedal 55 while gradually decreasing the force of rotating the pedal 55. When a desired vehicle speed (e.g., about 20 km/h or higher) is reached in state C21, the rider keeps on driving while maintaining the increased speed of rotating the pedal 55. For example, the rider keeps on rotating the pedal 55 at the speed at which the cadence is 100 rpm or larger.

In the case in which the speed at which the rider rotates the pedal 55 is high and the vehicle speed is high as described above, the electric motor 53 is rotated at a high speed accordingly. As described above, there is a case in which the load applied on the foot rotating the pedal 55 becomes excessively light. In state C22 and thereafter, merely a light load is applied on the foot rotating the pedal 55, and the width in which the torque generated at the crankshaft 57 is changed, and the width in which the acceleration of the vehicle is changed, are narrow. When the load applied on the foot rotating the pedal 55 becomes excessively light, the rider feels uncomfortable.

Figure 22:
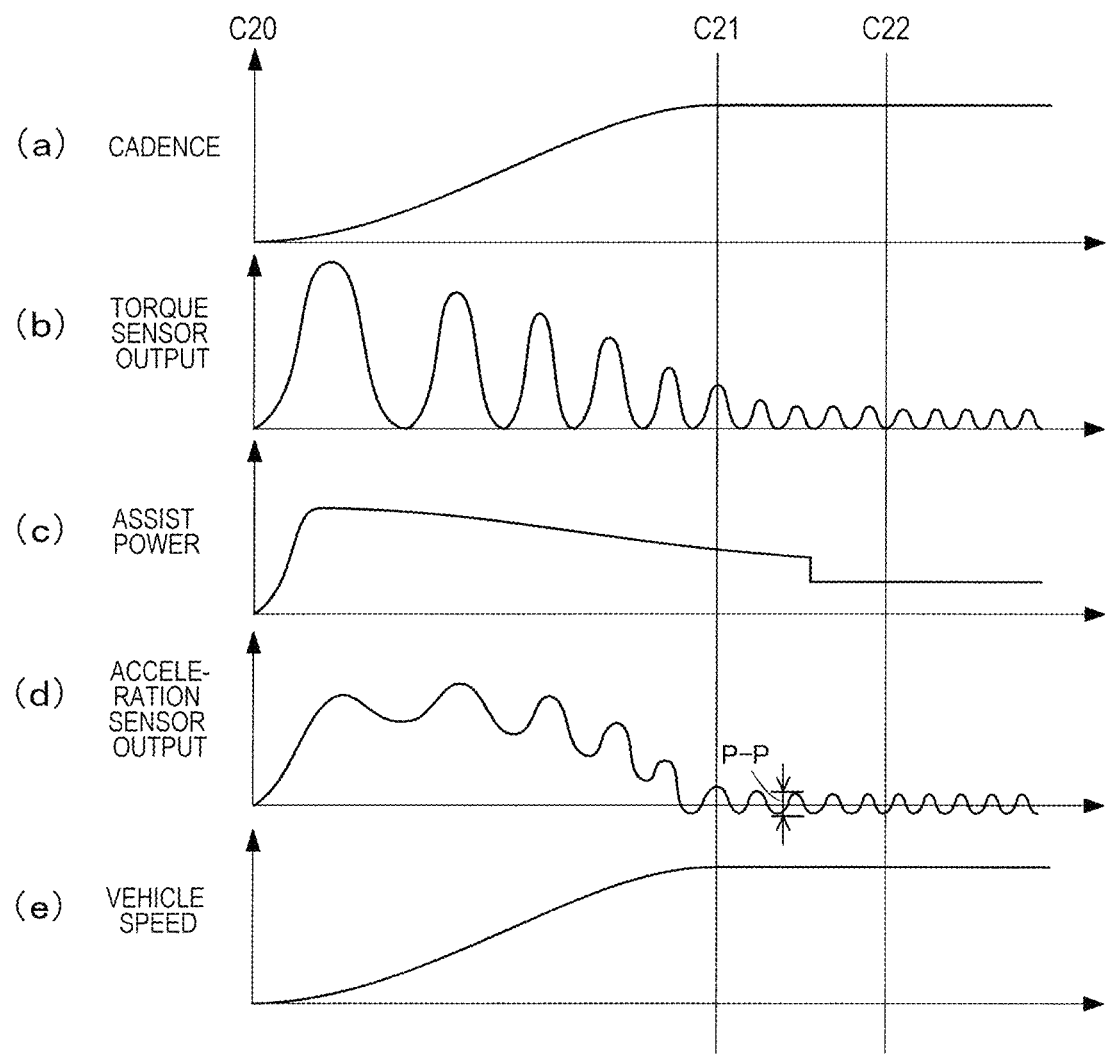
FIG. 22 shows a control performed on the electric motor in accordance with the acceleration difference according to a preferred embodiment of the present invention in the case in which the speed of rotating the pedal is high and the vehicle speed is high.
Figure 23:
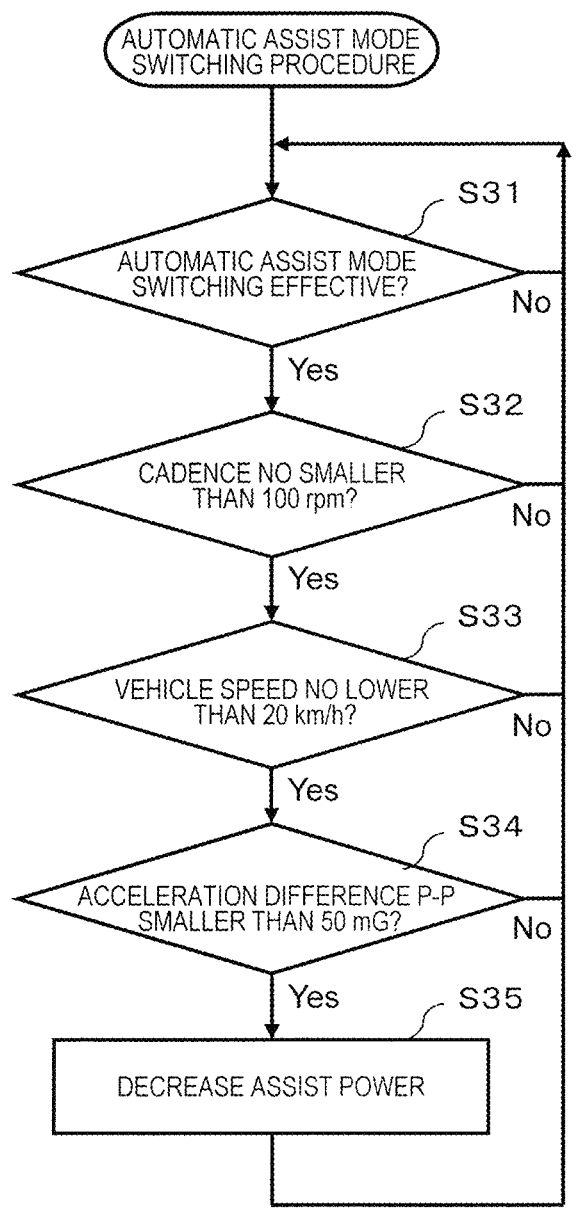
FIG. 23 is a flowchart showing the control performed on the electric motor in accordance with the acceleration difference according to a preferred embodiment of the present invention in the case in which the speed of rotating the pedal is high and the vehicle speed is high.

Now, the control performed on the electric motor 53 in accordance with the acceleration difference P-P according to this preferred embodiment will be described. FIG. 22 shows the control performed on the electric motor 53 in the case in which the speed at which the rider rotates the pedal 55 is high and the vehicle speed is high. FIG. 23 is a flowchart showing the control performed on the electric motor 53 in accordance with the acceleration difference P-P. In the control performed on the electric motor 53 described with reference to FIG. 22 and FIG. 23, the control in accordance with the acceleration difference P-P is performed.

In each of FIG. 22(a) through FIG. 22(e), the horizontal axis represents the time. In FIG. 22(a), the vertical axis represents the cadence. In FIG. 22(a), the solid line represents a change in the cadence. In FIG. 22(b), the vertical axis represents the torque generated at the crankshaft 57 that is output by the torque sensor 41. In FIG. 22(b), the solid line represents a change in the torque generated at the crankshaft 57. In FIG. 22(c), the vertical axis represents the assist power generated by the electric motor 53. In FIG. 22(c), the solid line represents a change in the assist power. In FIG. 22(d), the vertical axis represents the acceleration Gx in the x-axis direction that is output by the acceleration sensor 38. In FIG. 22(d), the solid line represents a change in the acceleration Gx. In FIG. 22(e), the vertical axis represents the vehicle speed in the traveling direction of the vehicle. In FIG. 22(e), the solid line represents a change in the vehicle speed. In the example shown in FIG. 22, the electric assist bicycle 1 is running in a direction from left to right in the figure. In this example, the electric assist bicycle 1 is running on a flat road.

The control performed on the electric motor 23 will be described with reference to FIG. 23. In step S31, the calculation circuit 71 determines whether or not the automatic assist mode switching is effective. Only when the automatic assist mode switching is effective, the calculation circuit 71 advances the procedure to the next step, i.e., step S32.

In step S32, the calculation circuit 71 uses the output signal of the crank rotation sensor 42 to calculate the cadence. The calculation circuit 71 determines whether or not the calculated cadence is not smaller than a predetermined number of rotations. For example, the calculation circuit 71 determines whether or not the calculated cadence is not smaller than 100 rpm. In the case in which the cadence is smaller than 100 rpm, the procedure returns to the process in step S31.

In the case in which the cadence is 100 rpm or larger, in step S33, the calculation circuit 71 uses the output signal of the speed sensor 35 to calculate the vehicle speed. The calculation circuit 71 determines whether or not the calculated vehicle speed is not lower than a predetermined speed. For example, the calculation circuit 71 determines whether or not the calculated vehicle speed is not lower than 20 km/h. In the case in which the vehicle speed is lower than 20 km/h, the procedure returns to the process in step S31.

In the case in which the vehicle speed is 20 km/h or higher, in step S34, the calculation circuit 71 uses the output signal of the acceleration sensor 38 to calculate the acceleration difference P–P. The calculation circuit 71 determines whether or not the calculated acceleration difference P–P is smaller than a predetermined value. For example, the calculation circuit 71 determines whether or not the calculated acceleration difference P–P is smaller than 50 mG. In the case in which the acceleration difference P–P is 50 mG or larger, the procedure returns to the process in step S31. In the case in which the acceleration difference P–P is smaller than 50 mG, the calculation circuit 71 performs a control of decreasing the assist power to be generated by the electric motor 53 (step S35).

Referring to FIG. 22 again, states C20 through C21 in FIG. 22 are the same as those in FIG. 21. In states C20 through C21, at least one of the conditions shown in steps S32 through S34 is not fulfilled, and the calculation circuit 71 controls the electric motor 53 so as to generate an assist power in accordance with the assist mode currently selected.

When a desired vehicle speed (e.g., 20 km/h or higher) is reached in state C21, the rider keeps on driving while maintaining the increased speed of rotating the pedal 55. For example, the rider keeps on rotating the pedal 55 at the speed at which the cadence is 100 rpm or larger. In this process, as described above, the width in which the acceleration of the vehicle is changed is narrowed. Namely, the acceleration difference P–P is decreased.

When it is determined that all the conditions shown in steps S32 through S34 are fulfilled, the calculation circuit 71 performs a control of decreasing the assist power to be generated by the electric motor 53 (step S35). For example, the calculation circuit 71 controls the electric motor 53 to generate an assist power smaller than the assist power calculated based on the assist mode currently set. In the example shown in FIG. 22, as the torque generated at the crankshaft 57 is decreased, the assist power in accordance with the assist mode currently set is gradually decreased. The calculation circuit 71 performs a control of further decreasing the assist power in accordance with the increase in the vehicle speed and the decrease in the acceleration difference P–P. For example, the calculation circuit 71 controls the electric motor 53 to generate the assist power of a magnitude that is 80% of the assist power in accordance with the assist mode currently set. The value of 80% is an example, and any other value is usable.

As described above, in the case in which the conditions are fulfilled that the number of rotations of the crankshaft 57 is a predetermined number or larger, that the vehicle speed is a predetermined speed or higher, and that the acceleration difference P–P is smaller than a predetermined value, the calculation circuit 71 performs the control of decreasing the assist power. The load applied to the foot of the rider rotating the pedal 55 is increased by the degree by which the assist power generated by the electric motor 53 is decreased. In state C22 and thereafter, the width in which the torque generated at the crankshaft 57 is changed, and the width in which the acceleration of the vehicle is changed, are wider in the example shown in FIG. 22 than in the example shown in FIG. 21. This indicates that an appropriate level of load is applied on the foot rotating the pedal 55. In this manner, the electric motor 53 may be controlled according to this preferred embodiment, so that the load applied on the foot rotating the pedal 55 is suppressed from becoming excessively light and thus the uncomfortable feeling of the rider is alleviated.

The order of the processes in steps S32, S33 and S34 shown in FIG. 23 is an example. The order may be changed, or these processes may be performed in parallel. The abovementioned values of the cadence, the vehicle speed and the acceleration difference P–P are examples, and any other values are usable.

Now, another example of control performed on the electric motor 53 in the case in which the speed at which the rider rotates the pedal 55 is high and the vehicle speed is high will be described.

In the case in which the speed at which the rider of the electric assist bicycle 1 rotates the pedal 55 is high, the vehicle speed is high, and the rider is rotating the pedal 55 in the state in which the acceleration in the traveling direction of the vehicle is large, the speed of the rotation transmitted from the electric motor 53 to the synthesis mechanism 58 is increased. When the rider stops increasing the speed of rotating the pedal 55 while the electric motor 53 is rotated at a high speed, the load applied on the foot rotating the pedal 55 may become excessively light and thus the rider may feel uncomfortable. In this preferred embodiment, in the case in which conditions are fulfilled that the number of rotations of the crankshaft 57 is a predetermined number or larger, that the vehicle speed is a predetermined speed or higher, and that the acceleration in the traveling direction of the vehicle is a predetermined value or larger, the assist power is decreased in advance. In this manner, the load applied on the foot of the rider when the rider stops increasing the speed of rotating the pedal 55 is suppressed from becoming excessively light and thus the uncomfortable feeling of the rider is alleviated.

Figure 24:
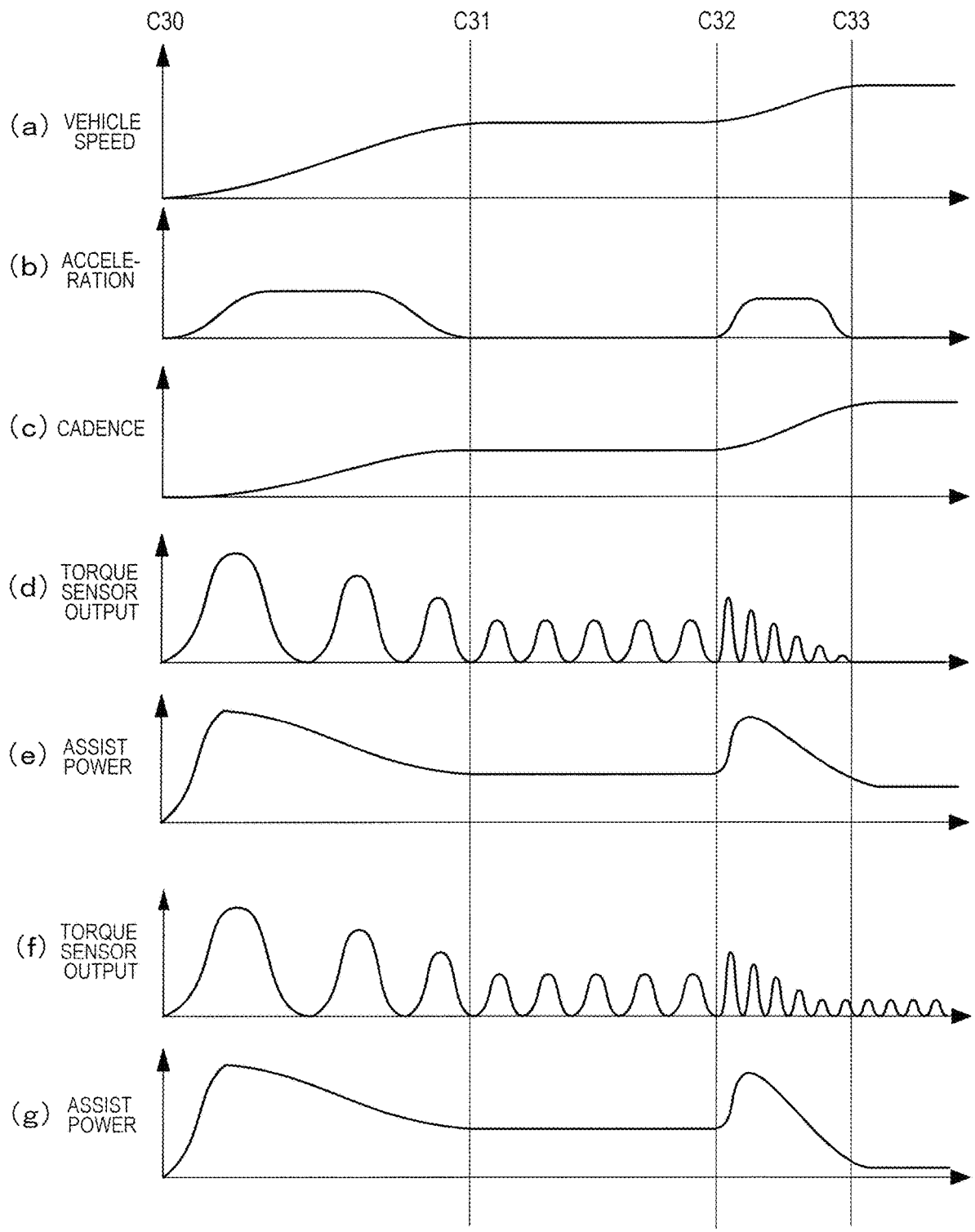
FIG. 24 shows a control performed on the electric motor according to a preferred embodiment of the present invention in the case in which the speed of rotating the pedal is high, the vehicle speed is high and the acceleration in the traveling direction of the vehicle is large.
Figure 25:
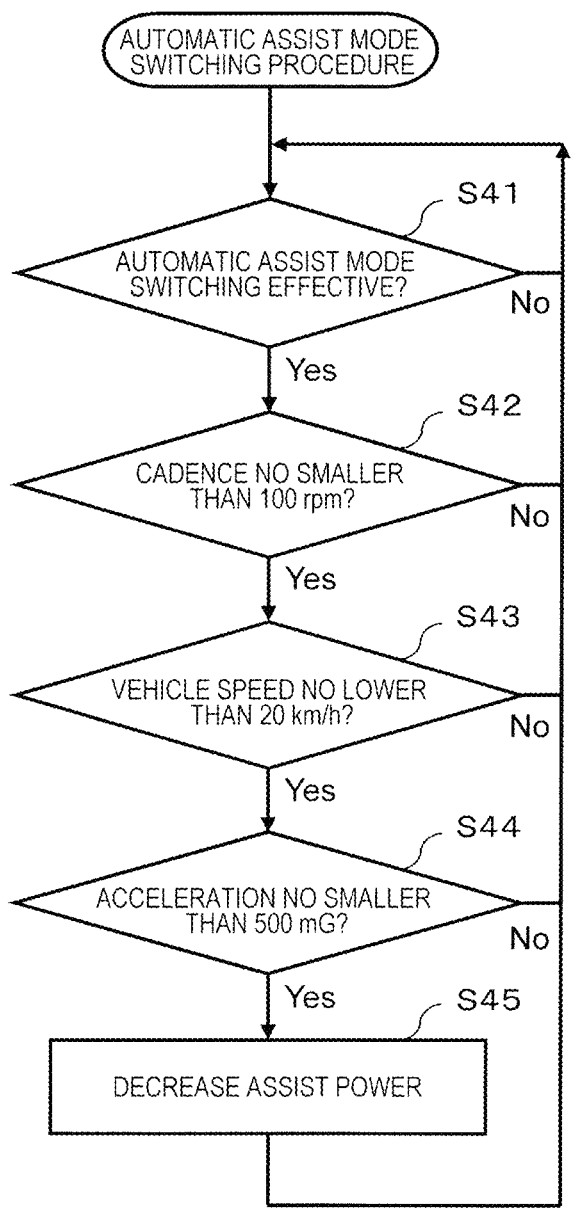
FIG. 25 is a flowchart showing the control performed on the electric motor according to a preferred embodiment of the present invention in the case in which the speed of rotating the pedal is high, the vehicle speed is high and the acceleration in the traveling direction of the vehicle is large.

FIG. 24 shows a control performed on the electric motor 53 in the case in which the speed at which the rider rotates the pedal 55 is high, the vehicle speed is high, and the acceleration in the traveling direction of the vehicle is large. FIG. 25 is a flowchart showing the control performed on the electric motor 53 in the case in which the speed at which the rider rotates the pedal 55 is high, the vehicle speed is high, and the acceleration in the traveling direction of the vehicle is large.

In each of FIG. 24(a) through FIG. 24(g), the horizontal axis represents the time. In FIG. 24(a), the vertical axis represents the vehicle speed in the traveling direction of the vehicle. In FIG. 24(a), the solid line represents a change in the vehicle speed. In FIG. 24(b), the vertical axis represents the acceleration Gx in the x-axis direction that is output by the acceleration sensor 38. In FIG. 24(b), the solid line represents the value of the acceleration Gx filtered by a low-pass filter (LPF). The low-pass filter may be included in, for example, the controller 70. In FIG. 24(c), the vertical axis represents the cadence. In FIG. 24(c), the solid line represents a change in the cadence. In FIG. 24(d), the vertical axis represents the torque generated at the crankshaft 57 that is output by the torque sensor 41. In FIG. 24(d), the solid line represents a change in the torque generated at the crankshaft 57. In FIG. 24(e), the vertical axis represents the assist power generated by the electric motor 53. In FIG. 24(e), the solid line represents a change in the assist power. In FIG. 24(f), the vertical axis represents the torque generated at the crankshaft 57 that is output by the torque sensor 41. In FIG. 24(f), the solid line represents a change in the torque generated at the crankshaft 57. In FIG. 24(g), the vertical axis represents the assist power generated by the electric motor 53. In FIG. 24(g), the solid line represents a change in the assist power. In the example shown in FIG. 24, the electric assist bicycle 1 is running in a direction from left to right in the figure. In this example, the electric assist bicycle 1 is running on a flat road.

The control performed on the electric motor 23 will be described with reference to FIG. 25. In step S41, the calculation circuit 71 determines whether or not the automatic assist mode switching is effective. Only when the automatic assist mode switching is effective, the calculation circuit 71 advances the procedure to the next step, i.e., step S42.

In step S42, the calculation circuit 71 uses the output signal of the crank rotation sensor 42 to calculate the cadence. The calculation circuit 71 determines whether or not the calculated cadence is not smaller than a predetermined number of rotations. For example, the calculation circuit 71 determines whether or not the calculated cadence is not smaller than 100 rpm. In the case in which the cadence is smaller than 100 rpm, the procedure returns to the process in step S41.

In the case in which the cadence is 100 rpm or larger, in step S43, the calculation circuit 71 uses the output signal of the speed sensor 35 to calculate the vehicle speed. The calculation circuit 71 determines whether or not the calculated vehicle is not lower than a predetermined speed. For example, the calculation circuit 71 determines whether or not the calculated vehicle speed is not lower than 20 km/h. In the case in which the vehicle speed is lower than 20 km/h, the procedure returns to the process in step S41.

In the case in which the vehicle speed is 20 km/h or higher, in step S44, the calculation circuit 71 uses the output signal of the acceleration sensor 38 to calculate the acceleration in the traveling direction of the vehicle. For example, the calculation circuit 71 filters the output signal of the acceleration sensor 38 by the low-pass filter (LPF) to obtain the value of the acceleration as shown in FIG. 24(b). The calculation circuit 71 determines whether or not the obtained acceleration is not smaller than a predetermined value. For example, the calculation circuit 71 determines whether or not the acceleration is not smaller than 500 mG. In the case in which the acceleration is smaller than 500 mG, the procedure returns to the process in step S41. In the case in which the acceleration is 500 mG or larger, the calculation circuit 71 performs a control of decreasing the assist power to be generated by the electric motor 53 (step S45).

Referring to FIG. 24, in state C30, the electric assist bicycle 1 is at a stop on the flat road. From this state, the rider steps on the pedal 55 to start the electric assist bicycle 1. At the time of starting, the rider strongly steps on the pedal 55, and therefore, the torque generated at the crankshaft 57 is large. In association with the operation of the rider rotating the pedal 55, the torque and the acceleration Gx repeat increasing and decreasing.

In the process in which the vehicle speed is increased, the rider increases the speed of rotating the pedal 55 while gradually decreasing the force of rotating the pedal 55. When the vehicle speed is increased to a certain level in state C31, the rider keeps on rotating the pedal 55 with the same force so as to maintain the vehicle speed.

In the example shown in FIG. 24, in step C32, the rider increases the force of rotating the pedal 55 and thus the electric assist bicycle 1 increases the speed again. In the process in which the vehicle speed is increased, the rider increases the speed of rotating the pedal 55 while gradually decreasing the force of rotating the pedal 55. In state C33, the rider stops increasing the speed of rotating the pedal 55. The rider keeps on driving while maintaining the increased speed of rotating the pedal 55.

FIG. 24(d) and FIG. 24(e) respectively show the torque generated at the crankshaft 57 and the assist power generated by the electric motor 53 in the case in which the control on the electric motor 53 shown in FIG. 25 is not performed. When the rider stops increasing the speed of rotating the pedal 55 in the state in which the speed of rotating the pedal 55 is high, the vehicle speed is high, and the acceleration in the traveling direction of the vehicle is large, the load applied on the foot rotating the pedal 55 may become excessively light. In state C33 and thereafter, merely a light load is applied on the foot rotating the pedal 55, and the width in which the torque generated at the crankshaft 57 is changed is narrow. When the load applied on the foot rotating the pedal 55 becomes excessively light, the rider feels uncomfortable.

FIG. 24(f) and FIG. 24(g) respectively show the torque generated at the crankshaft 57 and the assist power generated by the electric motor 53 in the case in which the control on the electric motor 53 shown in FIG. 25 is performed. In states C30 through C32, at least one of the conditions shown in steps S42 through S44 is not fulfilled, and the calculation circuit 71 controls the electric motor 53 so as to generate the assist power in accordance with the assist mode currently selected.

In state C32, the rider increases the force of rotating the pedal 55 and thus the cadence, the vehicle speed and the acceleration in the traveling direction of the vehicle are increased. When it is determined that all the conditions shown in steps S42 through S44 are fulfilled, the calculation circuit 71 performs a control of decreasing the assist power to be generated by the electric motor 53 (step S45). For example, the calculation circuit 71 controls the electric motor 53 to generate an assist power smaller than the assist power calculated based on the assist mode currently set. In the example shown in FIG. 24, between states C32 and C33, as the vehicle speed is increased, the assist power in accordance with the assist mode currently set is gradually decreased. The calculation circuit 71 performs a control of further decreasing the assist power.

As described above, in the case in which the conditions are fulfilled that the number of rotations of the crankshaft 57 is a predetermined number or larger, that the vehicle speed is a predetermined speed or higher, and that the acceleration is of a predetermined value or larger, the calculation circuit 71 performs the control of decreasing the assist power. The load applied to the foot of the rider rotating the pedal 55 is increased by the degree by which the assist power generated by the electric motor 53 is decreased. In state C33 and thereafter, the torque generated at the crankshaft 57 is larger in the example shown in FIG. 24(f) than in the example shown in FIG. 24(d). This indicates that an appropriate level of load is applied on the foot rotating the pedal 55. In this manner, the electric motor 53 may be controlled according to this preferred embodiment so that the load applied on the foot rotating the pedal 55 is suppressed from becoming excessively light and thus the uncomfortable feeling of the rider is alleviated.

The order of the processes in steps S42, S43 and S44 shown in FIG. 25 is an example. The order may be changed, or these processes may be performed in parallel. The above-mentioned values of the cadence, the vehicle speed and the acceleration are examples, and any other values are usable.

Figure 26:
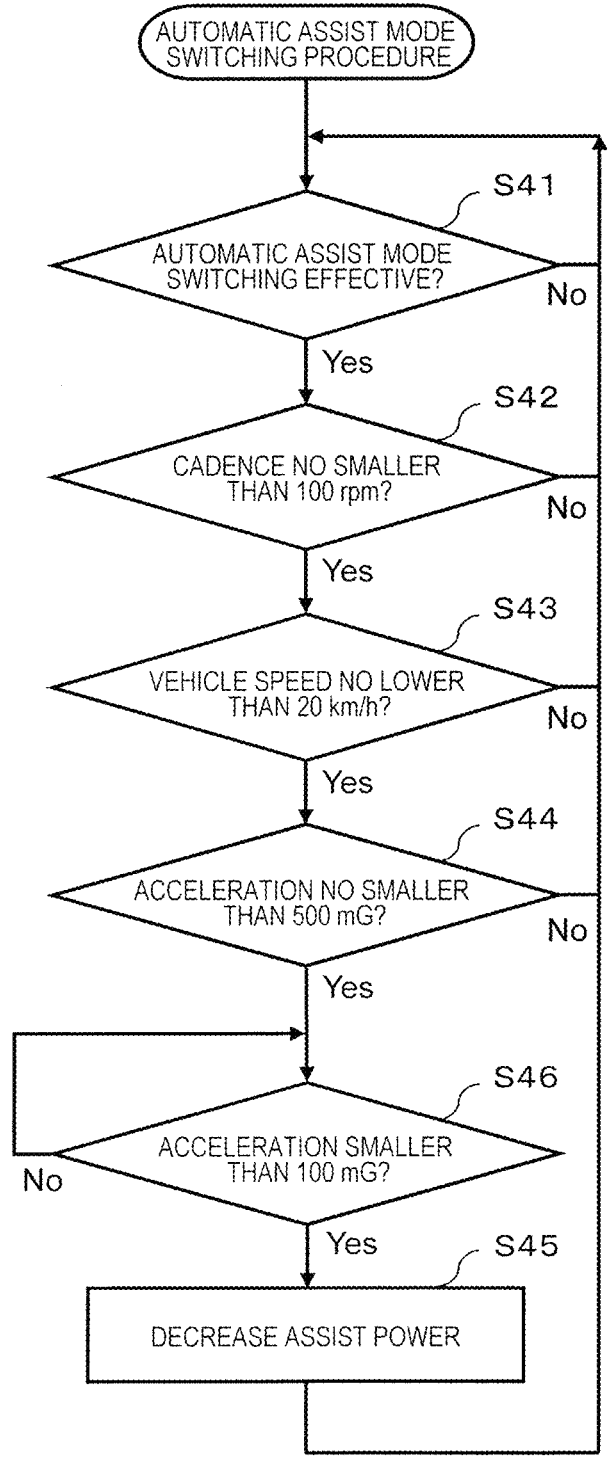
FIG. 26 is a flowchart showing a modification of the control performed on the electric motor according to a preferred embodiment of the present invention in the case in which the speed of rotating the pedal is high, the vehicle speed is high and the acceleration in the traveling direction of the vehicle is large.

Now, a modification of the control performed on the electric motor 53 described with reference to FIG. 24 and FIG. 25 will be described. FIG. 26 is a flowchart showing such a modification of the control performed on the electric motor 53.

The processes in steps S41 through S44 and S45 shown in FIG. 26 are the same as those in FIG. 25. In the control shown in FIG. 26, when it is determined that the acceleration is 500 mG or larger in step S44, the calculation circuit 71 advances the procedure to a process in step S46. In step S46, the calculation circuit 71 determines whether or not the acceleration, which was 500 mG or larger, has been decreased to smaller than a predetermined value. For example, the calculation circuit 71 determines whether or not the acceleration, which was 500 mG or larger, has been decreased to smaller than 100 mG. In the case in which the acceleration, which was 500 mG or larger, has been decreased to smaller than 100 mG, the calculation circuit 71 performs a control of decreasing the assist power to be generated by the electric motor 53 (step S45).

As described above, when the rider stops increasing the speed of rotating the pedal 55 in the state in which the speed at which the rider rotates the pedal 55 is high, the vehicle speed is high, and the acceleration in the traveling direction of the vehicle is large, the load applied on the foot rotating the pedal 55 becomes excessively light and thus the rider feels uncomfortable. As the rider decreases the ratio at which the speed of rotating the pedal 55 is increased, the acceleration in the traveling direction of the vehicle is decreased accordingly. Such a decrease in the acceleration which was once increased indicates that a phenomenon may occur later that the load applied on the foot rotating the pedal 55 becomes excessively light. When it is determined that all the conditions shown in steps S41 through S44 and S46 are fulfilled, the calculation circuit 71 performs the control of decreasing the assist power to be generated by the electric motor 53. In this manner, the load applied to the foot rotating the pedal 55 is suppressed from becoming excessively light and thus the uncomfortable feeling of the rider is alleviated.

If, When it is determined that all the conditions shown in steps S41 through S44 are fulfilled, the calculation circuit 71 immediately performs a control of decreasing the assist power to be generated by the electric motor 53, there may be a case in which the assist power is decreased against the intention of the rider to further accelerate the electric assist bicycle 1. In the example shown in FIG. 26, when it is determined that all the conditions shown in steps S41 through S44 and S46 are fulfilled, the calculation circuit 71 performs the control of decreasing the assist power to be generated by the electric motor 53. In this manner, while the intention of the rider to further accelerate the electric assist bicycle 1 is reflected, the load applied to the foot rotating the pedal 55 is suppressed from becoming excessively light and thus the uncomfortable feeling of the rider is alleviated.

Figure 27:
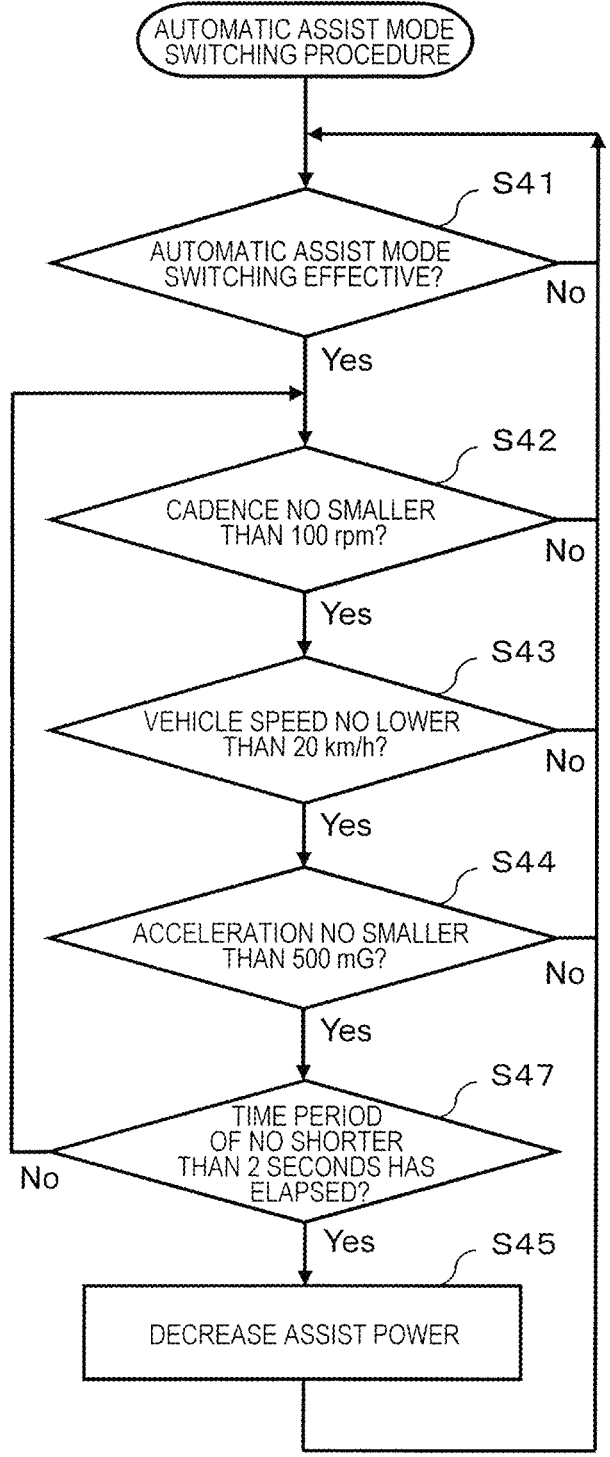
FIG. 27 is a flowchart showing another modification of the control performed on the electric motor according to a preferred embodiment of the present invention in the case in which the speed of rotating the pedal is high, the vehicle speed is high and the acceleration in the traveling direction of the vehicle is large.

Now, another modification of the control performed on the electric motor 53 described with reference to FIG. 24 and FIG. 25 will be described. FIG. 27 is a flowchart showing such another modification of the control performed on the electric motor 53.

The processes in steps S41 through S44 shown in FIG. 27 are the same as those in FIG. 25. In the control shown in FIG. 27, when it is determined that the acceleration is 500 mG or larger in step S44, the calculation circuit 71 advances the procedure to a process in step S47. In step S47, the calculation circuit 71 determines whether or not a predetermined time has elapsed in the state in which the conditions are fulfilled that the cadence is 100 rpm or larger, the vehicle speed is 20 km/h or higher and the acceleration is 500 mG or larger. For example, the calculation circuit 71 determines whether or not a time period of not shorter than 2 seconds has elapsed in the state in which the above-mentioned values are fulfilled. After the time period of 2 seconds or longer elapses in the state in which the above-mentioned values are fulfilled, the calculation circuit 71 performs a control of decreasing the assist power to be generated by the electric motor 53 (step S45).

As described above, when the rider stops increasing the speed of rotating the pedal 55 in the state in which the speed at which the rider rotates the pedal 55 is high, the vehicle speed is high, and the acceleration in the traveling direction of the vehicle is large, the load applied on the foot rotating the pedal 55 may become excessively light and thus the rider may feel uncomfortable. If, when it is determined that all the conditions shown in steps S41 through S44 are fulfilled, the calculation circuit 71 immediately performs the control of decreasing the assist power to be generated by the electric motor 53, there may be a case in which the assist power is decreased against the intention of the rider to further accelerate the electric assist bicycle 1. In the example shown in FIG. 27, when it is determined that all the conditions shown in steps S41 through S44 and S47 are fulfilled, the calculation circuit 71 performs the control of decreasing the assist power to be generated by the electric motor 53. In this manner, while the intention of the rider to further accelerate the electric assist bicycle 1 is reflected, the load applied to the foot rotating the pedal 55 is suppressed from becoming excessively light and thus the uncomfortable feeling of the rider is alleviated.

The order of the processes in steps S42, S43 and S44 shown in each of FIG. 26 and FIG. 27 is an example. The order may be changed, or these processes may be performed in parallel. The above-mentioned values of the cadence, the vehicle speed, the acceleration and the time period are examples, and any other values are usable.

In the above description, a two-wheel electric assist bicycle is used as an example of the electric assist bicycle. The present invention is not limited to this. The electric assist bicycle may be, for example, an electric assist bicycle including three or more wheels.

In the above description, the driving wheel to which the human power generated by the rider stepping on the pedal and the assist power generated by the electric motor are transmitted is the rear wheel. The present invention is not limited to this. The human power and the assist power may be transmitted to the front wheel or both of the front wheel and the rear wheel in accordance with the type of the electric assist bicycle.

Some illustrative preferred embodiments of the present invention have been described so far.

As described above, the electric assist system 51 for the electric assist vehicle 1 according to preferred embodiments of the present invention includes the crankshaft 57 rotatable by human power of a rider applied to the pedal 55; the electric motor 53 that generates an assist power assisting the human power of the rider; the controller 70 configured or programmed to control a magnitude of the assist power to be generated by the electric motor 53; and the acceleration sensor 38 that outputs a signal in accordance with an acceleration in a traveling direction of the electric assist vehicle 1. The controller 70 changes the magnitude of the assist power to be generated by the electric motor 53 in accordance with a change in the acceleration that is associated with an operation of the rider rotating the pedal 55.

Because of the structure of the bicycle of allowing the rider to have his/her foot step on, and rotate, the pedal 55, the magnitude of the human power of the rider applied to the pedal 55 is changed in accordance with the rotation angle of the crankshaft 57 while the rider is rotating the pedal 55. Therefore, the acceleration in the traveling direction of the electric assist bicycle 1 is changed in accordance with the rotation angle of the crankshaft 57 while the rider is rotating the pedal 55. The magnitude of the assist power may be changed in accordance with the acceleration changing in association with the operation of the rider rotating the pedal 55, so that an appropriate level of assist power in accordance with the load during running is generated.

In a preferred embodiment of the present invention, the electric assist system 51 further includes the torque sensor 41 that outputs a signal in accordance with a torque generated at the crankshaft 57. The torque generated at the crankshaft 57 by the human power of the rider applied to the pedal 55 changes in accordance with the rotation of the crankshaft 57. The controller 70 is configured or programmed to change the magnitude of the assist power to be generated by the electric motor 53 in accordance with a change in the acceleration that is associated with the change in the torque.

The magnitude of the human power of the rider applied to the pedal 55 is changed in accordance with the rotation angle of the crankshaft 57 while the rider is rotating the pedal 55. Such a change in the human power of the rider applied to the pedal 55 appears as a change in the torque generated at the crankshaft 57. The acceleration in the traveling direction of the electric assist bicycle 1 is changed in accordance with the change in the torque generated at the crankshaft 57. The magnitude of the assist power may be changed in accordance with the acceleration changing in association with the change in the torque so that an appropriate level of assist power in accordance with the load during running is generated.

In a preferred embodiment of the present invention, a magnitude of the torque generated at the crankshaft 57 by the human power of the rider applied to the pedal 55 increases and decreases in accordance with the rotation of the crankshaft 57. The controller 70 is configured or programmed to change the magnitude of the assist power to be generated by the electric motor 53 in accordance with a change in the acceleration between an adjacent ridge and trough of the torque that increases and decreases.

In the case in which the load during running is heavy, the acceleration is decreased significantly at the timing when the torque generated at the crankshaft 57 by the human power applied to the pedal 55 is decreased. Therefore, the change in the acceleration between the adjacent ridge and trough of the torque is increased. In the case in which the load during running is light, the acceleration is not decreased much at a time when the torque generated at the crankshaft 57 by the human power applied to the pedal 55 is decreased. Therefore, the change in the acceleration between the adjacent ridge and trough of the torque is decreased. The magnitude of the assist power to be generated by the electric motor 53 may be changed in accordance with the change in the acceleration between the adjacent ridge and trough of the torque, so that an appropriate level of assist power in accordance with the heavy load is generated.

In a preferred embodiment of the present invention, a magnitude of the torque generated at the crankshaft 57 by the human power of the rider applied to the pedal 55 increases and decreases in accordance with the rotation of the crankshaft 57. The controller 70 determines a difference between a maximum value and a minimum value of the acceleration between an adjacent ridge and trough of the torque that increases and decreases. The controller 70 is configured or programmed to change the magnitude of the assist power to be generated by the electric motor 53 in accordance with the difference between the maximum value and the minimum value of the acceleration.

The magnitude of the assist power may be changed in accordance with the difference between the maximum value and the minimum value of the acceleration between the adjacent ridge and trough of the torque, so that an appropriate level of assist power in accordance with the load during running is generated.

In a preferred embodiment of the present invention, the controller 70 increases the assist power to be generated by the electric motor 53 as the change in the acceleration between the adjacent ridge and trough of the torque that increases and decreases is larger.

In the case in which the load during running is heavy, the acceleration is decreased significantly at a time when the torque generated at the crankshaft 57 by the human power applied to the pedal 55 is decreased. Therefore, the change in the acceleration while the crankshaft 57 makes a half rotation is increased. In the case in which the change in the acceleration during the half rotation of the crankshaft 57 is large, the assist power to be generated by the electric motor 53 may be increased. With such an arrangement, an appropriate level of assist power in accordance with the heavy load is generated.

In a preferred embodiment of the present invention, the electric assist system 51 further includes the sensor 42 that detects the rotation of the crankshaft 57. The controller 70 is configured or programmed to change the magnitude of the assist power to be generated by the electric motor 53 in accordance with a change in the acceleration during a half rotation of the crankshaft 57.

In the case in which the rider rotates the pedal 55 with his/her foot, the magnitude of the human power of the rider applied to the pedal 55 is changed during the half rotation of the crankshaft 57. The acceleration in the traveling direction of the electric assist bicycle 1 is changed in accordance with the change in the magnitude of the human power applied to the pedal 55. The magnitude of the assist power may be changed in accordance with the change in the acceleration during the half rotation of the crankshaft 57, so that an appropriate level of assist power in accordance with the load during running is generated.

In a preferred embodiment of the present invention, the controller 70 is configured or programmed to determine a difference between a maximum value and a minimum value of the acceleration during the half rotation of the crankshaft 57. The controller 70 changes the magnitude of the assist power to be generated by the electric motor 53 in accordance with the difference between the maximum value and the minimum value of the acceleration.

The magnitude of the assist power may be changed in accordance with the difference between the maximum value and the minimum value of the acceleration during the half rotation of the crankshaft 57 so that an appropriate level of assist power in accordance with the load during running is generated.

In a preferred embodiment of the present invention, the sensor that detects the rotation of the crankshaft 57 may be the torque sensor 41 that detects a torque generated at the crankshaft 57. The controller 70 is configured or programmed to determine the rotation of the crankshaft 57 based on a change in the torque.

A torque is generated at the crankshaft 57 by the human power of the rider applied to the pedal 55. The magnitude of the torque generated at the crankshaft 57 is changed in accordance with the rotation angle of the crankshaft 57. Based on this, the rotation of the crankshaft 57 may be determined from a change in the magnitude of the torque. The rotation of the crankshaft 57 may be detected by the torque sensor 41, and the magnitude of the assist power may be changed in accordance with the change in the acceleration during the half rotation of the crankshaft 57. With such an arrangement, an appropriate level of assist power in accordance with the load during running is generated.

In a preferred embodiment of the present invention, the sensor that detects the rotation of the crankshaft 57 may be the rotation sensor 42.

The rotation of the crankshaft 57 may be detected by the rotation sensor 42, and the magnitude of the assist power may be changed in accordance with the change in the acceleration during the half rotation of the crankshaft 57. With such an arrangement, an appropriate level of assist power in accordance with the load during running is generated.

In a preferred embodiment of the present invention, the controller 70 is configured or programmed to increase the assist power to be generated by the electric motor 53 in the case in which the difference between the maximum value and the minimum value of the acceleration is a first predetermined value or larger.

In the case in which the load during running is heavy, the acceleration is decreased significantly at the timing when the torque generated at the crankshaft 57 by the human power applied to the pedal 55 is decreased. Therefore, the difference between the maximum value and the minimum value of the acceleration is increased. In the case in which the difference between the maximum value and the minimum value of the acceleration is large, the assist power to be generated by the electric motor 53 may be increased. With such an arrangement, an appropriate level of assist power in accordance with the heavy load is generated.

In a preferred embodiment of the present invention, the controller 70 is configured or programmed to decrease the assist power to be generated by the electric motor 53 in the case in which the difference between the maximum value and the minimum value of the acceleration is smaller than a second predetermined value.

In the case in which the load during running is light, the acceleration is not decreased much at a time when the torque generated at the crankshaft 57 by the human power applied to the pedal 55 is decreased. Therefore, the difference between the maximum value and the minimum value of the acceleration is decreased. In the case in which the difference between the maximum value and the minimum value of the acceleration is small, the assist power to be generated by the electric motor 53 may be decreased. With such an arrangement, an appropriate level of assist power in accordance with the light load is generated.

In a preferred embodiment of the present invention, the controller 70 is configured or programmed to store, in advance, a table in which values of the difference between the maximum value and the minimum value of the acceleration are divided into a plurality of ranges. The controller 70 changes the magnitude of the assist power to be generated by the electric motor 53 in accordance with the range, among the plurality of ranges, to which the difference between the maximum value and the minimum value of the acceleration determined by the acceleration sensor 38 belongs.

The magnitude of the assist power may be changed in accordance with the range to which the difference between the maximum value and the minimum value of the acceleration belongs so that an appropriate level of assist power in accordance with the load during running is generated.

In a preferred embodiment of the present invention, the plurality of ranges include a first range and a second range, which is a range of larger values of the difference than the values in the first range. In the case in which the difference is a value belonging to the second range, the controller 70 is configured or programmed to increase the assist power to be generated by the electric motor 53 as compared with the assist power in the case in which the difference is a value belonging to the first range.

In the case in which the load during running is heavy, the acceleration is decreased significantly at the timing when the torque generated at the crankshaft 57 by the human power applied to the pedal 55 is decreased. Therefore, the difference between the maximum value and the minimum value of the acceleration is increased. In the case in which the difference between the maximum value and the minimum value of the acceleration is large, the magnitude of the assist power to be generated by the electric motor 53 may be increased. With such an arrangement, an appropriate level of assist power in accordance with the heavy load is generated.

In a preferred embodiment of the present invention, the controller 70 is configured or programmed to store, in advance, a plurality of assist modes different from each other in the relationship between the human power of the rider and the assist power, and a table in which values of the difference between the maximum value and the minimum value of the acceleration are divided into a plurality of ranges. The controller 70 changes the assist mode in accordance with the range, among the plurality of ranges, to which the difference between the maximum value and the minimum value of the acceleration determined by the acceleration sensor 38 belongs.

The assist mode may be changed in accordance with the range to which the difference between the maximum value and the minimum value of the acceleration belongs so that an appropriate level of assist power in accordance with the load during running is generated.

In a preferred embodiment of the present invention, the plurality of ranges include a first range and a second range, which is a range of larger values of the difference than the values in the first range. The plurality of assist modes include a first assist mode and a second assist mode, in which the assist power provided for the human power of the rider is larger than in the first mode. In the case in which the difference between the maximum value and the minimum value of the acceleration determined by the acceleration sensor 38 belongs to the first range, the controller 70 is configured or programmed to cause the electric motor 53 to generate an assist power in accordance with the first assist mode. In the case in which the difference between the maximum value and the minimum value of the acceleration determined from the acceleration sensor 38 belongs to the second range, the controller 70 is configured or programmed to cause the electric motor 53 to generate an assist power in accordance with the second assist mode.

In the case in which the difference between the maximum value and the minimum value of the acceleration is large, the electric motor 53 may be controlled in the assist mode in which the assist power provided for the human power of the rider is large. With such an arrangement, an appropriate level of assist power in accordance with the load is generated.

In a preferred embodiment of the present invention, the electric assist system 51 further includes the sensor 42 that detects the rotation of the crankshaft 57; and the sensor 35 that detects a running speed of the electric assist vehicle 1. The controller 70 is configured or programmed to determine whether or not conditions are fulfilled that the number of rotations of the crankshaft 57 is a predetermined number or larger, that the running speed of the electric assist vehicle 1 is a predetermined speed or higher, and that the difference between the maximum value and the minimum value of the acceleration is smaller than a predetermined value. When it is determined that the conditions are fulfilled, the controller 70 decreases the assist power to be generated by the electric motor 53.

In the case in which the speed at which the rider rotates the pedal 55 is high and the vehicle speed is high, the speed of the rotation transmitted from the electric motor 53 to the synthesis mechanism 58 is increased. In this case, the load applied on the foot rotating the pedal 55 may become excessively light and thus the rider may feel uncomfortable. In the state in which the electric motor 53 rotates at a high speed and the pedal force applied by the rider to the pedal 55 is small, the difference between the maximum value and the minimum value of the acceleration is decreased. In the case in which conditions are fulfilled that the number of rotations of the crankshaft 57 is a predetermined number or larger, that the running speed is a predetermined speed or higher, and that the difference between the maximum value and the minimum value of the acceleration is smaller than a predetermined value, the assist power is decreased. The load applied to the foot of the rider rotating the pedal 55 is increased by the degree by which the assist power is decreased. In this manner, the load applied to the foot rotating the pedal 55 is suppressed from becoming excessively light and thus the uncomfortable feeling of the rider is alleviated.

In a preferred embodiment of the present invention, the electric assist system 51 further includes the sensor 42 that detects the rotation of the crankshaft 57; and the sensor 35 that detects a running speed of the electric assist vehicle 1. The controller 70 is configured or programmed to determine whether or not conditions are fulfilled that the number of rotations of the crankshaft 57 is a predetermined number or larger, that the running speed of the electric assist vehicle 1 is a predetermined speed or higher, and that the acceleration is of a predetermined value or larger. When it is determined that the conditions are fulfilled, the controller 70 decreases the assist power to be generated by the electric motor 53.

In the case in which the speed at which the rider of the electric assist bicycle 1 rotates the pedal 55 is high, the vehicle speed is high, and the rider is rotating the pedal 55 in the state in which the acceleration in the traveling direction of the vehicle is large, the speed of the rotation transmitted from the electric motor 53 to the synthesis mechanism 58 is high. When the rider stops increasing the speed of rotating the pedal 55 while the electric motor 53 is rotated at a high speed, the load applied on the foot rotating the pedal 55 may become excessively light and thus the rider may feel uncomfortable. In the case in which the conditions are fulfilled that the number of rotations of the crankshaft 57 is a predetermined number or larger, that the running speed is a predetermined speed or higher, and that the acceleration is of a predetermined value or larger, the assist power is decreased in advance. The load applied to the foot of the rider rotating the pedal 55 is increased by the degree by which the assist power is decreased. In this manner, the load applied on the foot of the rider when the rider stops increasing the speed of rotating the pedal 55 is suppressed from becoming excessively light and thus the uncomfortable feeling of the rider is alleviated.

In a preferred embodiment of the present invention, the electric assist system 51 further includes the sensor 42 that detects the rotation of the crankshaft 57; and the sensor 35 that detects a running speed of the electric assist vehicle 1. The controller 70 is configured or programmed to determine whether or not conditions are fulfilled that the number of rotations of the crankshaft 57 is a predetermined number or larger, that the running speed of the electric assist vehicle 1 is a predetermined speed or higher, and that the acceleration becomes a first predetermined value or larger and then becomes a value smaller than a second predetermined value which is smaller than the first predetermined value. When it is determined that the conditions are fulfilled, the controller 70 decreases the assist power to be generated by the electric motor 53.

In the case in which the speed at which the rider of the electric assist bicycle 1 rotates the pedal 55 is high, the vehicle speed is high, and the rider is rotating the pedal 55 in the state in which the acceleration in the traveling direction of the vehicle is large, the speed of the rotation transmitted from the electric motor 53 to the synthesis mechanism 58 is increased. When the rider stops increasing the speed of rotating the pedal 55 while the electric motor 53 is rotated at a high speed, the load applied on the foot rotating the pedal 55 may become excessively light and thus the rider may feel uncomfortable. As the rider decreases the ratio at which the speed of rotating the pedal 55 is increased, the acceleration in the traveling direction of the vehicle is decreased accordingly. Such decrease in the acceleration which was once increased indicates that a phenomenon may occur later that the load applied on the foot rotating the pedal 55 becomes excessively light. In the case in which the conditions are fulfilled that the number of rotations of the crankshaft 57 is a predetermined number or larger, that the running speed is a predetermined speed or higher, and that the acceleration becomes the first predetermined value or larger and then becomes a value smaller than the second predetermined value, the assist power is decreased. The load applied to the foot of the rider rotating the pedal 55 is increased by the degree by which the assist power is decreased. In this manner, the load applied on the foot of the rider when the rider stops increasing the speed of rotating the pedal 55 is suppressed from becoming excessively light and thus the uncomfortable feeling of the rider is alleviated.

In a preferred embodiment of the present invention, the electric assist system 51 further includes the sensor 42 that detects the rotation of the crankshaft 57; and the sensor 35 that detects a running speed of the electric assist vehicle 1. The controller 70 is configured or programmed to determine whether or not a condition is fulfilled that a predetermined time period has elapsed in the state in which the number of rotations of the crankshaft 57 is a predetermined number or larger, the running speed of the electric assist vehicle 1 is a predetermined speed or higher, and the acceleration is a predetermined value or larger. When it is determined that the condition is fulfilled, the controller 70 decreases the assist power to be generated by the electric motor 53.

In the case in which the speed at which the rider of the electric assist bicycle 1 rotates the pedal 55 is high, the vehicle speed is high, and the rider is rotating the pedal 55 in the state in which the acceleration in the traveling direction of the vehicle is large, the speed of the rotation transmitted from the electric motor 53 to the synthesis mechanism 58 is increased. When the rider stops increasing the speed of rotating the pedal 55 while the electric motor 53 is rotated at a high speed, the load applied on the foot rotating the pedal 55 may become excessively light and thus the rider may feel uncomfortable. In the case in which a predetermined time period has elapsed in the state in which the number of rotations of the crankshaft 57 is a predetermined number or larger, the running speed is a predetermined speed or higher, and the acceleration is a predetermined value or larger, the assist power is decreased. The load applied to the foot of the rider rotating the pedal 55 is increased by the degree by which the assist power is decreased. In this manner, the load applied on the foot of the rider when the rider stops increasing the speed of rotating the pedal 55 is suppressed from becoming excessively light and thus the uncomfortable feeling of the rider is alleviated.

In a preferred embodiment of the present invention, the electric assist vehicle 1 includes a plurality of assist modes different from each other in the relationship between the human power of the rider and the assist power. When it is determined that the conditions or the condition are(is) fulfilled, the controller 70 is configured or programmed to control the electric motor 53 to generate an assist power smaller than the assist power calculated based on the assist mode currently set.

When it is determined the above-described conditions or condition are(is) fulfilled, the controller 70 is configured or programmed to decrease the assist power to be generated by the electric motor 53 as compared with the assist power in normal control. In this manner, the load applied on the foot of the rider rotating the pedal 55 is suppressed from becoming excessively light and thus the uncomfortable feeling of the rider is alleviated.

The electric assist vehicle 1 according to a preferred embodiment of the present invention includes the above-described electric assist system 51. The electric assist vehicle 1 including the electric assist system 51 according to a preferred embodiment of the present invention may generate an appropriate level of assist power in accordance with the load during running.

Some preferred embodiments of the present invention have been described. The above-described description of the preferred embodiments provides illustrative examples of the present invention, but does not limit the present invention. A preferred embodiment in which elements described in the above-described preferred embodiments are combined appropriately may be provided. The elements may be, for example, modified, replaced, added or deleted within the scope of the claims of the present invention and equivalents thereof.

Preferred embodiments of the present invention are especially useful for a vehicle that includes an acceleration sensor and is driven by human power assisted by assist power, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric assist system for an electric assist vehicle including a pedal, the electric assist system comprising:
    a crankshaft that is rotatable by human power of a rider applied to the pedal;
    an electric motor that generates an assist power to assist the human power of the rider;
    a controller configured or programmed to control a magnitude of the assist power to be generated by the electric motor;
    an acceleration sensor that outputs a signal in accordance with an acceleration in a traveling direction of the electric assist vehicle; and
    a torque sensor that outputs a signal in accordance with a torque generated at the crankshaft; wherein
    the controller is configured or programmed to change the magnitude of the assist power to be generated by the electric motor in accordance with a change in the acceleration that is associated with an operation of the rider rotating the pedal;
    the torque generated at the crankshaft by the human power of the rider applied to the pedal changes in accordance with a rotation of the crankshaft;
    the controller is configured or programmed to change the magnitude of the assist power to be generated by the electric motor in accordance with a change in the acceleration that is associated with a change in the torque;
    a magnitude of the torque generated at the crankshaft by the human power of the rider applied to the pedal increases and decreases in accordance with the rotation of the crankshaft; and
    the controller is configured or programmed to change the magnitude of the assist power to be generated by the electric motor in accordance with a change in the acceleration between an adjacent ridge and trough of the torque that increases and decreases.

2. An electric assist system for an electric assist vehicle including a pedal, the electric assist system comprising:
    a crankshaft that is rotatable by human power of a rider applied to the pedal;
    an electric motor that generates an assist power to assist the human power of the rider;
    a controller configured or programmed to control a magnitude of the assist power to be generated by the electric motor;
    an acceleration sensor that outputs a signal in accordance with an acceleration in a traveling direction of the electric assist vehicle; and
    a torque sensor that outputs a signal in accordance with a torque generated at the crankshaft; wherein
    the controller is configured or programmed to change the magnitude of the assist power to be generated by the electric motor in accordance with a change in the acceleration that is associated with an operation of the rider rotating the pedal;
    the torque generated at the crankshaft by the human power of the rider applied to the pedal changes in accordance with a rotation of the crankshaft;
    the controller is configured or programmed to change the magnitude of the assist power to be generated by the electric motor in accordance with a change in the acceleration that is associated with a change in the torque;
    a magnitude of the torque generated at the crankshaft by the human power of the rider applied to the pedal increases and decreases in accordance with the rotation of the crankshaft;
    the controller is configured or programmed to determine a difference between a maximum value and a minimum value of the acceleration between an adjacent ridge and trough of the torque that increases and decreases; and
    the controller is configured or programmed to change the magnitude of the assist power to be generated by the electric motor in accordance with the difference between the maximum value and the minimum value of the acceleration.

3. The electric assist system of claim 1, wherein the controller is configured or programmed to increase the assist power to be generated by the electric motor as the change in the acceleration between the adjacent ridge and trough of the torque that increases and decreases becomes larger.

4. An electric assist system for an electric assist vehicle including a pedal, the electric assist system comprising:
a crankshaft that is rotatable by human power of a rider applied to the pedal;
an electric motor that generates an assist power to assist the human power of the rider;
a controller configured or programmed to control a magnitude of the assist power to be generated by the electric motor;
an acceleration sensor that outputs a signal in accordance with an acceleration in a traveling direction of the electric assist vehicle; and
a sensor that detects a rotation of the crankshaft; wherein
the controller is configured or programmed to change the magnitude of the assist power to be generated by the electric motor in accordance with a change in the acceleration that is associated with an operation of the rider rotating the pedal; and
the controller is configured or programmed to change the magnitude of the assist power to be generated by the electric motor in accordance with a change in the acceleration during a half rotation of the crankshaft.

5. The electric assist system of claim 4, wherein
the controller is configured or programmed to determine a difference between a maximum value and a minimum value of the acceleration during the half rotation of the crankshaft; and
the controller is configured or programmed to change the magnitude of the assist power to be generated by the electric motor in accordance with the difference between the maximum value and the minimum value of the acceleration.

6. The electric assist system of claim 4, wherein
the sensor that detects the rotation of the crankshaft is a torque sensor that detects a torque generated at the crankshaft; and
the controller is configured or programmed to determine the rotation of the crankshaft based on a change in the torque.

7. The electric assist system of claim 4, wherein the sensor that detects the rotation of the crankshaft is a rotation sensor.

8. The electric assist system of claim 2, wherein the controller is configured or programmed to increase the assist power to be generated by the electric motor in a case in which the difference between the maximum value and the minimum value of the acceleration is a first predetermined value or larger.

9. The electric assist system of claim 2, wherein the controller is configured or programmed to decrease the assist power to be generated by the electric motor in a case in which the difference between the maximum value and the minimum value of the acceleration is smaller than a second predetermined value.

10. The electric assist system of claim 2, wherein
the controller is configured or programmed to store, in advance, a table in which values of the difference between the maximum value and the minimum value of the acceleration are divided into a plurality of ranges; and
the controller is configured or programmed to change the magnitude of the assist power to be generated by the electric motor in accordance with a range, among the plurality of ranges, to which the difference between the maximum value and the minimum value of the acceleration determined by the acceleration sensor belongs.

11. The electric assist system of claim 10, wherein
the plurality of ranges include a first range and a second range, the second range including values of the difference larger than the values of the difference in the first range; and
in a case in which the difference is a value belonging to the second range, the controller is configured or programmed to increase the assist power to be generated by the electric motor as compared with the assist power in a case in which the difference is a value belonging to the first range.

12. The electric assist system of claim 2, wherein the controller is configured or programmed to store in advance:
a plurality of assist modes different from each other in a relationship between the human power of the rider and the assist power; and
a table in which values of the difference between the maximum value and the minimum value of the acceleration are divided into a plurality of ranges; and
the controller is configured or programmed to change the assist mode in accordance with a range, among the plurality of ranges, to which the difference between the maximum value and the minimum value of the acceleration determined by the acceleration sensor belongs.

13. The electric assist system of claim 12, wherein
the plurality of ranges include a first range and a second range, the second range including values of the difference larger than the values of the difference in the first range;
the plurality of assist modes include a first assist mode and a second assist mode, the second assist mode including an assist power larger than an assist power in the first assist mode;
in a case in which the difference between the maximum value and the minimum value of the acceleration determined by the acceleration sensor belongs to the first range, the controller is configured or programmed to cause the electric motor to generate an assist power in accordance with the first assist mode; and
in a case in which the difference between the maximum value and the minimum value of the acceleration determined by the acceleration sensor belongs to the second range, the controller is configured or programmed to cause the electric motor to generate an assist power in accordance with the second assist mode.

14. The electric assist system of claim 2, further comprising:
a sensor that detects the rotation of the crankshaft; and
a sensor that detects a running speed of the electric assist vehicle; wherein
the controller is configured or programmed to determine whether or not conditions are fulfilled that:
a number of rotations of the crankshaft is a predetermined number or larger;
the running speed of the electric assist vehicle is a predetermined speed or higher; and
the difference between the maximum value and the minimum value of the acceleration is smaller than a predetermined value; and
when it is determined that the conditions are fulfilled, the controller is configured or programmed to decrease the assist power to be generated by the electric motor.

15. An electric assist system for an electric assist vehicle including a pedal, the electric assist system comprising:
a crankshaft that is rotatable by human power of a rider applied to the pedal;

an electric motor that generates an assist power to assist the human power of the rider;

a controller configured or programmed to control a magnitude of the assist power to be generated by the electric motor;

an acceleration sensor that outputs a signal in accordance with an acceleration in a traveling direction of the electric assist vehicle;

a sensor that detects a rotation of the crankshaft; and a sensor that detects a running speed of the electric assist vehicle; wherein the controller is configured or programmed to change the magnitude of the assist power to be generated by the electric motor in accordance with a change in the acceleration that is associated with an operation of the rider rotating the pedal;

the controller is configured or programmed to determine whether or not conditions are fulfilled that:

a number of rotations of the crankshaft is a predetermined number or larger;

the running speed of the electric assist vehicle is a predetermined speed or higher; and the acceleration is of a predetermined value or larger; and when it is determined that the conditions are fulfilled, the controller is configured or programmed to decrease the assist power to be generated by the electric motor.

16. An electric assist system for an electric assist vehicle including a pedal, the electric assist system comprising:

a crankshaft that is rotatable by human power of a rider applied to the pedal;

an electric motor that generates an assist power to assist the human power of the rider;

a controller configured or programmed to control a magnitude of the assist power to be generated by the electric motor;

an acceleration sensor that outputs a signal in accordance with an acceleration in a traveling direction of the electric assist vehicle;

a sensor that detects a rotation of the crankshaft; and a sensor that detects a running speed of the electric assist vehicle; wherein the controller is configured or programmed to change the magnitude of the assist power to be generated by the electric motor in accordance with a change in the acceleration that is associated with an operation of the rider rotating the pedal;

the controller is configured or programmed to determine whether or not conditions are fulfilled that:

a number of rotations of the crankshaft is a predetermined number or larger;

the running speed of the electric assist vehicle is a predetermined speed or higher; and the acceleration is a first predetermined value or larger, and then becomes a value smaller than a second predetermined value which is smaller than the first predetermined value; and when it is determined that the conditions are fulfilled, the controller is configured or programmed to decrease the assist power to be generated by the electric motor.

17. An electric assist system for an electric assist vehicle including a pedal, the electric assist system comprising:

a crankshaft that is rotatable by human power of a rider applied to the pedal;

an electric motor that generates an assist power to assist the human power of the rider;

a controller configured or programmed to control a magnitude of the assist power to be generated by the electric motor;

an acceleration sensor that outputs a signal in accordance with an acceleration in a traveling direction of the electric assist vehicle;

a sensor that detects a rotation of the crankshaft; and a sensor that detects a running speed of the electric assist vehicle; wherein the controller is configured or programmed to change the magnitude of the assist power to be generated by the electric motor in accordance with a change in the acceleration that is associated with an operation of the rider rotating the pedal;

the controller is configured or programmed to determine whether or not a condition is fulfilled that:

a predetermined time period has elapsed in a state in which a number of rotations of the crankshaft is a predetermined number or larger;

the running speed of the electric assist vehicle is a predetermined speed or higher; or the acceleration is a predetermined value or larger; and when it is determined that the condition is fulfilled, the controller is configured or programmed to decrease the assist power to be generated by the electric motor.

18. The electric assist system of claim 14, wherein the controller is configured or programmed to include a plurality of assist modes different from each other in a relationship between the human power of the rider and the assist power; and when it is determined that one or more of the conditions is fulfilled, the controller is configured or programmed to control the electric motor to generate an assist power that is smaller than the assist power calculated based on a present one of the plurality of assist modes.

19. An electric assist vehicle, comprising the electric assist system of claim 1.

* * * * *